United States Patent
Sakuragi et al.

(10) Patent No.: US 12,476,505 B2
(45) Date of Patent: Nov. 18, 2025

(54) ELECTRIC MOTOR WITH A SHORT-CIRCUIT REDUCTION PART, COMPRESSOR, BLOWER, REFRIGERATOR

(71) Applicant: DAIKIN INDUSTRIES, LTD., Osaka (JP)

(72) Inventors: Takuya Sakuragi, Osaka (JP); Yoshiki Yasuda, Osaka (JP); Daiki Miwa, Osaka (JP); Akio Yamagiwa, Osaka (JP); Hiroshi Hibino, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 287 days.

(21) Appl. No.: 18/001,133

(22) PCT Filed: Jun. 8, 2021

(86) PCT No.: PCT/JP2021/021689
§ 371 (c)(1),
(2) Date: Dec. 8, 2022

(87) PCT Pub. No.: WO2021/251363
PCT Pub. Date: Dec. 16, 2021

(65) Prior Publication Data
US 2023/0216360 A1 Jul. 6, 2023

(30) Foreign Application Priority Data
Jun. 9, 2020 (JP) .................. 2020-100025

(51) Int. Cl.
*H02K 1/2795* (2022.01)
*H02K 1/276* (2022.01)
(Continued)

(52) U.S. Cl.
CPC ......... *H02K 1/2795* (2022.01); *H02K 1/2766* (2013.01); *H02K 21/24* (2013.01);
(Continued)

(58) Field of Classification Search
CPC .... H02K 1/2766; H02K 1/2783; H02K 1/272; H02K 1/2795; H02K 1/2798; H02K 21/24; H02K 1/2792
(Continued)

(56) References Cited

U.S. PATENT DOCUMENTS 3,334,254 A * 8/1967 Kober .................. H02K 1/2795
310/156.41
6,323,572 B1 11/2001 Kinoshita
(Continued)

FOREIGN PATENT DOCUMENTS

| CN | 109687674 A | * | 3/2019 | ............. H02K 21/24 |
| CN | 116914965 A | * | 7/2023 | ........... H02K 1/2795 |

(Continued)

OTHER PUBLICATIONS

Translation of JP 2007143335 A (Year: 2007).*
(Continued)

*Primary Examiner* — Oluseye Iwarere
*Assistant Examiner* — Daniel K Schlak
(74) *Attorney, Agent, or Firm* — IPUSA, PLLC

(57) ABSTRACT

An electric motor includes a stator; a rotor facing the stator a first direction and configured to be rotatable in a second direction that is orthogonal to the first direction; and a short-circuit reduction member, wherein the rotor includes a main magnet having a first magnetic pole on a surface facing the stator; an auxiliary magnet arranged adjacent to the main magnet and having a second magnetic pole and a third magnetic pole that is different in polarity from the second magnetic pole, and configured to increase a magnetic flux of the first magnetic pole, and wherein the auxiliary magnet is arranged adjacent to the main magnet.

13 Claims, 44 Drawing Sheets

(51) Int. Cl.
*H02K 1/2783* (2022.01)
*H02K 21/24* (2006.01)
*H02K 1/2706* (2022.01)
*H02K 1/278* (2022.01)

(52) U.S. Cl.
CPC .......... *H02K 1/2706* (2013.01); *H02K 1/278* (2013.01); *H02K 1/2783* (2022.01)

(58) Field of Classification Search
USPC .................................................. 310/156.07
See application file for complete search history.

(56) References Cited

U.S. PATENT DOCUMENTS

| | | | | |
|---|---|---|---|---|
| 2003/0042804 | A1* | 3/2003 | Cook | H02K 5/1672 310/91 |
| 2005/0179337 | A1 | 8/2005 | Hasebe et al. | |
| 2005/0285468 | A1* | 12/2005 | Fukushima | H02K 1/2706 310/156.53 |
| 2006/0284507 | A1* | 12/2006 | Murakami | H02K 1/2798 310/156.55 |
| 2007/0080598 | A1* | 4/2007 | Naruse | H02K 1/2795 310/156.32 |
| 2009/0009022 | A1 | 1/2009 | Saint-Michel | |
| 2012/0200184 | A1* | 8/2012 | Takeuchi | H02K 21/12 310/112 |
| 2012/0228979 | A1 | 9/2012 | Petro et al. | |
| 2014/0054998 | A1* | 2/2014 | Kim | H02K 1/2753 310/156.07 |
| 2014/0139079 | A1* | 5/2014 | Kato | H02K 1/2713 310/68 B |
| 2017/0244293 | A1 | 8/2017 | Kanda et al. | |
| 2019/0044401 | A1* | 2/2019 | Sasaki | H02K 1/182 |
| 2020/0228038 | A1 | 7/2020 | Takahashi | |
| 2021/0135523 | A1* | 5/2021 | Yan | H02K 1/2795 |
| 2021/0210998 | A1 | 7/2021 | Yabe et al. | |

FOREIGN PATENT DOCUMENTS

| | | | | |
|---|---|---|---|---|
| JP | 59144350 | A * | 8/1984 | ............ H02K 21/08 |
| JP | 10191585 | A * | 7/1998 | ............ H02K 1/27 |
| JP | 2000-156947 | | 6/2000 | |
| JP | 3487667 | B2 * | 1/2004 | ............ H02K 1/27 |
| JP | 2007143335 | A * | 6/2007 | ............ H02K 1/27 |
| JP | 2007-306685 | | 11/2007 | |
| JP | 2008-104278 | | 5/2008 | |
| JP | 5317621 | | 10/2013 | |
| JP | 2017-143663 | | 8/2017 | |
| JP | 2019-140894 | | 8/2019 | |
| JP | 2019-161760 | | 9/2019 | |
| WO | 2020/003390 | | 1/2020 | |

OTHER PUBLICATIONS

Translation of JP 3487667 B2 (Year: 2004).*
Translation of JP 59144350 A (Year: 1984).*
Translation of JP 10191585 A (Year: 1998).*
International Preliminary Report on Patentability for PCT/JP2021/021689 mailed on Dec. 22, 2022.
International Search Report for PCT/JP2021/021689 mailed on Aug. 17, 2021.
Extended European Search Report mailed on Jun. 7, 2024 with respect to the corresponding European patent application No. 21821468.2.

* cited by examiner

ELECTRIC MOTOR WITH A SHORT-CIRCUIT REDUCTION PART, COMPRESSOR, BLOWER, REFRIGERATOR

FIELD OF THE INVENTION

The present disclosure relates to electric motors, etc.

BACKGROUND OF THE INVENTION

For example, with respect to a main magnet having a magnetic pole on the surface facing the stator, there is known a technology to increase the output of the electric motor by arranging auxiliary magnets in a Halbach array so as to increase the magnetic flux of the magnetic pole facing the stator of the main magnet (see Patent Document 1).

CITATION LIST

Patent Literature

PTL 1

Japanese Laid-Open Patent Application No. 2019-161760

BRIEF SUMMARY OF THE INVENTION

Technical Problem

However, in Patent Document 1, auxiliary magnets are provided in the rotor core. Therefore, a magnetic flux that short-circuits between the magnetic poles of the auxiliary magnets is generated through the rotor core, and as a result, the magnetic flux of the magnetic poles facing the stator of the main magnet may not be sufficiently increased.

The purpose of the present disclosure is to provide a technique by which the magnetic flux of the magnetic pole facing the stator of the magnet can be further increased in a rotor.

Solution to Problem

One embodiment of the present disclosure provides an electric motor including:
  a stator;
  a rotor facing the stator in a first direction and configured to be rotatable in a circumferential direction that is orthogonal to the first direction; and
  a short-circuit reduction part, wherein
  the rotor includes:
    a first magnet having a first magnetic pole on a surface facing the stator;
    a second magnet arranged adjacent to the first magnet and having a second magnetic pole and a third magnetic pole that is different in polarity from the second magnetic pole, and configured to increase a magnetic flux of the first magnetic pole, and wherein
  the second magnet is arranged adjacent to the first magnet in a third direction that is orthogonal to the first direction, and
  the short-circuit reduction part is provided at a portion around the second magnet facing the second magnet in parallel with a virtual line connecting the second magnetic pole and the third magnetic pole, to reduce a short-circuit of a magnetic flux between the second magnetic pole and the third magnetic pole.

According to the present embodiment, the magnetic flux that short-circuits between the magnetic poles of the second magnet is less likely to occur through the portion surrounding the second magnet that faces the second magnet in parallel with the virtual line connecting the magnetic poles inside the second magnet. Therefore, the magnetic flux of the magnetic pole facing the stator of the first magnet can be further increased.

Further, in the above embodiment,
the third direction is orthogonal to the second direction.
Further, in the above embodiment,
the rotor and the stator are arranged facing each other in an axial direction,
the first magnet is arranged such that a plurality of the first magnetic poles are arranged side by side in a circumferential direction centering around a rotary shaft, and
the second magnet is arranged such that the second magnetic pole or the third magnetic pole is adjacent to each of the plurality of the first magnetic poles in a radial direction.

Further, in the above embodiment,
the rotor and the stator are arranged facing each other in a radial direction,
the first magnet is arranged such that a plurality of the first magnetic poles are arranged side by side in a circumferential direction centering around a rotary shaft, and
the second magnet is arranged such that the second magnetic pole or the third magnetic pole is adjacent to each of the plurality of the first magnetic poles in an axial direction.

Further, in the above embodiment,
the third direction is the same as the second direction.
Further, in the above embodiment,
the rotor and the stator are arranged facing each other in an axial direction,
the first magnet is arranged such that a plurality of the first magnetic poles are arranged side by side in a circumferential direction centering around a rotary shaft, and
the second magnet is arranged such that the second magnetic pole or the third magnetic pole is adjacent to each of the plurality of the first magnetic poles in the circumferential direction.

Further, in the above embodiment,
the rotor and the stator are arranged facing each other in a radial direction,
the first magnet is arranged such that a plurality of the first magnetic poles are arranged side by side in a circumferential direction centering around a rotary shaft, and
the second magnet is arranged such that the second magnetic pole or the third magnetic pole is adjacent to an end portion in a direction orthogonal to a main magnetic flux of each of the plurality of the first magnetic poles as viewed in an axial direction.

Further, in the above embodiment,
the first magnet has a fourth magnetic pole on a surface different from the surface having the first magnetic pole,
the rotor includes a first member forming a magnetic path between a plurality of the first magnets and a plurality of the fourth magnetic poles, and
the short-circuit reduction part has a magnetic resistance that is higher than that of the first member.

Further, in the above embodiment,
the short-circuit reduction part is provided with a non-magnetic body.

Further, in the above embodiment,
the short-circuit reduction part is provided with a space without any member.

Further, in the above embodiment,
the second magnet is magnetized in a direction orthogonal to a magnetization direction of the first magnet.

Further, in the above embodiment,
the second magnet is magnetized in a direction intersecting a magnetization direction of the first magnet by an angle greater than zero degrees and less than 90 degrees.

Further, in the above embodiment,
at least one of the first magnet or the second magnet is magnetized in a polar anisotropic magnetization orientation.

Further, in the above embodiment,
the first magnet and the second magnet are integrally configured.

Further, another embodiment of the present disclosure provides
a compressor in which the above electric motor is installed.

Further, another embodiment of the present disclosure provides
a blower in which the above electric motor is installed.

Further, another embodiment of the present disclosure provides
a refrigerator including:
a compressor; and
a blower, wherein
in at least one of the compressor or the blower, the above electric motor is installed.

Advantageous Effects of Invention

According to the above embodiment, the magnetic flux of the magnetic pole facing the stator of the magnet can be further increased in the rotor.

DETAILED DESCRIPTION OF THE INVENTION

Embodiments will be described below with reference to the drawings.

First Embodiment

The first embodiment will be described.
<Basic Configuration of Electric Motor>
First, the basic configuration of an electric motor 1 according to the first embodiment will be described with reference to FIGS. 1 to 3.

Figure 1:
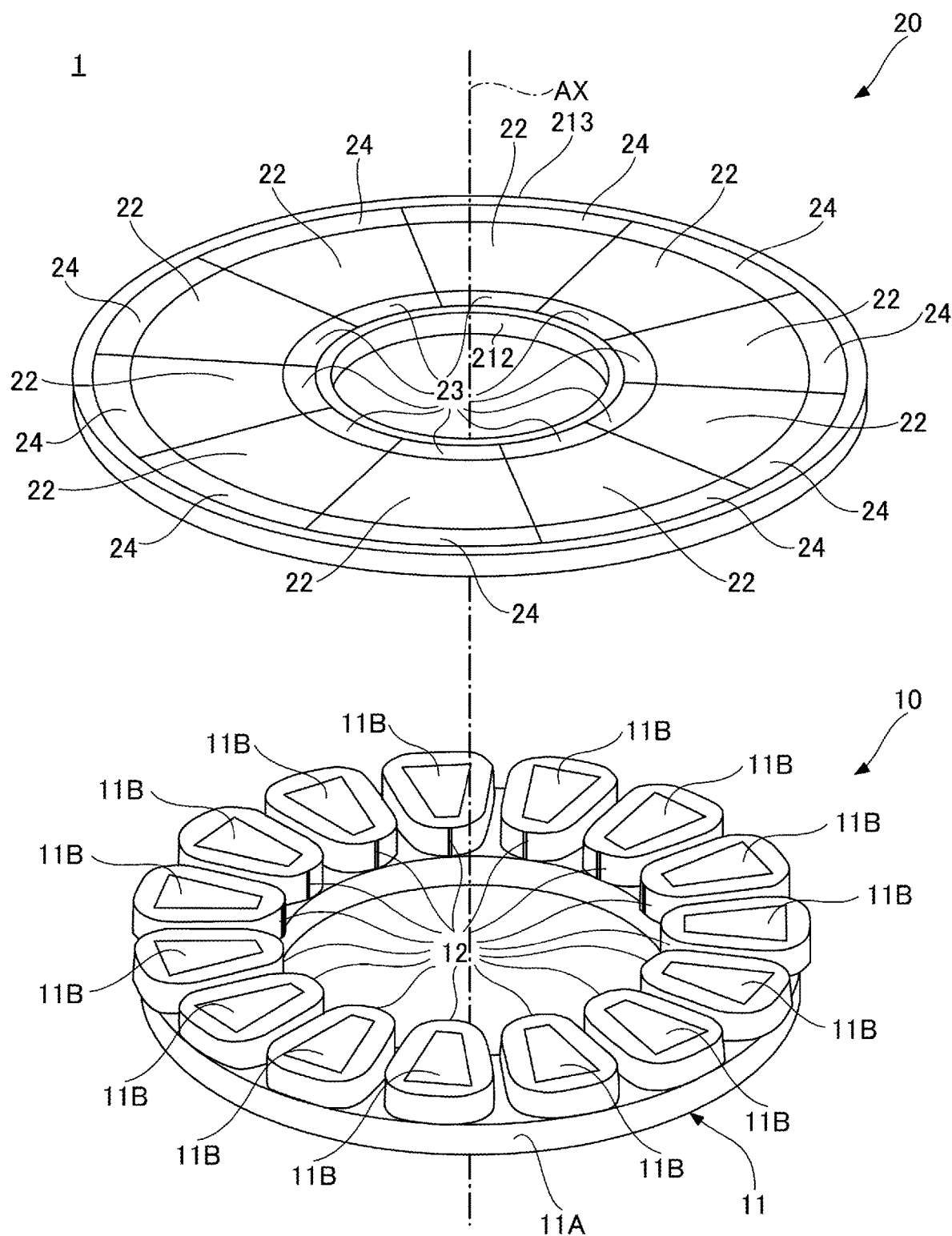
FIG. 1 is an exploded perspective view illustrating an example of an electric motor according to a first embodiment.

FIG. 1 is an exploded perspective view illustrating an example of the electric motor 1 according to the first embodiment. Specifically, FIG. 1 is a perspective view of the electric motor 1 when a rotor 20 is axially moved away from a stator 10. In FIG. 1, the illustration of the rotary shaft member, which is attached to the rotor 20 and rotates around a rotary axial center AX, as well as a back yoke part 211 and short-circuit reduction members 25 and 26 in FIG. 3 are omitted. FIG. 2 is a view in the axial direction illustrating an example of the rotor 20 according to the first embodiment. Specifically, FIG. 2 illustrates the rotor 20 viewed from the axial underside of FIG. 1, i.e., the stator 10. The thick solid arrows in the figure represent the flow of magnetic flux between auxiliary magnets 23 and 24, and the dashed arrows in FIG. 2 represent the magnetization direction (magnetization orientation) of the auxiliary magnets 23 and 24. FIG. 3 is a cross-sectional view illustrating an example of the electric motor 1 according to the first embodiment. Specifically, FIG. 3 is a cross-sectional view (longitudinal cross-sectional view) corresponding to line A-A in FIG. 2 of the electric motor 1. The thick solid arrows in FIG. 3 represent the flow of magnetic flux between the auxiliary magnets 23 and 24 and a main magnet 22 and the flow of magnetic flux between a main magnet 22 and the stator 10, and the dashed arrows in FIG. 3 represent the magnetization direction (magnetization orientation) of the main magnet 22 and the auxiliary magnets 23 and 24.

The electric motor 1 (also referred to as a "motor") according to the first embodiment is, for example, installed in a compressor or blower of an air conditioner (an example of a refrigerator). The same may be applied to the electric motor 1 related to the second to fourth embodiments described below.

As illustrated in FIG. 1, the electric motor 1 includes the stator 10 and the rotor 20. The electric motor 1 according to the first embodiment is of what is referred to as an axial gap type in which the stator 10 and the rotor 20 face each other in the axial direction (an example of the first direction) with a predetermined gap (also referred to as an "air gap").

The stator 10 is an armature and is fixed to a housing that is not illustrated. As illustrated in FIGS. 1 and 3, the stator 10 includes a stator core 11 and windings 12.

The stator core 11 is formed by a ferromagnetic material such as, for example, an electromagnetic steel plate, cast iron, a compacted magnetic core, etc. The stator core 11 includes a back yoke part 11A and a plurality of teeth parts 11B.

As viewed in the axial direction, the back yoke part 11A has an approximately annular shape centered on the rotary axial center AX of the electric motor 1 and has an insertion hole centered on the rotary axial center AX. "Approximately" is intended, for example, to allow manufacturing errors, etc., and is used in the following explanation with the same meaning. Thus, the rotary shaft member mounted on the rotor 20 can be inserted into the insertion hole, and the rotary shaft member can be supported rotatably around the rotary axial center AX at both ends in the axial direction of the electric motor 1. The back yoke part 11A magnetically short-circuits between the multiple teeth parts 11B around which the windings 12 are wound, configuring a magnetic path of a magnetic field according to the current flowing through each of the windings 12.

The multiple (15 in this example) teeth parts 11B are arranged at equal intervals in the circumferential direction in such a way as to project in the axial direction on the surface of the back yoke part 11A facing the rotor 20.

The winding 12 is wound around each of the multiple teeth parts 11B. An insulating member such as an insulating film made of PET (polyethylene terephthalate), for example, is interposed between the winding 12 and the teeth parts 11B.

The number of teeth parts 11B may instead be 14 or less or 16 or more.

The rotor 20 is a field magnet, and as described above, is arranged to face the stator 10 with a predetermined gap in the axial direction, and can rotate in the circumferential direction (an example of the second direction) that is orthogonal to the direction (axial direction) facing the stator 10. The rotor 20 is attached to a rotary shaft member (not illustrated), which is rotatably supported against a fixed part such as a housing by, for example, bearings (bearings) provided at both ends. Thus, the rotor 20 is configured to be rotatable with respect to a fixed part such as the housing of the electric motor 1 via the rotary shaft member. The rotor 20 includes a rotor core 21, a plurality of main magnets 22, the plurality of auxiliary magnets 23, the plurality of auxiliary magnets 24, a short-circuit reduction member 25, and a short-circuit reduction member 26, as illustrated in FIGS. 1 to 3.

The rotor core 21 (also referred to as the "rotor core") is an element that forms the magnetic path in the magnetic field, etc., of the main magnet 22 and the auxiliary magnets 23 and 24. The rotor core 21 is formed by a ferromagnetic material such as, for example, an electromagnetic steel plate, cast iron, a compacted magnetic core, etc. As illustrated in FIGS. 1 to 3, the rotor core 21 includes the back yoke part 211, an inner ring part 212, and an outer ring part 213.

The back yoke part 211 (an example of the first member) is provided, in the axial direction, adjacent to the surface of the main magnet 22, on the opposite side of the surface of the main magnet 22 facing the stator 10 in the axial direction. The back yoke part 211 has an annular shape in such a manner that, when viewed in the axial direction, the back yoke part 211 covers the entire circumference of approximately the same range as the radial range in which the main magnet 22 is provided. That is, in the radial direction, the inner and outer circumferential surfaces of the back yoke part 211 centering around the rotary axial center AX approximately coincide with the inner and outer circumferential surfaces of the main magnet 22, respectively. The back yoke part 211 is used as a magnetic path of magnetic flux between the multiple main magnets 22.

The inner ring part 212 is provided adjacent to the inner side in the radial direction of the auxiliary magnet 23. The inner ring part 212 has an approximately annular shape as viewed in the axial direction. The inner ring part 212 has approximately the same axial thickness as the auxiliary magnet 23 and is arranged to occupy approximately the same axial range as the auxiliary magnet 23. That is, the surface of the auxiliary magnet 23 facing the stator 10 in the axial direction approximately coincides with the surface of the inner ring part 212 facing the stator 10 in the axial direction (approximately flush). As illustrated in FIGS. 1 and 2, the inner ring part 212 is formed of one member in the circumferential direction, for example. The inner ring part 212 may be formed of multiple members in the circumferential direction. As illustrated in FIG. 2, the inner ring part 212 is used as a magnetic path between the radially inner magnetic poles adjacent in the circumferential direction of the auxiliary magnet 23.

The outer ring part 213 is provided adjacent to the outer side in the radial direction of the auxiliary magnet 24. The outer ring part 213 has an approximately annular shape as viewed in the axial direction. The outer ring part 213 has approximately the same axial thickness as the auxiliary magnet 24 and is arranged to occupy the same axial range as the auxiliary magnet 24. That is, the surface of the auxiliary magnet 24 facing the stator 10 in the axial direction approximately coincides with the surface of the inner ring part 213 facing the stator 10 in the axial direction (approximately flush). As illustrated in FIG. 2, the outer ring part 213 is used as a magnetic path between the radially outer magnetic poles adjacent in the circumferential direction of the auxiliary magnet 24.

The multiple (in this example, 10) main magnets 22 (one example of the first magnet) are arranged in a circumferential direction around the rotary axial center AX. As illustrated in FIG. 3, the main magnet 22 is arranged to face the teeth part 11B of the stator 10 in the axial direction. As illustrated in FIGS. 1 and 2, for example, the multiple main magnets 22 are arranged such that adjacent main magnets 22 are in contact with each other. Each of the multiple main magnets 22 is approximately fan-shaped as viewed in the axial direction and is provided so as to occupy approximately the same radial range around the rotary axial center AX and approximately the same angular width (that is, circumferential width). That is, the multiple main magnets 22 may have approximately the same shape as each other. As illustrated in FIG. 3, the multiple main magnets 22 are axially magnetized permanent magnets and have magnetic poles of different magnetic polarities (N-pole and S-pole) (examples of the first magnetic pole and the fourth magnetic pole) on the surface facing the stator 10 and on the surface on the opposite side, respectively. As illustrated in FIG. 2, the multiple main magnets 22 are arranged in such a manner that the magnetic pole on the surface facing the stator 10 is different between two main magnets 22 that are adjacent to each other in the circumferential direction, that is, the S and N-poles are alternately arranged on the surface facing the stator 10 in the circumferential direction. The main magnet 22 is, for example, a neodymium sintered magnet, a ferrite magnet, or the like.

The number of main magnets 22 may also be 9 or less or 11 or more. The same may be applied to the case of the second to fourth embodiments described below.

The multiple (in this example, 10) auxiliary magnets 23 (one example of the second magnet) are arranged side by side in the circumferential direction in such a way as to be adjacent to each other on the inner side of the radial direction (one example of the third direction) of the main magnets 22. As illustrated in FIG. 3, the auxiliary magnet 23 is arranged so as not to face the teeth part 11B of the stator 10 in the axial direction. The auxiliary magnet 23, together with the main magnet 22, configures a Halbach array and relatively increases the magnetic flux of the magnetic pole on the surface facing the stator 10 in the axial direction of the main magnet 22. Thus, the output of the electric motor 1 can be increased.

Each of the multiple auxiliary magnets 23 has an approximately fan-shaped angular range corresponding to the range occupied by the main magnet 22 in the circumferential direction when viewed in the axial direction. The auxiliary magnets 23 are permanent magnets magnetized in the radial direction orthogonal to the magnetization direction (axial direction) of the main magnet 22, and have magnetic poles of different magnetic polarities (N-pole and S-pole) (examples of the second magnetic pole and the third magnetic pole) on the outside and the inside in the radial direction, respectively. One set of the auxiliary magnets 23, that is magnetized by the N-pole on the outside in the radial direction, are arranged adjacent to the inside in the radial direction of the main magnet 22, that is magnetized by the N-pole on the surface facing the stator 10 in the axial direction. On the other hand, the other auxiliary magnets 23, that is magnetized by the S-pole on the outside in the radial direction, are arranged adjacent to the inside in the radial direction of the main magnet 22, that is magnetized by the S-pole on the surface facing the stator 10 in the axial direction. Thus, the magnetic flux of the magnetic pole on the surface facing the stator 10 in the axial direction in the main magnet 22 can be increased (strengthened). The auxiliary magnet 23 is, for example, a neodymium sintered magnet, a ferrite magnet, or the like.

The multiple (in this example, 10) auxiliary magnets 24 are arranged side by side in the circumferential direction in such a way as to be adjacent to each other on the outer side of the radial direction of the main magnets 22. As illustrated in FIG. 3, the auxiliary magnet 24 is arranged so as not to face the teeth part 11B of the stator 10 in the axial direction. Similar to the auxiliary magnet 23, the auxiliary magnet 24, together with the main magnet 22, configures a Halbach array and relatively increases the magnetic flux of the magnetic pole on the surface facing the stator 10 in the axial direction of the main magnet 22. Thus, the output of the electric motor 1 can be increased.

Each of the multiple auxiliary magnets 24 has an approximately fan-shaped angular range corresponding to the range occupied by the main magnet 22 in the circumferential direction when viewed in the axial direction. The auxiliary magnets 24 are magnetized in the radial direction, and have magnetic poles of different magnetic polarities (N-pole and S-pole) (examples of the second magnetic pole and the third magnetic pole) on the outside and the inside in the radial direction, respectively. One set of the auxiliary magnets 24, that is magnetized by the N-pole on the inside in the radial direction, are arranged adjacent to the outside in the radial direction of the main magnet 22, that is magnetized by the N-pole on the surface facing the stator 10 in the axial direction. On the other hand, the other auxiliary magnets 24, that is magnetized by the S-pole on the inside in the radial direction, are arranged adjacent to the outside in the radial direction of the main magnet 22, that is magnetized by the S-pole on the surface facing the stator 10 in the axial direction. Thus, the magnetic flux of the magnetic pole on the surface facing the stator 10 in the axial direction in the main magnet 22 can be increased (strengthened). The auxiliary magnet 24 is, for example, a neodymium sintered magnet, a ferrite magnet, or the like.

The short-circuit reduction member 25 (an example of a short-circuit reduction part) is, for example, a non-magnetic body, and is formed of a material that has a relatively higher magnetic resistance than the members that form the magnetic path in the rotor 20, such as the back yoke part 211. The short-circuit reduction member 25 is provided adjacent to the surface of the auxiliary magnet 23 on the opposite side of the surface facing the stator 10, as viewed in the axial direction. In the axial view, the short-circuit reduction member 25 has an annular shape that covers the entire circumference of approximately same range as the radial range where the inner ring part 212 and the auxiliary magnet 23 are provided. That is, in the radial direction, the short-circuit reduction member 25 is arranged in such a manner that the inner and outer circumferential surfaces centering around the rotary axial center AX approximately coincide with the inner circumferential surface of the inner ring part 212 and the outer circumferential surface of the auxiliary magnet 23, respectively, and is arranged adjacent to the inner side in the radial direction of the back yoke part 211. Further, the short-circuit reduction member 25 has approximately the same thickness in the axial direction as the back yoke part 211.

The short-circuit reduction member 26 (an example of a short-circuit reduction part) is, for example, a non-magnetic body, and is formed of a material that has a relatively higher magnetic resistance than the members that form the magnetic path in the rotor 20, such as the back yoke part 211. The short-circuit reduction member 26 is provided adjacent to the surface of the auxiliary magnet 24 on the opposite side of the surface facing the stator 10, in the axial direction. As viewed in the axial direction, the short-circuit reduction member 26 has an annular shape that covers the entire circumference of approximately same range as the radial range where the auxiliary magnet 24 and the outer ring part 213 are provided. That is, in the radial direction, the short-circuit reduction member 26 is arranged in such a manner that the inner and outer circumferential surfaces centering around the rotary axial center AX approximately coincide with the inner circumferential surface of the outer ring part 213 and the outer circumferential surface of the auxiliary magnet 24, respectively, and is arranged adjacent to the outer side in the radial direction of the back yoke part 211. Further, the short-circuit reduction member 26 has approximately the same thickness in the axial direction as the back yoke part 211.

<Method of Reducing Short-Circuit Magnetic Flux of Auxiliary Magnet>

Figure 2:
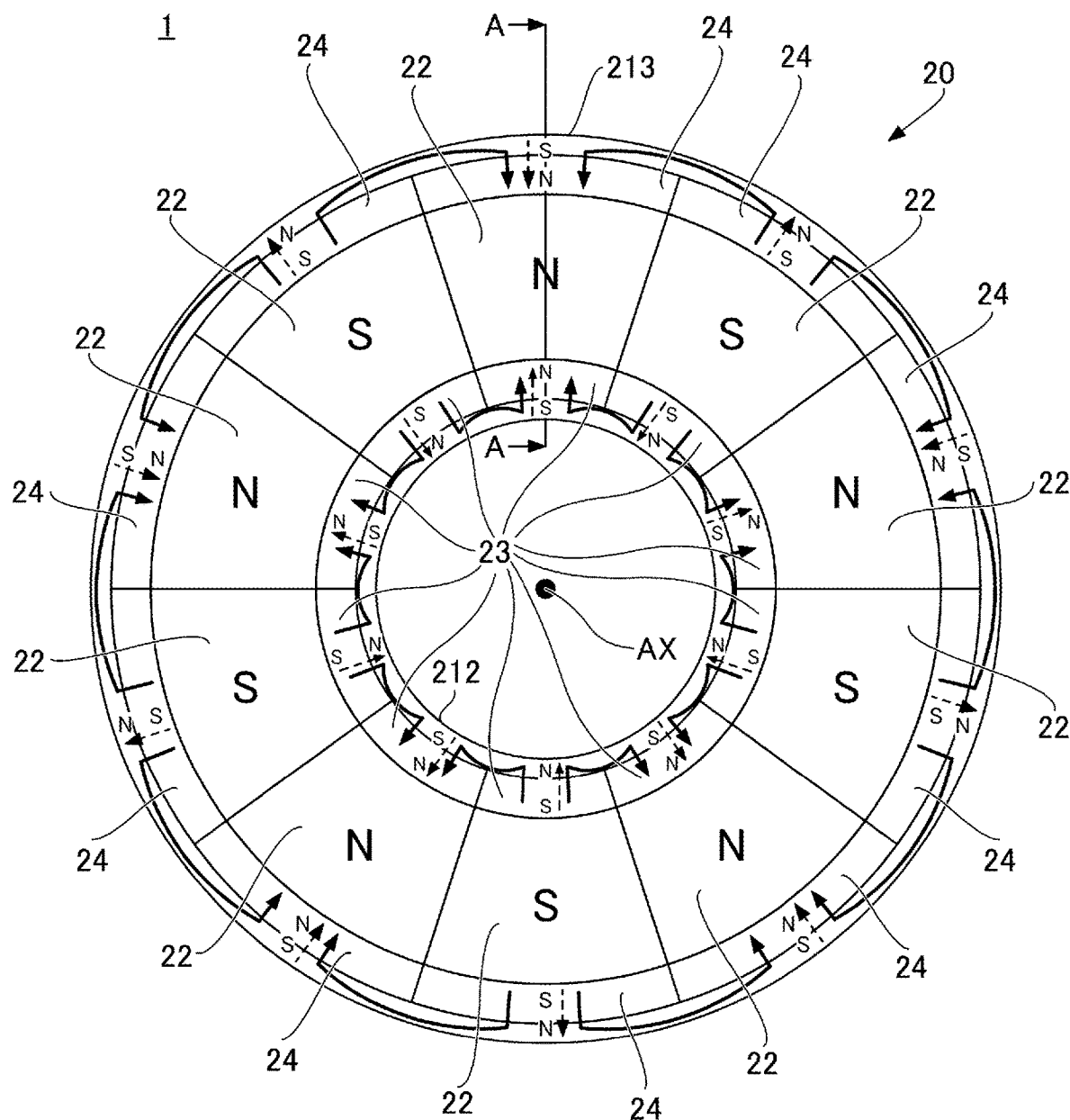
FIG. 2 is a view in the axial direction illustrating an example of a rotor according to the first embodiment.
Figure 3:
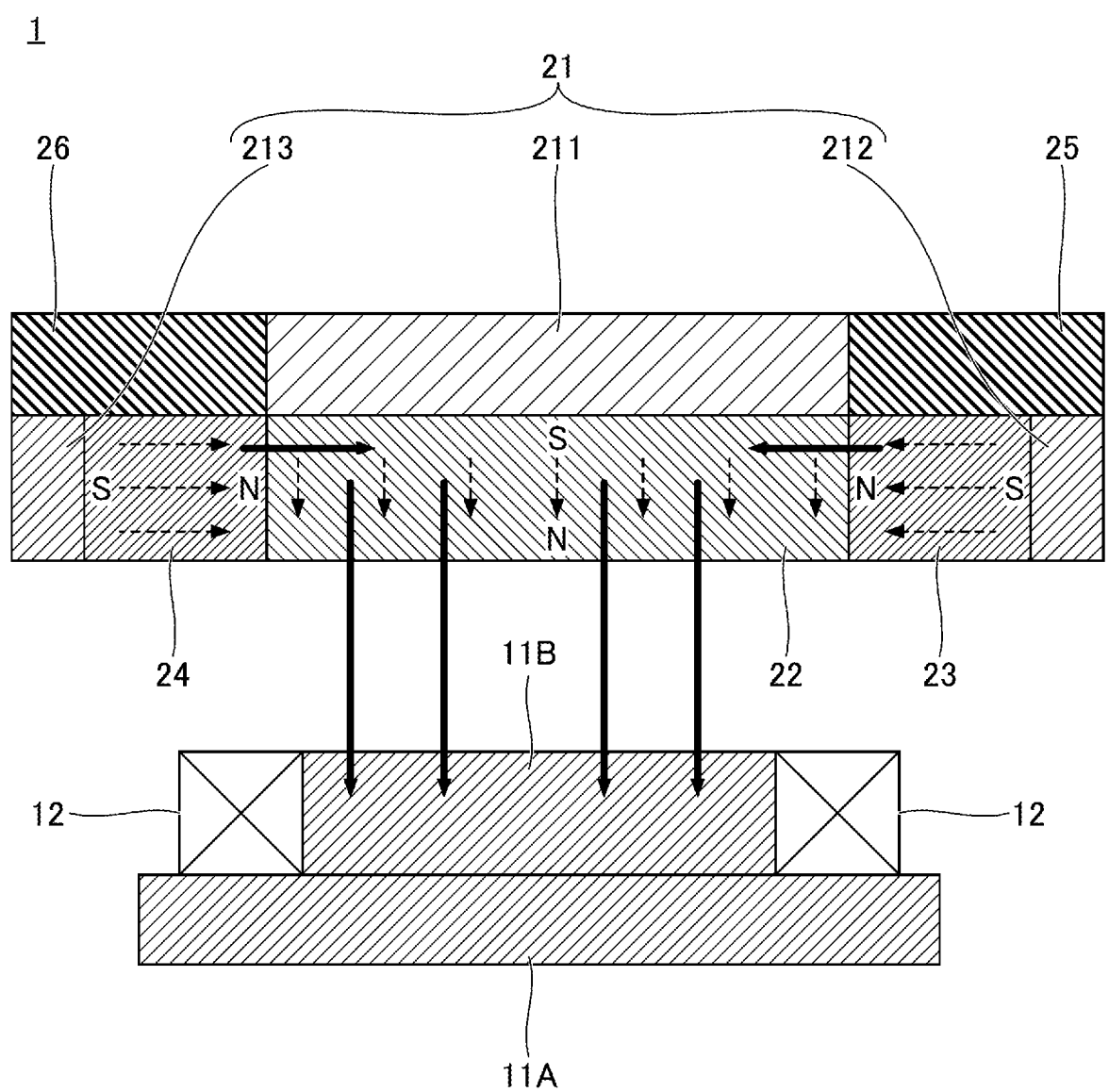
FIG. 3 is a cross-sectional view illustrating an example of an electric motor according to the first embodiment.
Figure 4:
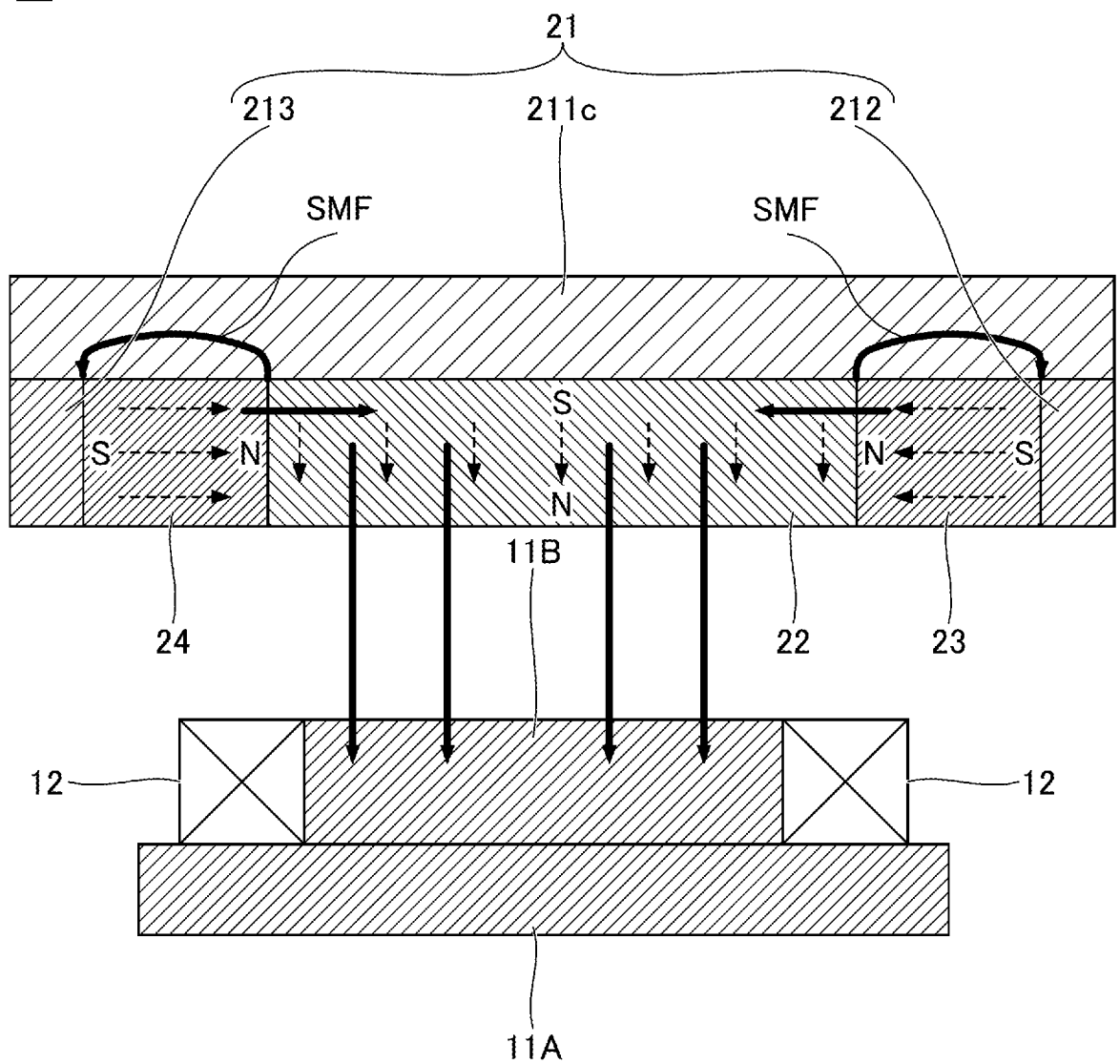
FIG. 4 is a cross-sectional view illustrating the electric motor according to a comparative example.

Next, referring to FIG. 4 in addition to FIG. 1 to FIG. 3, the method for reducing the short-circuit magnetic flux of the auxiliary magnets 23 and 24 of the electric motor 1 according to the first embodiment is explained.

FIG. 4 is a cross-sectional view illustrating the electric motor 1c according to a comparative example. Specifically, FIG. 4 is a longitudinal cross-sectional view of an electric motor 1c, similar to FIG. 3, and the thick solid arrows without reference numerals in FIG. 4 represent the flow of magnetic flux between the auxiliary magnets 23 and 24 and the main magnet 22, and between the main magnet 22 and the stator 10. The electric motor 1c of the comparative example differs from the electric motor 1 of the first embodiment in that the short-circuit reduction members 25 and 25 are omitted and the back yoke part 211 is replaced by a back yoke part 211c.

As illustrated in FIG. 4, the back yoke part 211c of the electric motor 1c of the comparative example is arranged adjacent to the surface on the opposite side of the surface facing the stator 10, of the inner ring part 212, the auxiliary magnet 23, the main magnet 22, the auxiliary magnet 24, and the outer ring part 213, in such a way as to cover the entire radial range of these elements. Further, similar to the back yoke part 211 of the electric motor 1, the back yoke part 211c is formed of, for example, a ferromagnetic material and has relatively low magnetic resistance. Therefore, a magnetic flux SMF (hereafter, "short-circuit magnetic flux") that short-circuits between the two magnetic poles of the auxiliary magnet 23 and between the two magnetic poles of the auxiliary magnet 24 may be generated through the back yoke part 211c. Therefore, there is a possibility that the effect of the auxiliary magnets 23 and 24 to increase the magnetic flux of the magnetic pole on the surface facing the stator 10 in the axial direction of the main magnet 22 is relatively reduced.

On the other hand, as illustrated in FIG. 3, in the electric motor 1 according to the first embodiment, the short-circuit reduction members 25 and 26 having relatively higher magnetic resistance than the members configuring the magnetic path of the rotor 20, such as the back yoke part 211, are provided on the surface on the opposite side of the surface facing the stator 10 of the auxiliary magnets 23 and 24 in the axial direction.

Accordingly, it is possible to realize a state in which the magnetic resistance is relatively higher than that of the members configuring the magnetic path of the rotor 20 such as the back yoke part 211, in the parts around the auxiliary magnets 23 and 24 that face the auxiliary magnets 23 and 24 in parallel with the virtual lines (lines extending in the radial direction) connecting between the two magnetic poles inside each of the auxiliary magnets 23 and 24. Therefore, the short-circuit magnetic flux between the two magnetic poles of each of the auxiliary magnets 23 and 24 can be reduced, and the magnetic flux of the magnetic pole on the surface facing the stator 10 in the axial direction of the main magnet 22 can be increased. Therefore, the output of the electric motor 1 can be further increased.

Second Embodiment

Next, a second embodiment will be described.

Hereafter, the explanation is focused on the different parts from the first embodiment, and the explanation regarding the same parts as or the corresponding parts of the first embodiment may be simplified or omitted. Further, the basic configuration of the electric motor 1 according to the second embodiment is approximately the same as that of the first embodiment, the explanation thereof is omitted, and FIGS. 1 and 2 are used for the explanation of the electric motor 1 according to the second embodiment below.

<Method of Reducing Short-Circuit Magnetic Flux of Auxiliary Magnet>

The method for reducing the short-circuit magnetic flux of the auxiliary magnets 23 and 24 of the electric motor 1 according to the second embodiment will be described with reference to FIGS. 5 and 6.

Figure 5:
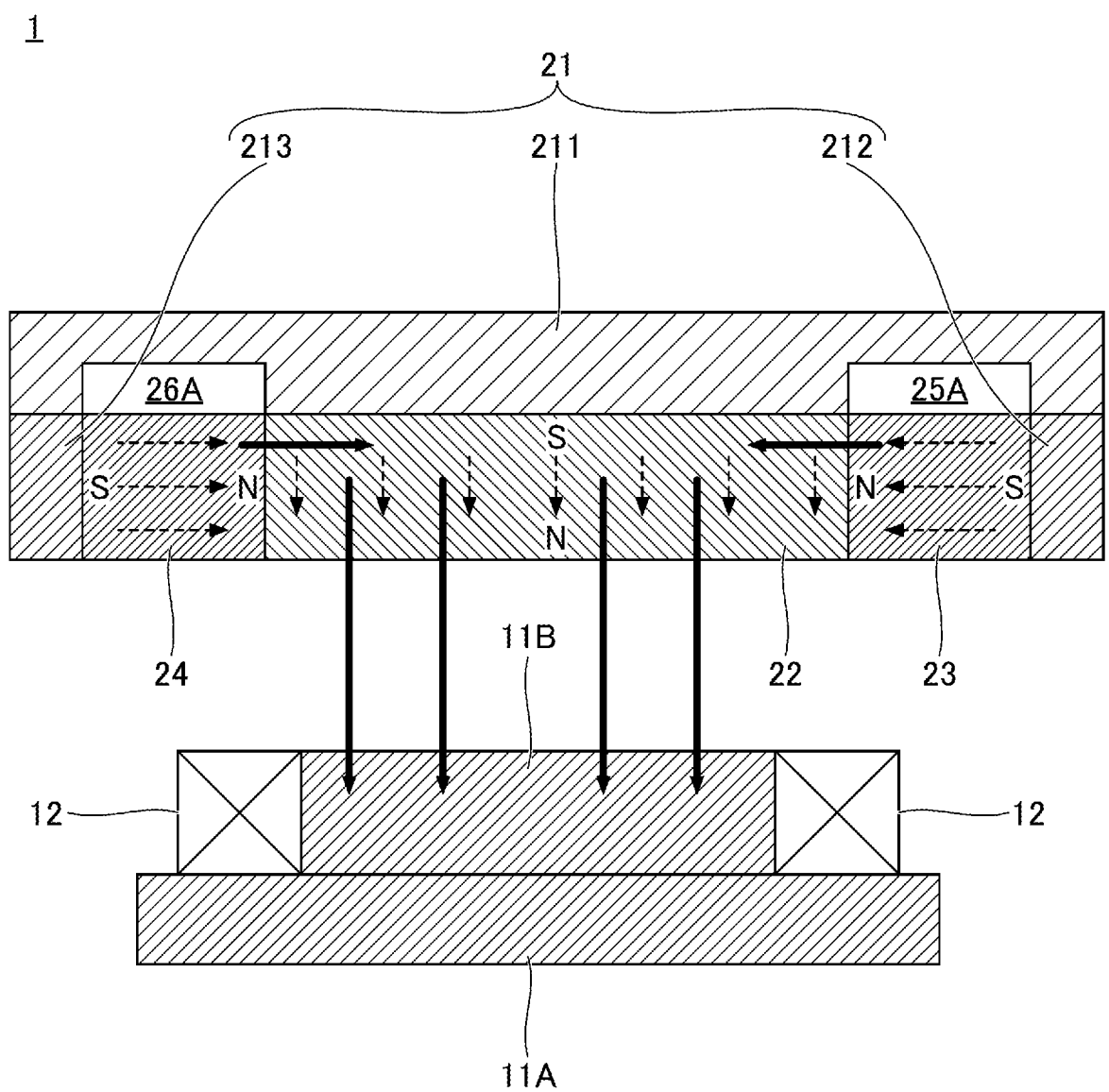
FIG. 5 is a cross-sectional view illustrating an example of an electric motor according to a second embodiment.
Figure 6:
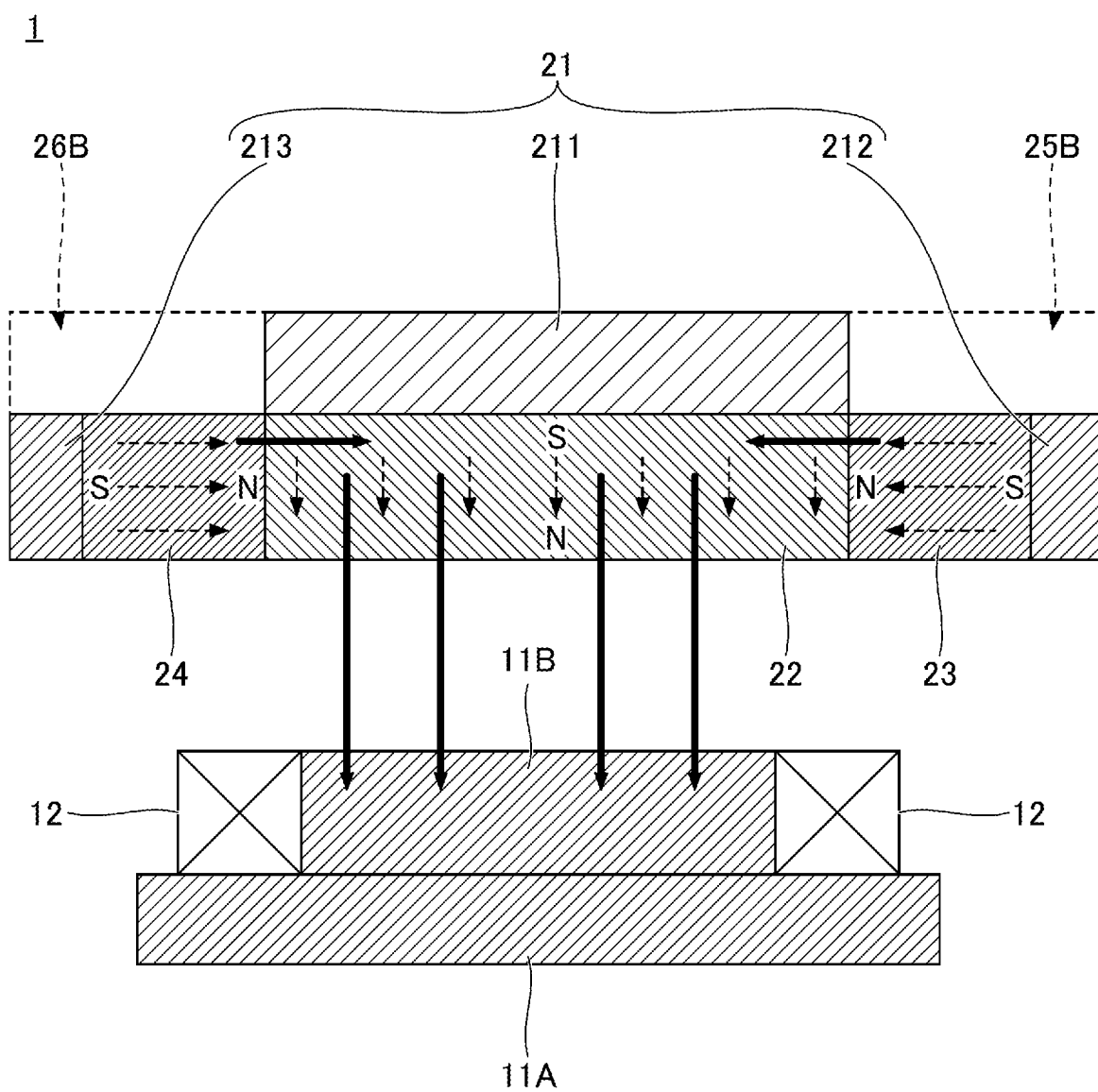
FIG. 6 is a cross-sectional view illustrating another example of an electric motor according to the second embodiment.

FIGS. 5 and 6 are cross-sectional views illustrating one example and another example of the electric motor 1 according to the second embodiment, respectively. Specifically, FIG. 5 and FIG. 6 are a cross-sectional view (longitudinal cross-sectional view) corresponding to line A-A in FIG. 2 for one example and another example of the electric motor 1 according to the second embodiment. The thick solid arrows in FIGS. 5 and 6 represent the flow of magnetic flux between the auxiliary magnets 23 and 24 and the main magnet 22 and the flow of magnetic flux between the main magnet 22 and the stator 10, and the dashed arrows in the figure represent the magnetization direction (magnetization orientation) of the main magnet 22 and the auxiliary magnets 23 and 24.

As illustrated in FIG. 5 and FIG. 6, in the electric motor 1 according to the second embodiment, a space without any member is provided on the surface of the auxiliary magnets 23 and 24 on the opposite side of the surface facing the stator 10 in the axial direction, instead of the short-circuit reduction members 25 and 26.

For example, as illustrated in FIG. 5, the back yoke part 211 of the electric motor 1 in this example is arranged adjacent to the surface of the inner ring part 212, the auxiliary magnet 23, the main magnet 22, the auxiliary magnet 24, the outer ring part 213 on the opposite side of the surface facing the stator 10, and covers the entire radial range of these parts. In the back yoke part 211, a recess is provided in the part facing the auxiliary magnet 23 and the part facing the auxiliary magnet 24 among the entire radial range. Accordingly, voids 25A and 26A (an example of a space without any short-circuit reduction part or member), which have higher magnetic resistance than the members configuring the magnetic path of the rotor 20 such as the back yoke part 211, are provided in the part facing the auxiliary magnets 23 and 24 in parallel with the virtual line connecting the two magnetic poles inside each of the auxiliary magnets 23 and 24. Therefore, short-circuit magnetic flux between the two magnetic poles of each of the auxiliary magnets 23 and 24 can be reduced.

For example, as illustrated in FIG. 6, in the electric motor 1 according to this example, spaces 25B and 26B (an example of a space without any short-circuit reduction part or member) are provided in the portions where the short-circuit reduction members 25 and 26 of the first embodiment are provided. Accordingly, the magnetic resistance of spaces 25B and 26B, which face the auxiliary magnets 23 and 24 in parallel with the virtual line connecting the two magnetic poles inside each of the auxiliary magnets 23 and 24, can be made higher than that of the members configuring the magnetic path of the rotor 20, such as the back yoke part 211. Therefore, short-circuit magnetic flux between the two magnetic poles of the auxiliary magnets 23 and 24 can be reduced.

Accordingly, in the electric motor 1 according to the second embodiment, a space without any member is provided in the portion around the auxiliary magnets 23 and 24 which faces the auxiliary magnets 23 and 24 in parallel with the virtual line (line extending in the radial direction) connecting the two magnetic poles inside each of the auxiliary magnets 23 and 24. Accordingly, the short-circuit magnetic flux between the two magnetic poles of each of the auxiliary magnets 23 and 24 can be reduced, and the magnetic flux of the magnetic pole on the surface of the main magnet 22 facing the stator 10 in the axial direction can be further increased. Therefore, the output of the electric motor 1 can be further increased.

Third Embodiment

Next, a third embodiment will be described.

Hereafter, the explanation is focused on the different parts from the first embodiment, and the explanation regarding the same parts as or the corresponding parts of the first embodiment may be simplified or omitted. The electric motor 1 according to the third embodiment is different only in the configuration of the rotor 20, among the stator 10 and the rotor 20. Therefore, an exploded perspective view representing the entire electric motor 1 including the stator 10 and the rotor 20, which corresponds to FIG. 1, is omitted to explain the electric motor 1 according to the third embodiment by referring to FIG. 1.

<Basic Configuration of Electric Motor>

The basic configuration of the electric motor 1 according to the third embodiment will be described with reference to FIGS. 7 and 8.

Figure 7:
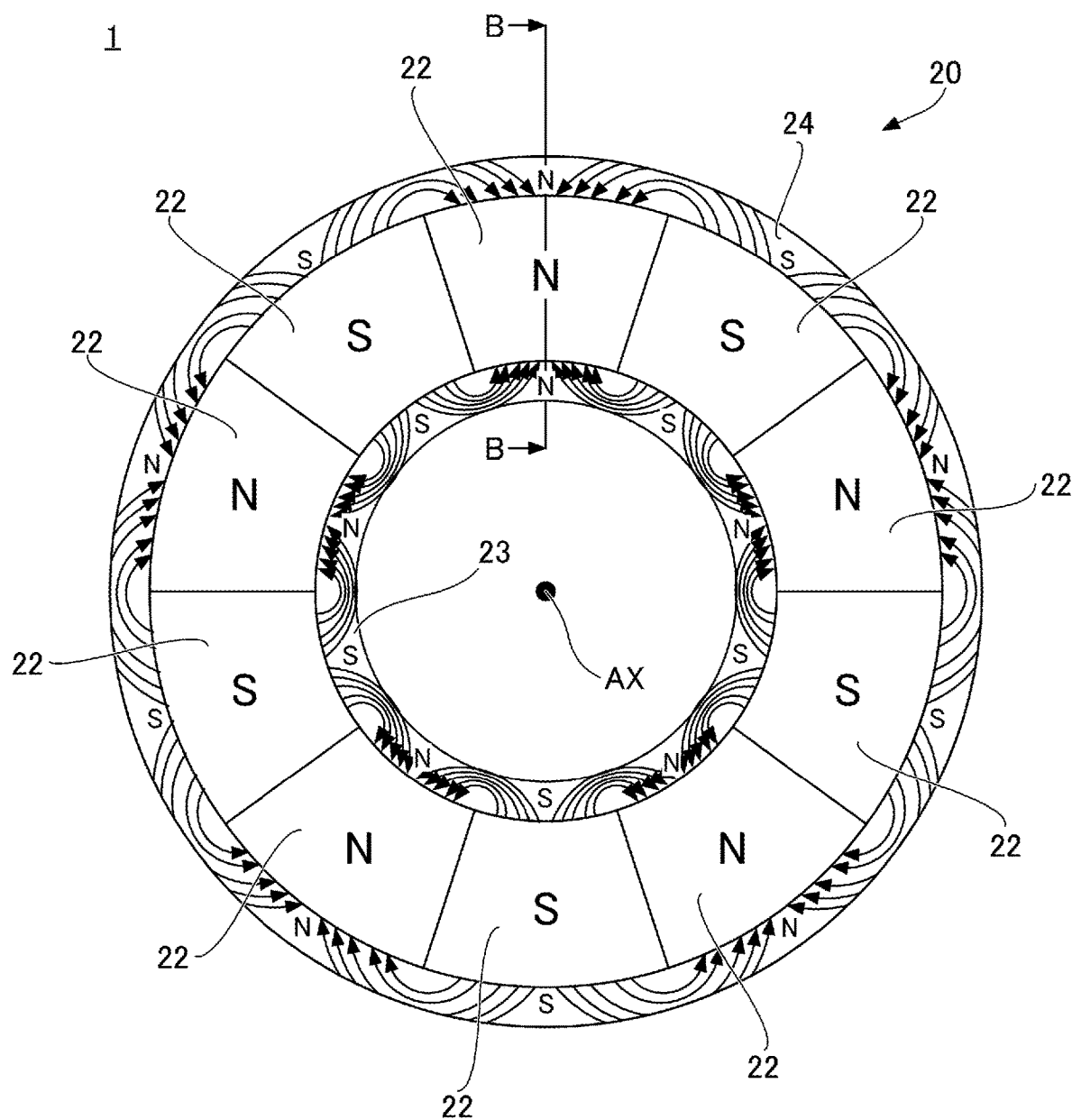
FIG. 7 is a view in the axial direction illustrating an example of a rotor according to a third embodiment.

FIG. 7 is a view in the axial direction illustrating an example of the rotor 20 according to the third embodiment. Specifically, FIG. 7 illustrates the rotor 20 viewed from the axial underside of the exploded perspective view corresponding to FIG. 1, i.e., the rotor 20 viewed from the stator 10, and the thick solid arrows in FIG. 7 illustrate the magnetization orientation (magnetization direction) of the auxiliary magnets 23 and 24. FIG. 8 is a cross-sectional view illustrating an example of the electric motor 1 according to the third embodiment. Specifically, FIG. 8 is a cross-sectional view (longitudinal cross-sectional view) of the electric motor 1 corresponding to line B-B in FIG. 7. The thick solid arrows in FIG. 8 represent the flow of magnetic flux between the auxiliary magnets 23 and 24 and the main magnet 22 and between the main magnet 22 and the stator 10, and the dashed arrows in FIG. 8 represent the magnetization direction (magnetization orientation) of the main magnet 22.

Figure 8:
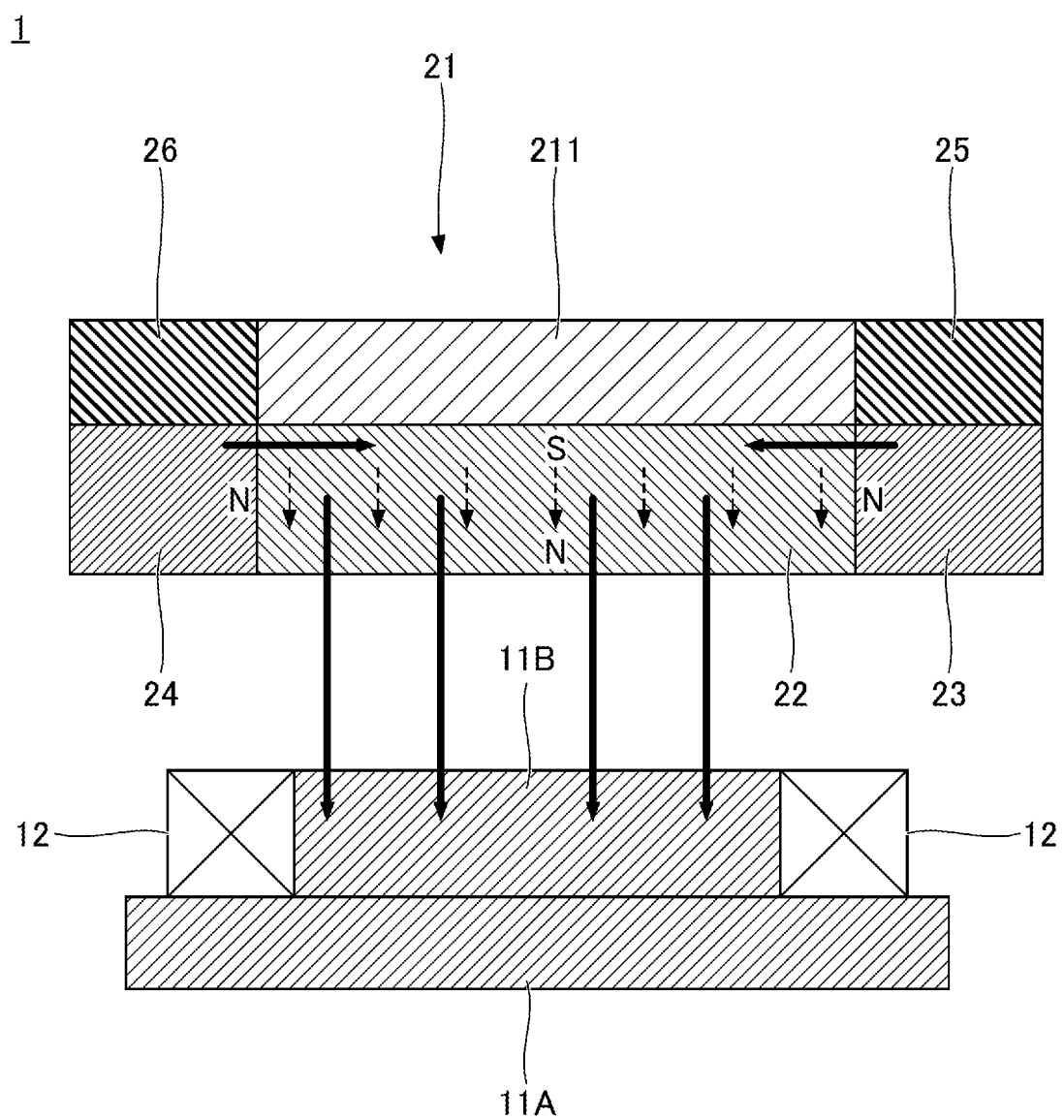
FIG. 8 is a cross-sectional view illustrating an example of an electric motor according to the third embodiment.

As illustrated in FIGS. 7 and 8, the rotor 20 according to the third embodiment includes the rotor core 21, a plurality of the main magnets 22, the auxiliary magnet 23, the auxiliary magnet 24, the short-circuit reduction member 25, and the short-circuit reduction member 26, as in the first embodiment.

The rotor core 21 includes the back yoke part 211, and unlike the first embodiment, the inner ring part 212 and the outer ring part 213 are omitted.

The auxiliary magnet 23 is a ring magnet formed of one member. Unlike the first embodiment, the auxiliary magnet 23 is magnetized in a polar anisotropic magnetization orientation so as to be orthogonal to the magnetization direction (axial direction) of the main magnet 22. Specifically, the auxiliary magnet 23 has two magnetic poles (N-pole and S-pole) that are different in polarity from each other on the outside in the radial direction (an example of a second magnetic pole and a third magnetic pole), and has a Halbach array magnetic circuit structure with no magnetic flux leakage to the inside in the radial direction. Accordingly, a member (that is, the inner ring part 212 of the first embodiment) configuring the magnetic path on the inside in the radial direction of the auxiliary magnet 23 can be omitted.

The auxiliary magnet 23 has a plurality of pairs of magnetic poles (N-pole and S-pole) (in this example, five pairs) spaced apart in the circumferential direction on the outside in the radial direction. Specifically, the auxiliary magnet 23 has the same number of magnetic poles (in this example, 10) as the number of the main magnets 22 at approximately equal intervals in the circumferential direction so that the polarity of the adjacent magnetic poles is different from each other. The auxiliary magnet 23 is arranged such that each of the N and S-poles is adjacent to the inner side in the radial direction of the main magnet 22 in which the N and S-poles are magnetized on the surface facing the stator 10 in the axial direction. This allows the auxiliary magnet 23 to increase (strengthen) the magnetic flux of the magnetic pole at the surface facing the stator 10 in the axial direction of two of the main magnets 22. As illustrated in FIG. 8, the auxiliary magnet 23 is arranged so as not to face the teeth part 11B of the stator 10 in the axial direction.

The auxiliary magnet 24 is a ring magnet formed of one member. The auxiliary magnet 24 is magnetized in a polar anisotropic magnetization orientation unlike the first embodiment.

Specifically, the auxiliary magnet 24 has a magnetic circuit structure of a Halbach array with a pair of magnetic poles on the inside in the radial direction with no magnetic flux leakage to the outside in the radial direction. Accordingly, a member (that is, the outer ring part 213 of the first embodiment) configuring the magnetic path on the outside in the radial direction of the auxiliary magnet 24 can be omitted.

The auxiliary magnet 24 has a pair of magnetic poles (N-pole and S-pole) spaced apart in the circumferential direction on the inside the radial direction. The auxiliary magnet 24 is arranged such that each of the N and S-poles is adjacent to the outside in the radial direction of the main magnet 22 where the N and S-poles are magnetized on the surface facing the stator 10 in the axial direction. This allows the auxiliary magnet 24 to increase (strengthen) the magnetic flux of the magnetic pole at the surface facing the stator 10 in the axial direction in two of the main magnets 22. As illustrated in FIG. 8, the auxiliary magnet 24 is arranged so as not to face the teeth part 11B of the stator 10 in the axial direction.

Unlike the first embodiment, the short-circuit reduction member 25 has an annular shape that covers the entire circumference of the auxiliary magnet 23 as viewed in the axial direction, which is approximately the same range as the radial range in which the auxiliary magnet 23 is provided. That is, in the radial direction, the short-circuit reduction member 25 is arranged in such a manner that the inner circumferential surface and the outer circumferential surface centering around the rotary axial center AX approximately coincide with the inner circumferential surface and the outer circumferential surface of the auxiliary magnet 23, respectively, and is arranged adjacent to the inner side in the radial direction of the back yoke part 211. This is because the inner ring part 212 is omitted, from the first embodiment.

Unlike the first embodiment, the short-circuit reduction member 26 has an annular shape that covers the entire circumference of the auxiliary magnet 24 as viewed in the axial direction, which is approximately the same range as the radial range in which the auxiliary magnet 24 is provided. That is, in the radial direction, the short-circuit reduction member 26 is arranged in such a manner that the inner circumferential surface and the outer circumferential surface centering around the rotary axial center AX approximately coincide with the inner circumferential surface and the outer circumferential surface of the auxiliary magnet 24, respectively, and is arranged adjacent to the outer side in the radial direction of the back yoke part 211. This is because the outer ring part 213 is omitted, from the first embodiment.

Thus, in the electric motor 1 according to the third embodiment, the auxiliary magnets 23 and 24, which are magnetized in a polar anisotropic magnetization orientation, are used. Accordingly, the members (the inner ring part 212 and the outer ring part 213 of the first embodiment) configuring the inner and outer magnetic paths in the radial direction of the auxiliary magnet 23 and the auxiliary magnet 24 can be omitted. Therefore, the size of the electric motor 1 in the radial direction can be reduced.

Fourth Embodiment

Next, a fourth embodiment will be described.

Hereafter, the explanation is focused on the different parts from the first embodiment, and the explanation regarding the same parts as or the corresponding parts of the first embodiment may be simplified or omitted. The electric motor 1 according to the fourth embodiment differs from the first embodiment only in the configuration of the rotor 20 among the stator 10 and the rotor 20. Therefore, an exploded perspective view representing the entire electric motor 1 including the stator 10 and the rotor 20, which corresponds to FIG. 1, is omitted to explain the electric motor 1 according to the fourth embodiment by referring to FIG. 1.

<Basic Configuration of Electric Motor>

First, the basic configuration of the electric motor 1 according to the fourth embodiment will be described with reference to FIGS. 9 and 10.

Figure 9:
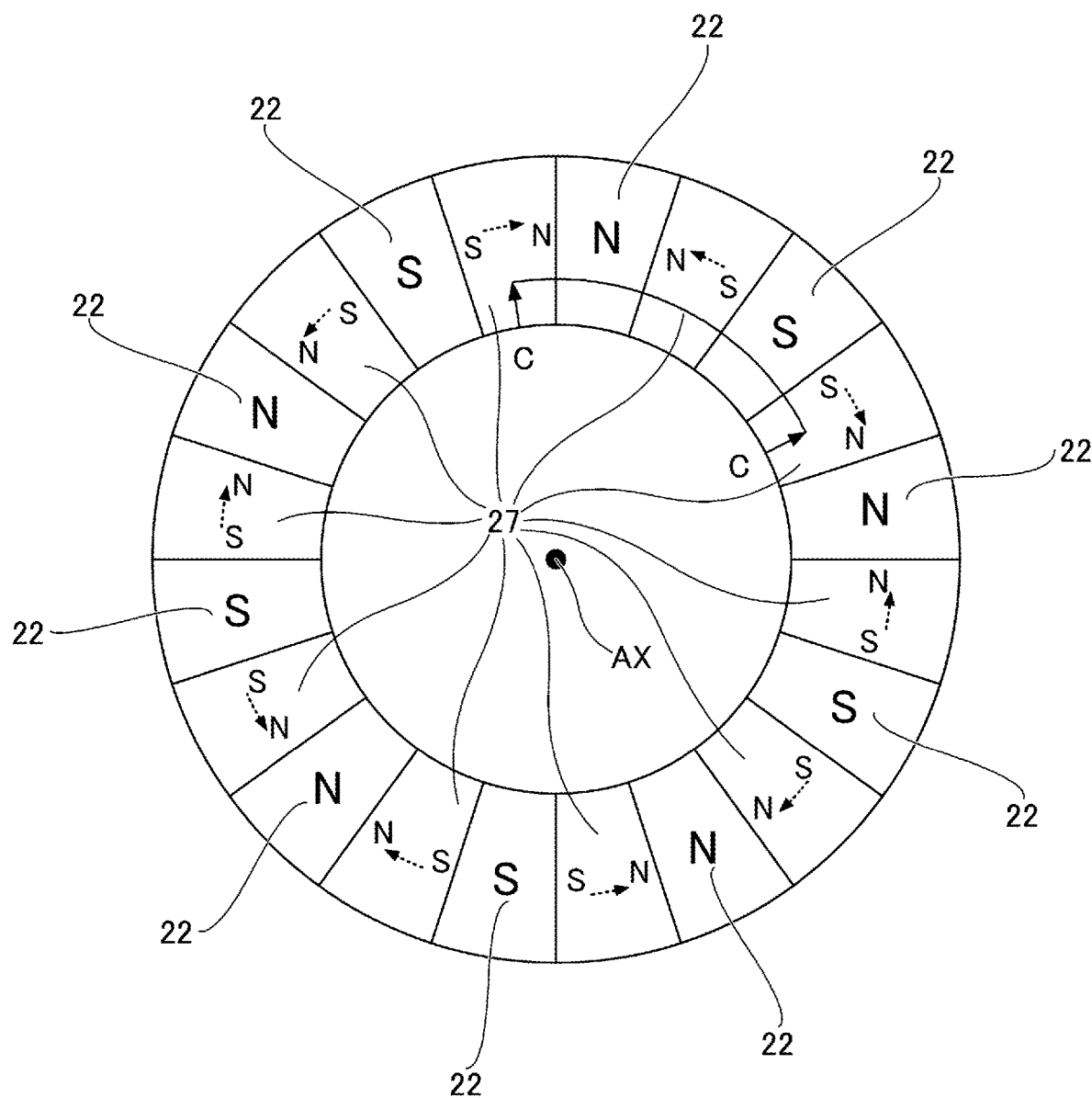
FIG. 9 is a view in the axial direction illustrating an example of a rotor according to a fourth embodiment.

FIG. 9 is a view in the axial direction illustrating an example of the configuration of the rotor 20 according to the fourth embodiment. Specifically, FIG. 9 illustrates the rotor 20 according to the fourth embodiment viewed from the axial underside of the exploded perspective view corresponding to FIG. 1, i.e., the rotor 20 viewed from the stator 10. The dashed arrow in FIG. 10 indicates the magnetization direction (magnetization orientation) of an auxiliary magnet 27. FIG. 10 is a cross-sectional view illustrating an example of the electric motor 1 according to the fourth embodiment. Specifically, FIG. 10 is a cross-sectional view (circumferential cross-sectional view) of the electric motor 1 corresponding to line C-C in FIG. 9. The thick solid arrows in FIG. 10 represent the flow of magnetic flux between the auxiliary magnet 27 and the main magnet 22 and the flow of magnetic flux between the main magnet 22 and the stator 10, and the dashed arrows in FIG. 10 represent the magnetization direction (magnetization orientation) of the main magnet 22 and the auxiliary magnet 27.

Figure 10:
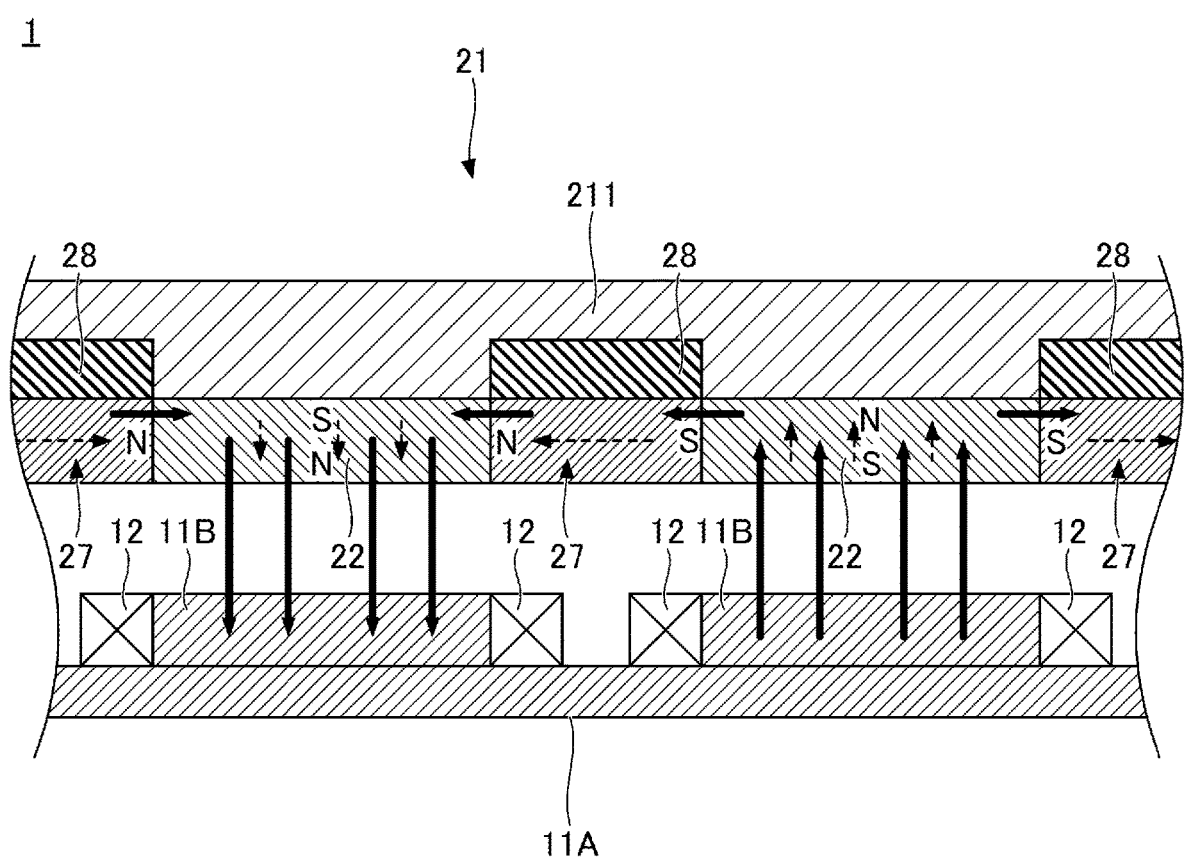
FIG. 10 is a cross-sectional view illustrating an example of an electric motor according to the fourth embodiment.

As illustrated in FIG. 9 and FIG. 10, the rotor 20 according to the fourth embodiment includes the rotor core 21, a plurality of the main magnets 22, a plurality of the auxiliary magnets 27, and a short-circuit reduction member 28.

The rotor core 21 includes the back yoke part 211.

The back yoke part 211 is provided, in the axial direction, adjacent to the surface of the main magnet 22, on the opposite side of the surface of the main magnet 22 facing the stator 10 in the axial direction. The back yoke part 211 has an annular shape in such a manner that, when viewed in the axial direction, the back yoke part 211 covers the entire circumference of approximately the same range as the radial range in which the main magnet 22 is provided. The back yoke part 211 is used as a magnetic path of magnetic flux between the multiple main magnets 22. The back yoke part 211 is provided with a recess to accommodate the short-circuit reduction member 28.

The multiple main magnets 22 (in this example, 10) are arranged side by side at relatively large equal intervals in the circumferential direction. As illustrated in FIG. 10, the main magnet 22 is arranged to face the teeth part 11B of the stator 10 as viewed in the axial direction. Each of the multiple main magnets 22 has an approximately fan-shape in the axial direction and is provided to occupy the same angular width (same circumferential width) centered on the rotary axial center AX. The multiple main magnets 22 are axially magnetized permanent magnets and are arranged in such a manner that the magnetic poles on the surface facing the stator 10 are different between the circumferentially adjacent two main magnets 22, that is, the S and N-poles are alternately arranged on the surface facing the stator 10 in the circumferential direction. The main magnet 22 is, for example, a neodymium sintered magnet, a ferrite magnet, or the like.

The multiple (in this example, 10) auxiliary magnets 27 (one example of the second magnet) are respectively provided adjacent to an end portion in the circumferential direction (one example of the third direction) of the main magnet 22. As illustrated in FIG. 10, the auxiliary magnet 27 is arranged to face the teeth part 11B of the stator 10 in the axial direction. The auxiliary magnet 27, together with the main magnet 22, configures a Halbach array and relatively increases the magnetic flux of the magnetic pole on the surface of the main magnet 22 facing the stator 10 in the axial direction. Thus, the output of the electric motor 1 can be increased.

The multiple auxiliary magnets 27 are each arranged between two circumferentially adjacent main magnets 22. Each of the multiple auxiliary magnets 27 has a fan shape as viewed in the axial direction and is provided to fit within the circumferential distance (angular width) between the two adjacent main magnets 22. Each of the multiple auxiliary magnets 27 is a permanent magnet magnetized in a circumferential direction orthogonal to the magnetization direction (axial direction) of the main magnet 22, and has magnetic poles (N-pole and S-pole) (one example of the second magnetic pole and one example of the third magnetic pole) with different magnetic polarities on one end face and the other end face in the circumferential direction. The auxiliary magnet 27 is arranged such that the N-pole thereof is adjacent to the end portion in the circumferential direction of the main magnet 22 in which the N-pole is magnetized on the surface facing the stator 10 in the axial direction, and the S-pole thereof is adjacent to the end portion in the circumferential direction of the main magnet 22 in which the S-pole is magnetized on the surface facing the stator 10 in the axial direction. Thus, the auxiliary magnet 27 can increase the magnetic flux of the magnetic pole on the surface of the main magnet 22 facing the stator 10. The auxiliary magnet 27 is, for example, a neodymium sintered magnet, a ferrite magnet, or the like.

The short-circuit reduction member 28 (an example of a short-circuit reduction part) is, for example, formed of a material that is non-magnetic and has a relatively higher magnetic resistance than the members that form the magnetic path in the rotor 20, such as the back yoke part 211. The short-circuit reduction member 28 is arranged adjacent to the surface of the auxiliary magnet 27 on the opposite side of the surface facing the stator 10 in such a manner as to cover approximately the same range as the auxiliary magnet 27 as viewed in the axial direction. That is, the number (in this example, 10) of the short-circuit reduction members 28 is the same as the number of the auxiliary magnets 27, and the short-circuit reduction member 28 has an approximately fan-shape that occupies the same range as the auxiliary magnet 27 as viewed in the axial direction. The short-circuit reduction member 28 is provided to be accommodated in the recess of the back yoke part 211 having the same shape as viewed in the axial direction.

<Method of Reducing Short-Circuit Magnetic Flux of Auxiliary Magnet>

Next, with reference to FIG. 10, a method for reducing the short-circuit magnetic flux of the auxiliary magnet 27 of the electric motor 1 according to the fourth embodiment is explained.

As illustrated in FIG. 10, the short-circuit reduction member 28, which has a higher magnetic resistance than the members configuring the magnetic path of the rotor 20 such as the back yoke part 211, is arranged adjacent to the surface of the auxiliary magnet 27 on the opposite side of the surface facing the stator 10 in the axial direction. Accordingly, a state in which the magnetic resistance is relatively higher than that of the members configuring the magnetic path of the rotor 20, such as the back yoke part 211, can be realized in the portion around the auxiliary magnet 27 that faces the auxiliary magnet 27 in parallel with the virtual line (the arc line around the rotary axial center AX) connecting the two magnetic poles inside the auxiliary magnet 27. Therefore, short-circuit magnetic flux between the two magnetic poles of the auxiliary magnet 27 can be reduced. Therefore, the magnetic flux of the magnetic pole on the surface facing the stator 10 of the main magnet 22 can be further increased by using the auxiliary magnet 27.

Fifth Embodiment

Next, a fifth embodiment will be described.
<Basic Configuration of Electric Motor>

First, the basic configuration of the electric motor 1 according to the fifth embodiment will be described with reference to FIGS. 11 to 21.

Figure 11:
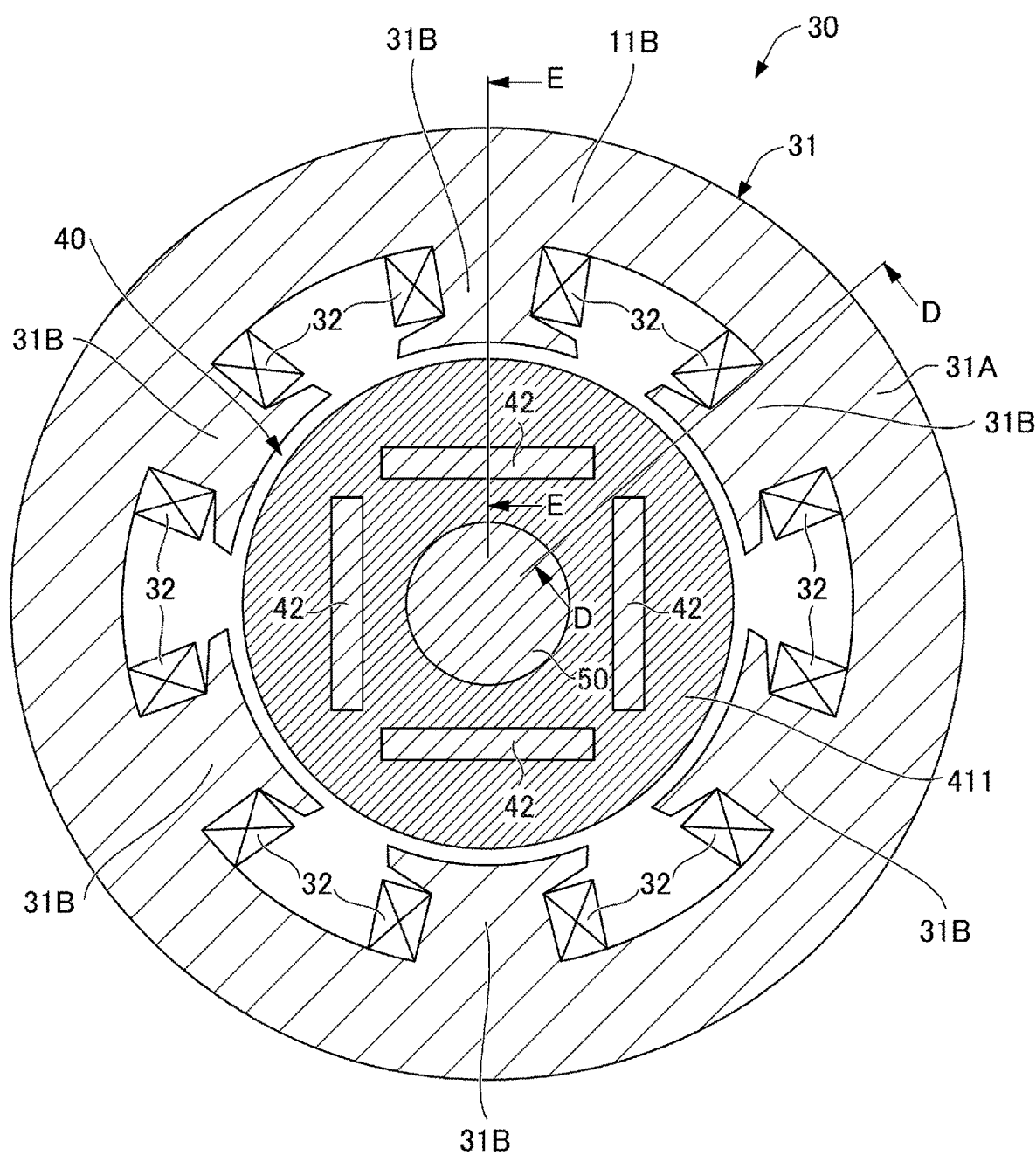
FIG. 11 is a cross-sectional view illustrating an example of an electric motor according to a fifth embodiment.
Figure 12:
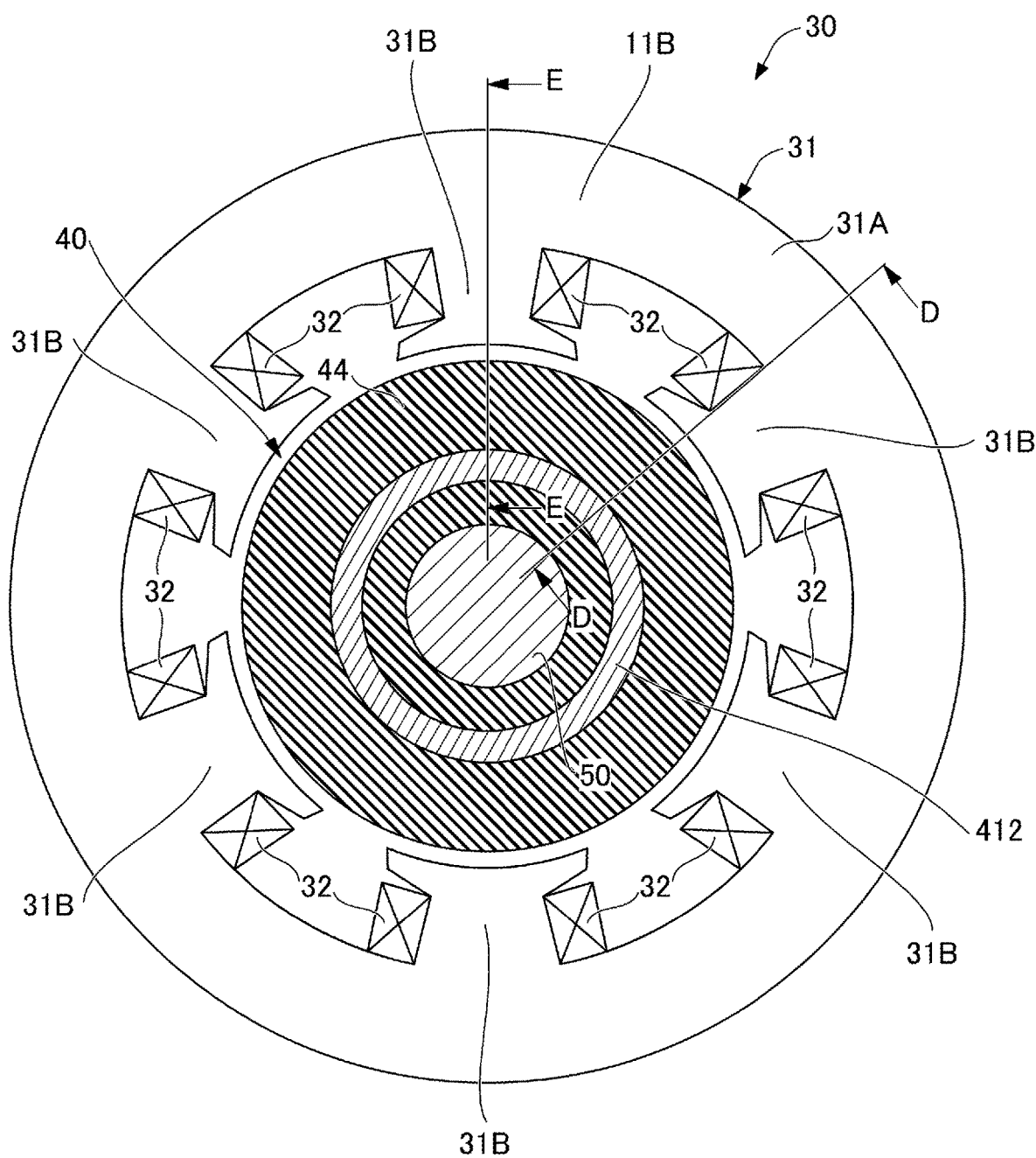
FIG. 12 is a cross-sectional view illustrating an example of an electric motor according to the fifth embodiment.
Figure 13:
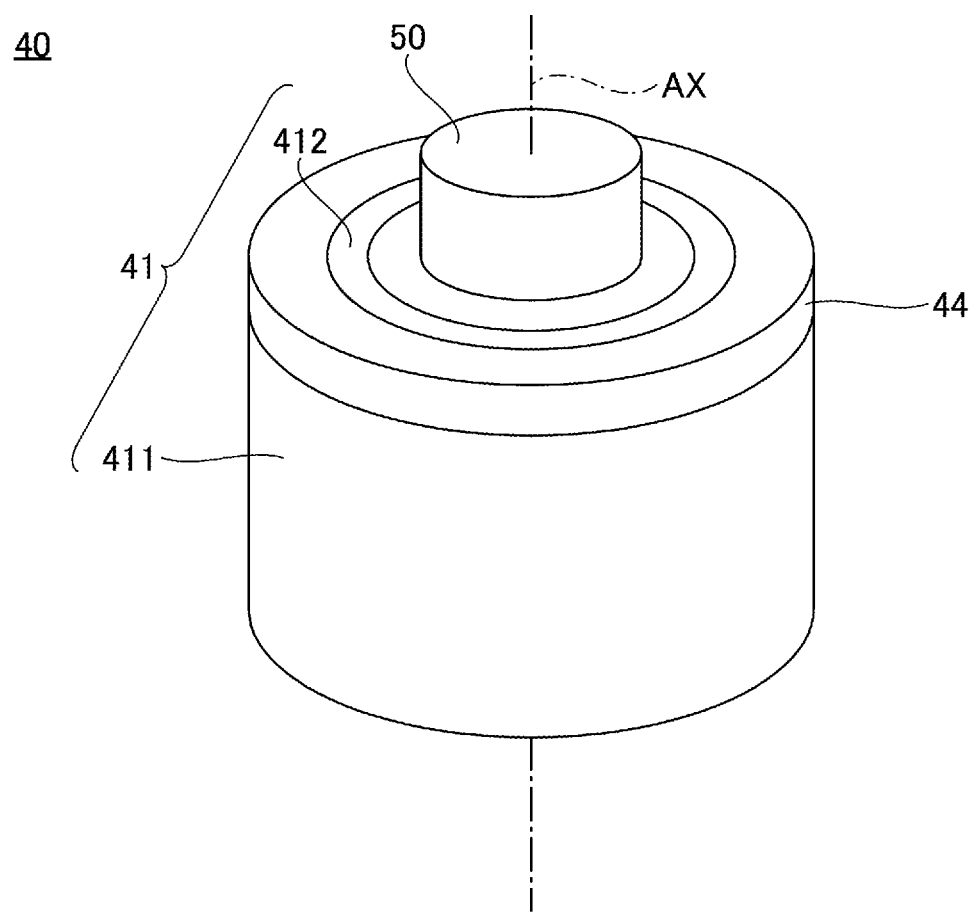
FIG. 13 is a perspective view illustrating an example of a rotor according to the fifth embodiment.
Figure 14:
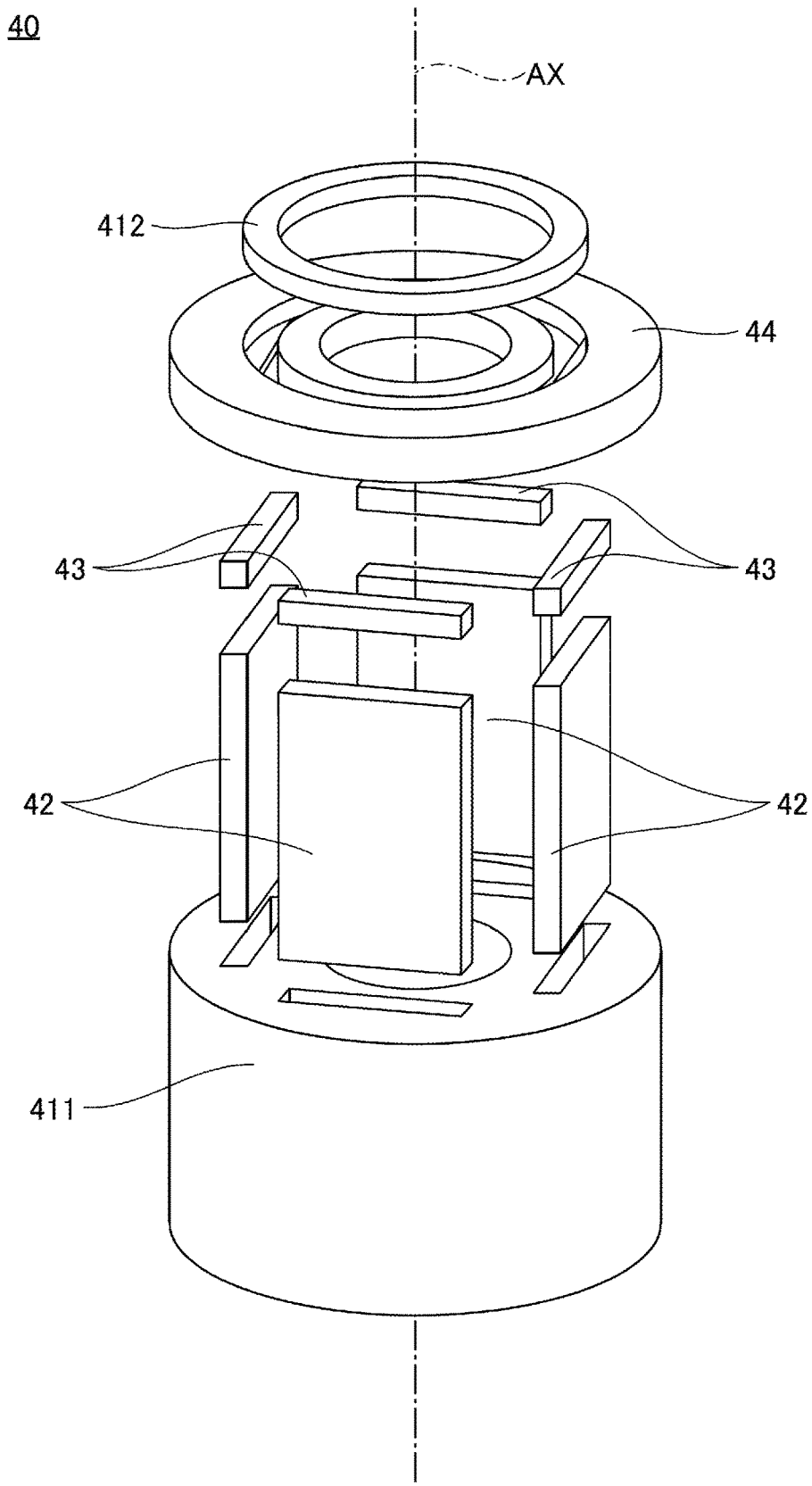
FIG. 14 is an exploded perspective view illustrating an example of a rotor according to the fifth embodiment.
Figure 15:
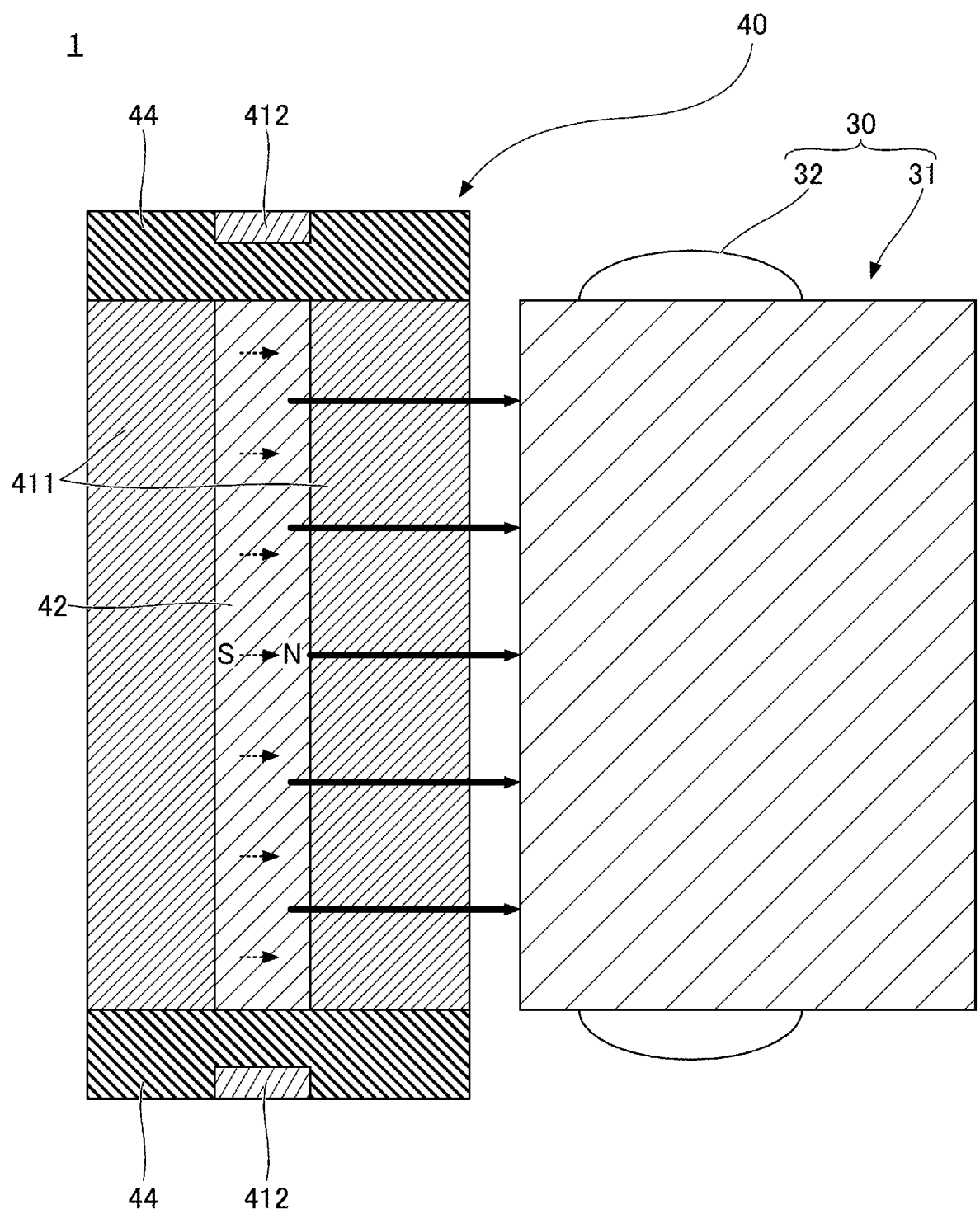
FIG. 15 is a longitudinal cross-sectional view illustrating an example of an electric motor according to the fifth embodiment.
Figure 16:
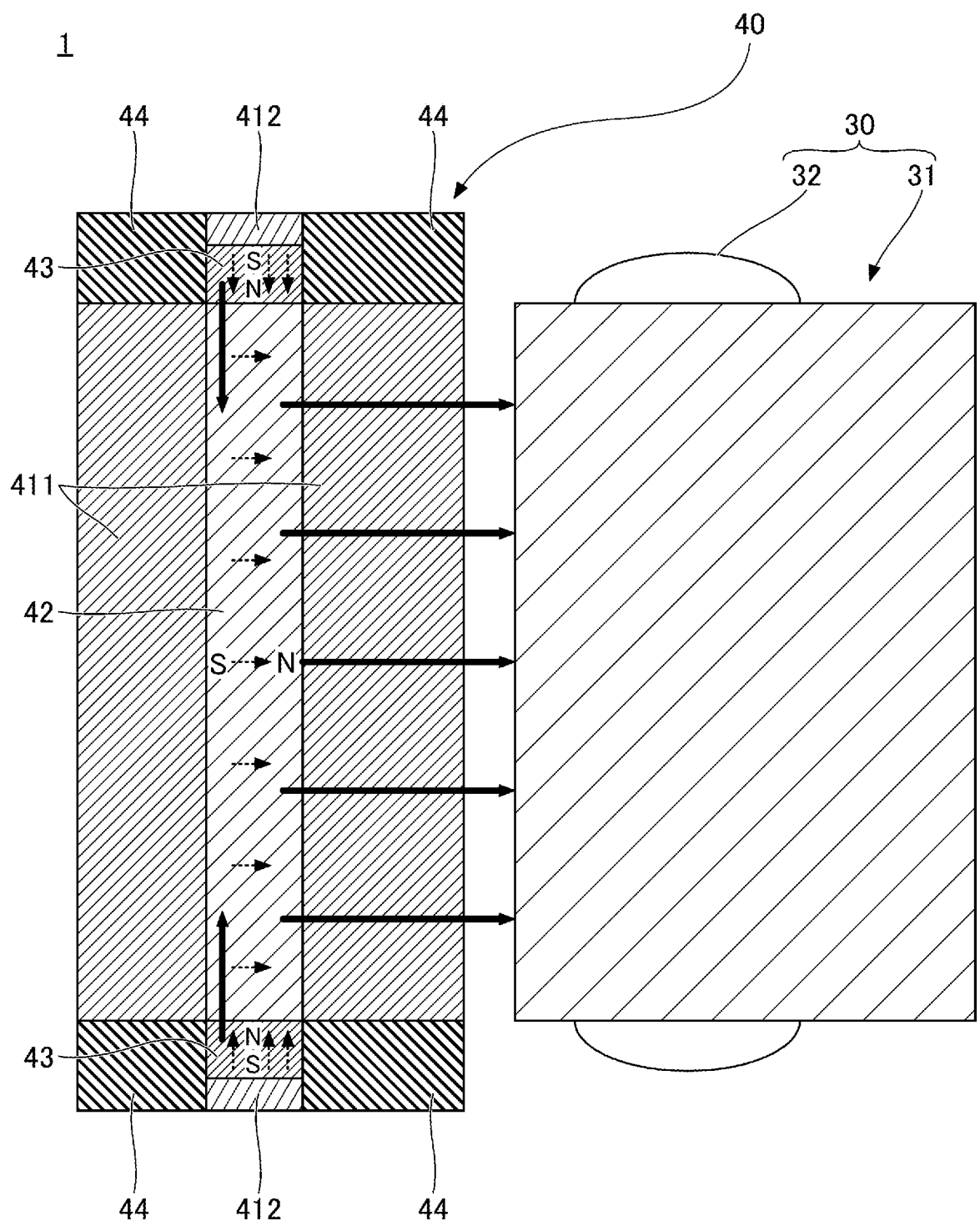
FIG. 16 is a longitudinal cross-sectional view illustrating an example of an electric motor according to the fifth embodiment.
Figure 17:
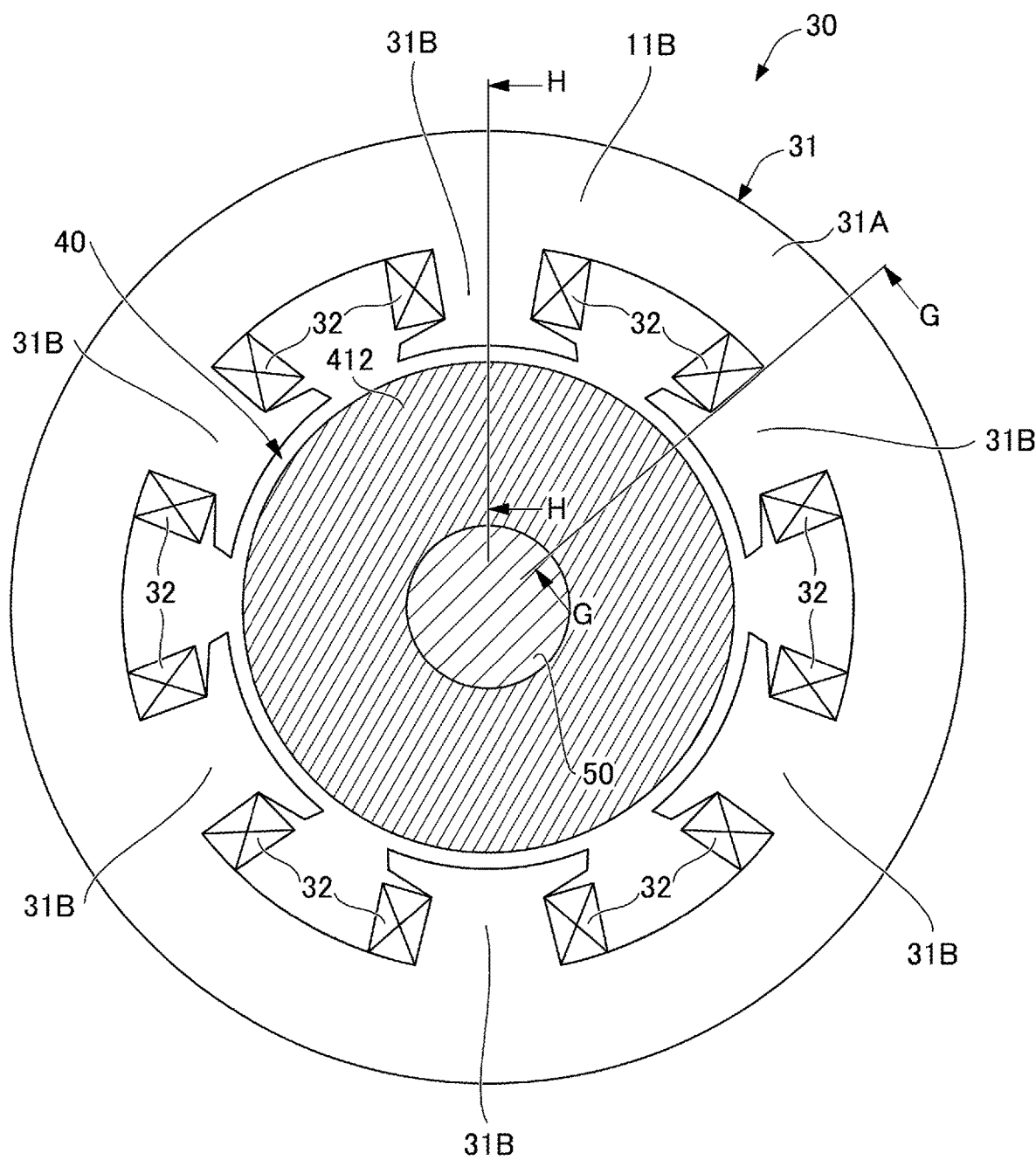
FIG. 17 is a cross-sectional view illustrating another example of an electric motor according to the fifth embodiment.
Figure 18:
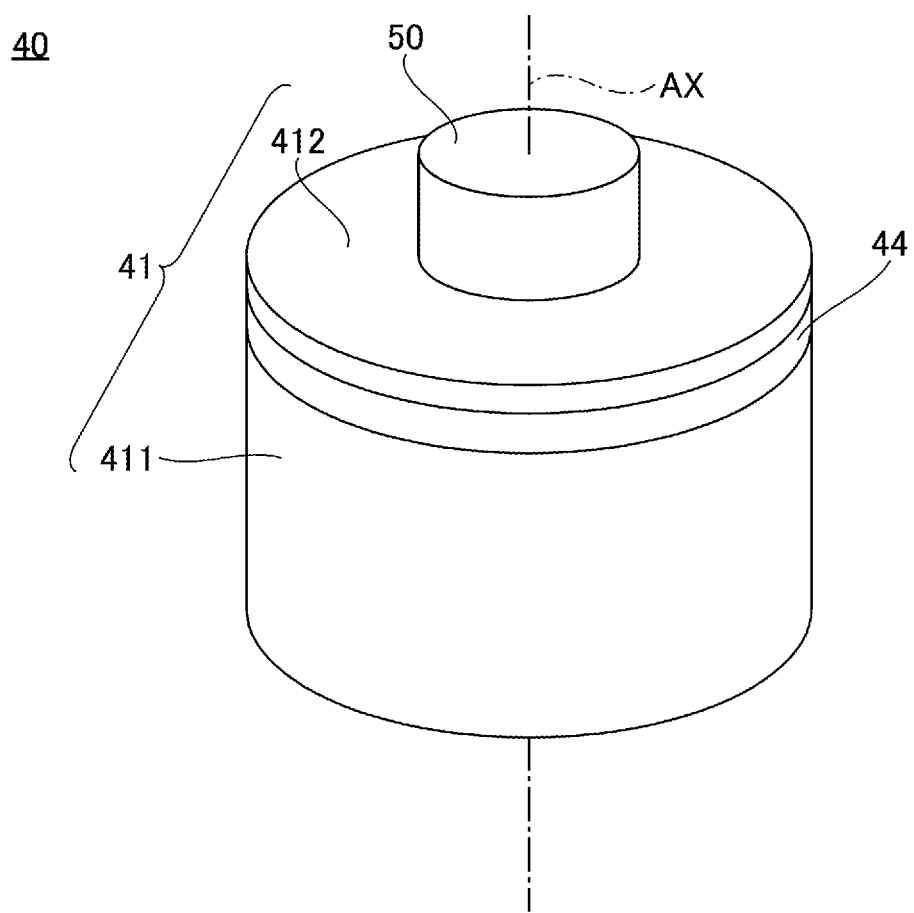
FIG. 18 is a perspective view illustrating another example of a rotor according to the fifth embodiment.
Figure 19:
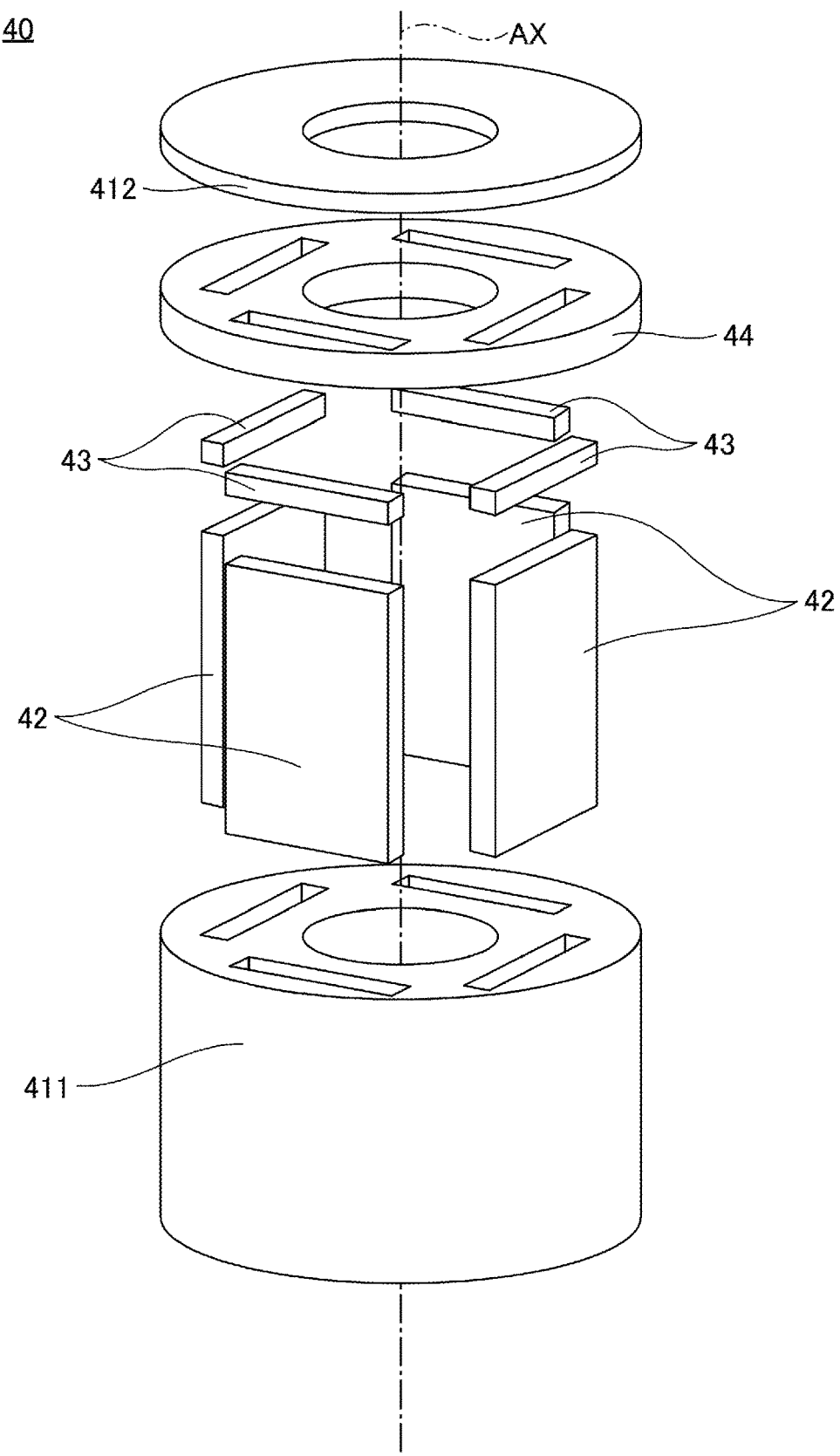
FIG. 19 is an exploded perspective view illustrating another example of a rotor according to the fifth embodiment.
Figure 20:
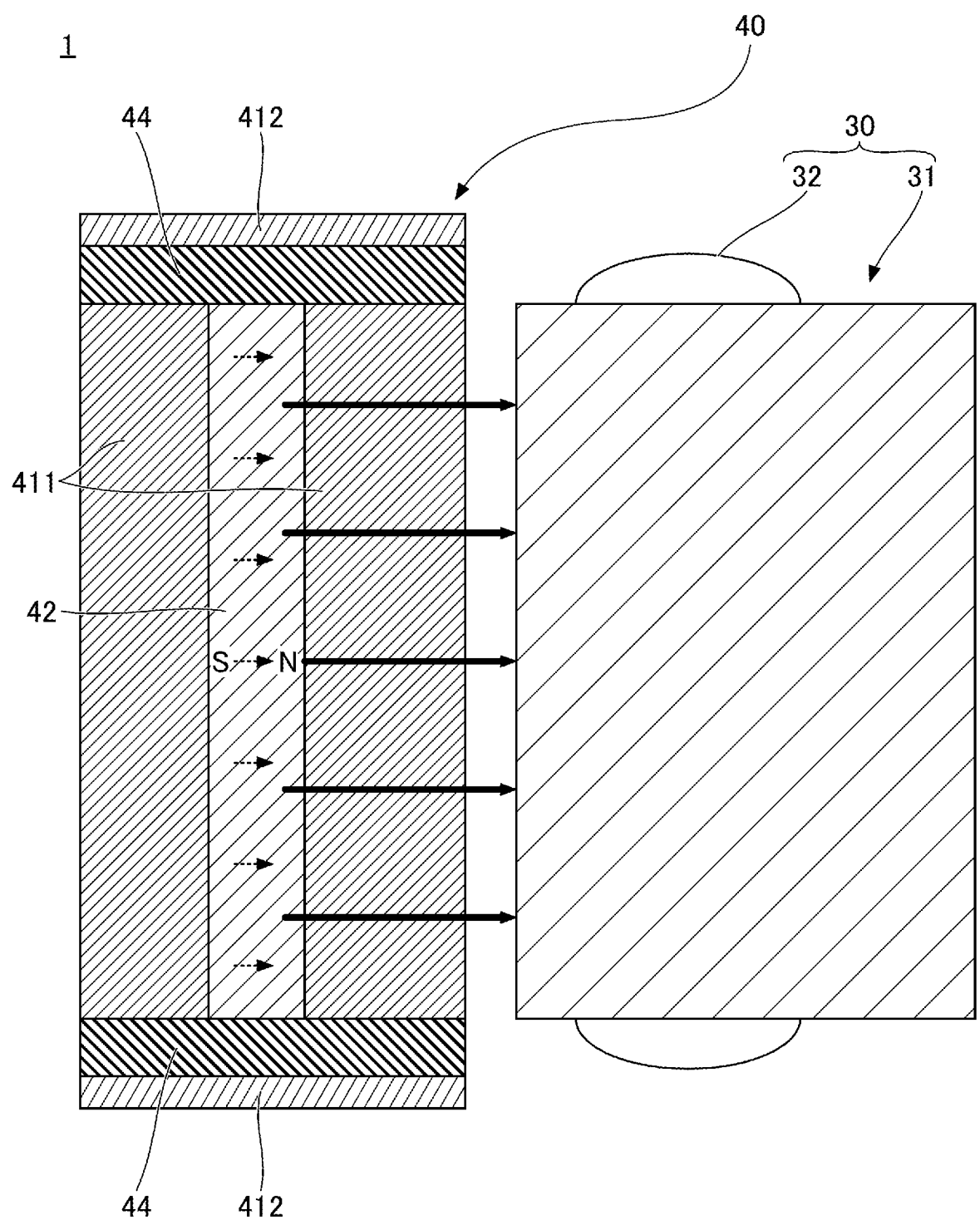
FIG. 20 is a longitudinal cross-sectional view illustrating another example of an electric motor according to the fifth embodiment.
Figure 21:
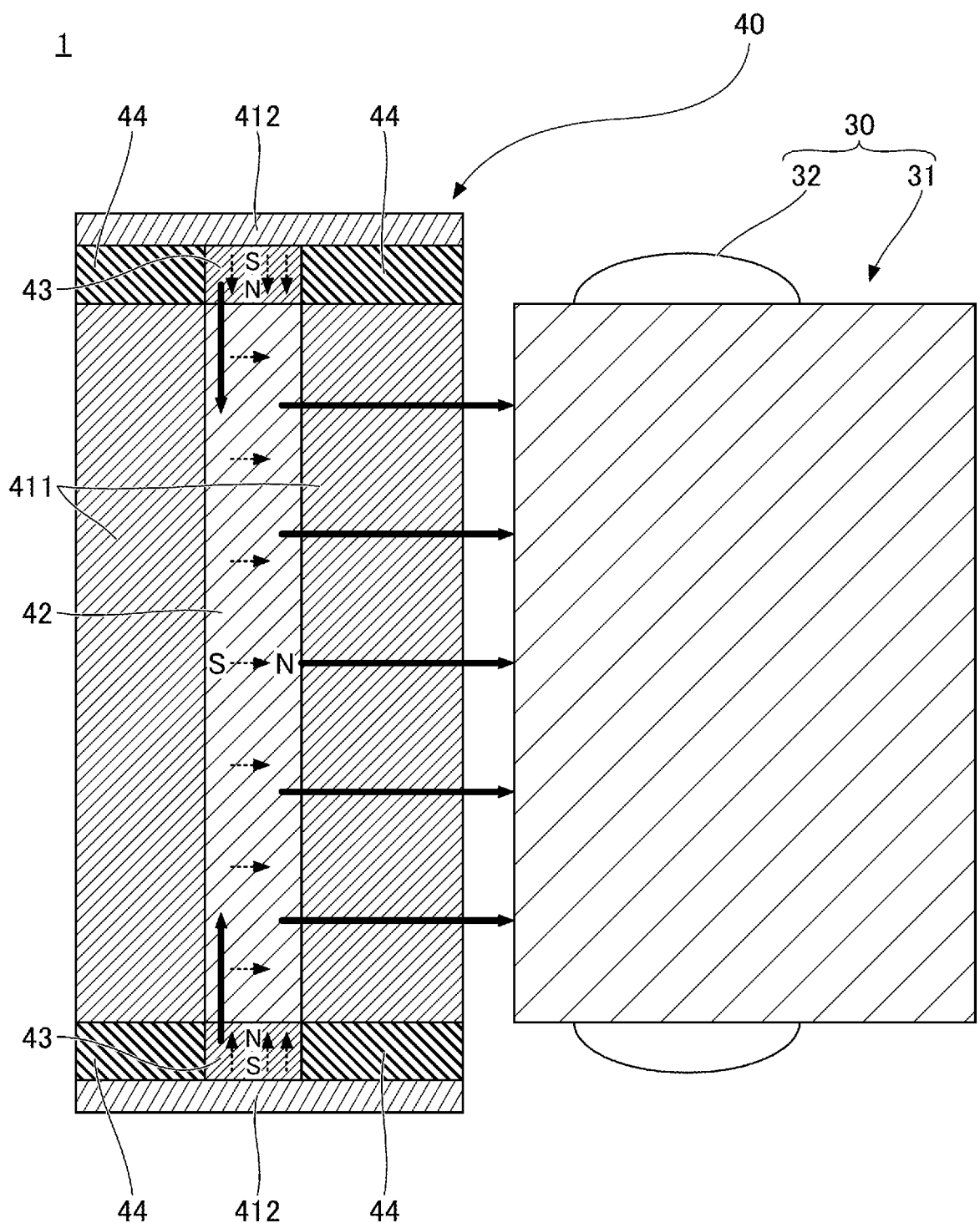
FIG. 21 is a longitudinal cross-sectional view illustrating another example of an electric motor according to the fifth embodiment.

FIG. 11 and FIG. 12 are cross-sectional views illustrating an example of the electric motor 1 according to the fifth embodiment. Specifically, FIG. 11 is a cross-sectional view at the center in the axial direction of the electric motor 1, and FIG. 12 is a cross-sectional view at the end portion in the axial direction of the electric motor 1. FIG. 13 is a perspective view illustrating an example of a rotor 40 according to the fifth embodiment. FIG. 14 is an exploded perspective view illustrating an example of the rotor 40 according to the fifth embodiment. In FIG. 13 and FIG. 14, the range from the center to one end in the axial direction of the rotor 40 is illustrated, and the range from the center to the other end is omitted. Further, the drawing of a rotary shaft member 50 is omitted in FIG. 14. FIG. 15 and FIG. 16 are longitudinal cross-sectional views illustrating an example of the electric motor 1 according to the fifth embodiment. Specifically, FIG. 15 and FIG. 16 are cross-sectional views corresponding to lines D-D and E-E in FIG. 11 and FIG. 12, respectively, for one example of the electric motor 1 according to the fifth embodiment. The thick solid arrows in FIGS. 15 and 16 represent the flow of the magnetic flux between an auxiliary magnet 43 and the main magnet 42, and the flow of the magnetic flux between the main magnet 42 and the stator 30. The dashed arrows in FIG. 15 represent the magnetization direction (magnetization orientation) of the main magnet 42, and the dashed arrows in FIG. 16 represent the magnetization direction (magnetization orientation) of the main magnet 42 and the auxiliary magnet 43. FIG. 17 is a cross-sectional view illustrating another example of the electric motor 1 according to the fifth embodiment. Specifically, FIG. 17 is a cross-sectional view at the end in the axial direction of the electric motor 1. FIG. 18 is a perspective view illustrating the other example of the rotor 40 according to the fifth embodiment. FIG. 19 is an exploded perspective view illustrating the other example of the rotor 40 according to the fifth embodiment. In FIG. 18 and FIG. 19, the range from the center to one end in the axial direction of the rotor 40 is illustrated, and the range from the center to the other end is omitted. Further, the drawing of the rotary shaft member 50 is omitted in FIG. 19. FIGS. 20 and 21 are longitudinal cross-sectional views illustrating the other example of the electric motor 1 according to the fifth embodiment. Specifically, FIG. 20 and FIG. 21 are cross-sectional views corresponding to the G-G line and the H-H line of FIG. 17 of the other example of the electric motor 1 according to the fifth embodiment, respectively. The thick solid arrows in FIGS. 20 and 21 represent the flow of the magnetic flux between the auxiliary magnet 43 and the main magnet 42, and the flow of the magnetic flux between the main magnet 42 and the stator 30. The dashed arrows in FIG. 20 represent the magnetization direction (magnetization orientation) of the main magnet 42, and the dashed arrows in FIG. 21 represent the magnetization direction (magnetization orientation) of the main magnet 42 and the auxiliary magnet 43.

The cross-sectional view of the central part in the axial direction of the other example of the electric motor 1 according to the fifth embodiment is the same as that in FIG. 11, and, therefore, the illustration is omitted. In FIG. 12 and FIG. 17, the cross-sectional view of the electric motor 1 at the position in the axial direction where only the rotor 40 exists among the stator 30 and the rotor 40 is illustrated, and the state viewed from the axial direction of the stator 30 and the cross-section of the rotor 40 are illustrated.

The electric motor 1 according to the fifth embodiment is installed in, for example, a blower, a compressor, or the like of an air conditioner. The same may be applied to the electric motor 1 in the sixth to ninth embodiments described below.

As illustrated in FIGS. 11 to 21, the electric motor 1 includes a stator 30, the rotor 40, and the rotary shaft member 50. The electric motor 1 according to the fifth embodiment is what is referred to as radial gap type in which the stator 30 and a rotor 40 face each other in the radial direction (one example of the first direction) with a predetermined gap (air gap). The electric motor 1 according to the fifth embodiment is an interior permanent magnet type (IPM) in which the main magnet 42 is embedded in a main yoke part 411 of the rotor 40.

The stator 30 is arranged on the outer peripheral side of the electric motor 1 and fixed to a housing that is not illustrated. The stator 30 includes a stator core 31 and a winding 32.

The stator core 31 is formed by a ferromagnetic material such as, for example, an electromagnetic steel plate, a compacted magnetic core, etc. The stator core 31 includes a back yoke part 31A having an approximately cylindrical shape and a plurality of (in this example, six) teeth parts 31B projecting radially from the inner circumferential surface of the back yoke part 31A.

The multiple teeth parts 31B are arranged at approximately equal intervals in the circumferential direction on the inner peripheral surface of the back yoke part 31A. Between the two circumferentially adjacent teeth parts 31B, a slot (hereafter, a "coil slot") is formed to accommodate the winding 32. In this example, six coil slots are formed.

The winding 32 is wound around each of the multiple teeth parts 31B by a centralized winding system. An insulating member such as an insulating film made of PET, for example, is interposed between the winding 32 and the teeth part 31B.

Note that the winding 32 may be wound so as to straddle the multiple teeth parts 31B by a distributed winding system. The number of teeth parts 31B, that is, the number of coil slots formed between the two adjacent teeth parts 31B, may also be five or less, or seven or more.

The rotor 40 is arranged to face the inside in the radial direction of the stator 30 and is provided rotatably in the circumferential direction (one example of the second direction) orthogonal to the radial direction. The rotor 40 includes a rotor core 41, a plurality of main magnets 42, a plurality of auxiliary magnets 43, and a short-circuit reduction member 44.

The rotor core 41 is an element that configures a magnetic path in the magnetic field caused by the current flowing through the winding 32 of the stator 30, and a magnetic path in the magnetic field of the main magnet 42 and the auxiliary magnet 43, among the elements of the rotor 40. The rotor core 41 is formed by a ferromagnetic material such as, for example, an electromagnetic steel plate, a compacted magnetic core, etc. The rotor core 41 includes the main yoke part 411 and an auxiliary yoke part 412.

The main yoke part 411 (one example of the first member) is used as a magnetic path in a magnetic field caused by an electric current flowing through the winding 32 of the stator 30, and a magnetic path in the magnetic field of the main magnet 42. The main yoke part 411 has an approximately cylindrical shape and is fixed to the rotary shaft member 50. As illustrated in FIG. 14, the rotor core 41 is provided with a space (hereafter, "main magnet slot") for embedding each of the multiple main magnets 42. At the end of the main magnet slot in the direction orthogonal to the direction of the main magnetic flux of the main magnet 42, a cavity may be formed with the main magnet 42 embedded. The cavity serves as a flux barrier to reduce short-circuiting of magnetic flux at the end of the main magnet 42. Further, the function of the flux barrier may be ensured by filling the cavity with a material with lower permeability than the rotor core 41.

The auxiliary yoke part 412 is configured as a magnetic path in the magnetic field of the multiple auxiliary magnets 43. As described later, the auxiliary yoke part 412 is provided adjacent to the outside in the axial direction of each of the auxiliary magnets 43 provided at both ends in the axial direction of the main magnet 42.

For example, as illustrated in FIGS. 12 to 16, the auxiliary yoke part 412 has an annular shape that covers a part of each of the multiple auxiliary magnets 43 as viewed in the axial direction.

Further, for example, as illustrated in FIGS. 17 to 21, the auxiliary yoke part 412 may have a disk shape that occupies the entire rotor 40 as viewed in the axial direction, and a through hole through which the rotary shaft member 50 penetrates may be provided in the central part. In this example, the auxiliary yoke part 412 is arranged at the end of the rotor 40 so as to be adjacent to the multiple auxiliary magnets 43 and the short-circuit reduction member 44 in which and the multiple auxiliary magnets 43 are embedded.

The multiple (in this example, four) main magnets 42 (one example of the first magnet) are respectively embedded in the rotor core 41 (the main yoke part 411).

The number of main magnets 42 may also be 3 or less or 5 or more, respectively. The same may be applied to the case of the sixth embodiment described below.

The multiple main magnets 42 are spaced equally in the circumferential direction at predetermined radial positions of the main yoke part 411. As illustrated in FIG. 16 and FIG. 21, the main magnet 42 is arranged to face the teeth part 31B of the stator 30 in the radial direction. The main magnet 42 is, for example, a neodymium sintered magnet, a ferrite magnet, or the like.

Each of the multiple main magnets 42 has an approximately rectangular shape with one side sufficiently long relative to the other as viewed in the axial direction, and is arranged in such a manner that the long side is approximately orthogonal in the radial direction at approximately the center. The multiple main magnets 42 are magnetized such that each has magnetic poles (N-pole and S-pole) (an example of the first magnetic pole and the fourth magnetic pole) with different magnetic polarities at both ends in the short-side direction.

Each of the multiple main magnets 42 is arranged such that the magnetic pole magnetized on the surface facing the stator 30 is different from that of another one of the main magnets 42 that is arranged adjacent in the circumferential direction. For example, if an S-pole is magnetized on the surface of one main magnet 42 that faces the stator 30, an N-pole is magnetized on the surface that faces the stator 30 of another main magnet 42 that is circumferentially adjacent to one main magnet 42.

The main magnet 42 may have a shape other than an elongated rectangular shape as viewed in the axial direction. For example, the main magnet 42 may have a V or U shape that is protruding inward in the radial direction as viewed in the axial direction. When the main magnet 42 has a V-shape as viewed in the axial direction, a V-shape may be realized by a combination of 2 magnet members having an elongated rectangular shape. In this case, the two magnet members are arranged magnetically in parallel. Further, when the main magnet 42 has a U-shape as viewed in the axial direction, a U-shape (that is, arc type) configured in a curved shape may be realized by one magnet member. Further, a U-shape may be realized by a combination of multiple (for example, three) magnet members having an elongated rectangular shape. In this case, the three magnet members are arranged magnetically in parallel. Further, the main magnets 42 may be arranged in such a manner that a plurality of the main magnets 42 are arranged in series magnetically in the radial direction.

Multiple (in this example, 8) auxiliary magnets 43 (one example of a second magnet) are arranged adjacent to both ends in the axial direction of the main magnet 42. As illustrated in FIG. 16 and FIG. 21, the auxiliary magnet 43 is arranged so as not to face the teeth part 31B of the stator 30 in the radial direction. The auxiliary magnet 43 is, for example, a neodymium sintered magnet, a ferrite magnet, or the like. The auxiliary magnet 43, together with the main magnet 42, configures a Halbach array and relatively increases the magnetic flux of the magnetic pole on the surface of the main magnet 42 facing the stator 30. Thus, the output of the electric motor 1 can be increased.

The auxiliary magnet 43 has approximately the same elongated rectangular shape as the main magnet 42 as viewed in the axial direction. Each of the multiple auxiliary magnets 43 is magnetized in the axial direction orthogonal to the magnetization direction of the main magnet 42, and has magnetic poles (N-pole and S-pole) with different magnetic polarities on the inside and outside of the axial direction (an example of the second magnetic pole and the third magnetic pole). Specifically, the auxiliary magnet 43 is magnetized in the axial direction such that the same magnetic pole as the magnetic pole on the surface facing the stator 30 in the radial direction of the adjacent main magnet 42, is on the inside in the axial direction, that is, on the side adjacent to the main magnet 42. For example, as illustrated in FIG. 16, when the magnetic pole on the surface facing the stator 30 in the radial direction is an N-pole, the auxiliary magnets 43 at both ends in the axial direction are magnetized in the axial direction such that the N-pole is at the inner end and the S-pole is at the outer end in the axial direction. Thus, the two auxiliary magnets 43 at both ends can increase (strengthen) the magnetic flux of the magnetic pole at the surface facing the stator 30 of the adjacent main magnet 42.

The short-circuit reduction member 44 (an example of a short-circuit reduction part) is, for example, a non-magnetic body and is made of a material that has a relatively higher magnetic resistance than the members that form the magnetic path in the rotor 40, such as the main yoke part 411.

For example, as illustrated in FIG. 13 and FIG. 14, the short-circuit reduction member 44 has an approximately cylindrical shape arranged along the rotary axial center AX and is arranged at both ends of the main yoke part 411 in the axial direction. In this example, the short-circuit reduction member 44 is provided with a plurality of (in this example, four) holes that are elongated and rectangular as viewed in the axial direction, in which the auxiliary magnets 43 are embedded, on the surface adjacent to the main yoke part 411; and on the opposite side, the short-circuit reduction member 44 is provided with an annular hole as viewed in the axial direction, in which the auxiliary yoke part 412 is embedded.

Further, for example, as illustrated in FIG. 18 and FIG. 19, the short-circuit reduction member 44 has an approximately cylindrical shape arranged along the rotary axial center AX and may be arranged adjacent between the main yoke part 411 and the auxiliary yoke part 412 in the axial direction. In this example, the short-circuit reduction member 44 is provided with a through-hole having approximately the same thickness in the axial direction as the auxiliary magnet 43 and in which the auxiliary magnet 43 is embedded.

The rotary shaft member 50 is rotatably supported with respect to the housing of the electric motor 1. Thus, the rotor 40 (the rotor core 41) fixed to the rotary shaft member 50 can rotate with respect to the housing and the stator 30.

<Method of Reducing Short-Circuit Magnetic Flux of Auxiliary Magnet>

Next, referring to FIG. 16 and FIG. 21, the method of reducing the short-circuit magnetic flux of the auxiliary magnet 43 of the electric motor 1 according to the fifth embodiment is explained.

As illustrated in FIG. 16 and FIG. 21, the short-circuit reduction members 44, which have relatively higher magnetic resistance than the members configuring the magnetic path of the rotor 40 such as the main yoke part 411, are arranged adjacent to the surface of the auxiliary magnet 43 facing the stator 30 and the surface on the opposite side, respectively.

Accordingly, a state in which the magnetic resistance is relatively higher than that of the members configuring the magnetic path of the rotor 40, such as the main yoke part 411, can be realized in the portion around the auxiliary magnet 43 that faces the auxiliary magnet 43 in parallel with the virtual line (line extending in the axial direction) connecting the two magnetic poles inside the auxiliary magnet 43. Therefore, the short-circuit magnetic flux between the two magnetic poles of the auxiliary magnet 43 can be reduced, and the magnetic flux of the magnetic pole on the surface of the main magnet 42 facing the stator 30 can be further increased. Therefore, the output of the electric motor 1 can be further increased.

Sixth Embodiment

Next, a sixth embodiment will be described.

Hereafter, the description will be mainly on the different parts from the fifth embodiment, and the description of the same or corresponding content as the fifth embodiment may be simplified or omitted.

<Basic Configuration of Electric Motor>

First, the basic configuration of the electric motor 1 according to the sixth embodiment will be described with reference to FIGS. 22 and 23.

Figure 22:
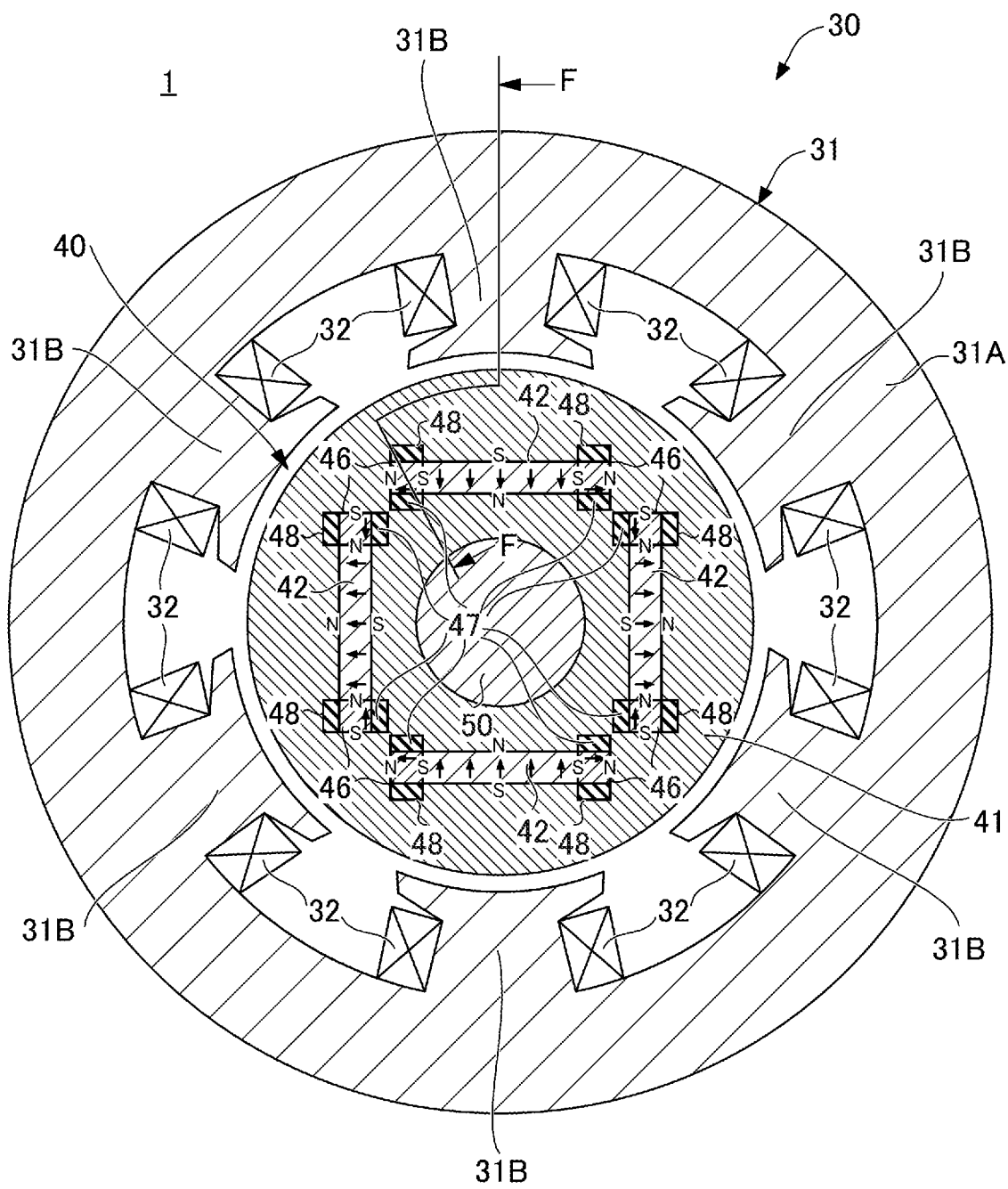
FIG. 22 is a cross-sectional view illustrating an example of an electric motor according to a sixth embodiment.

FIG. 22 is a cross-sectional view of the electric motor 1 according to the sixth embodiment. The solid arrows in FIG. 22 illustrate the magnetization direction (magnetization orientation) of the main magnet 42 and the auxiliary magnet 43. FIG. 23 is a longitudinal cross-sectional view of the electric motor 1 according to the sixth embodiment. Specifically, FIG. 23 is a cross-sectional view of the electric motor 1 corresponding to the F-F line in FIG. 22.

Figure 23:
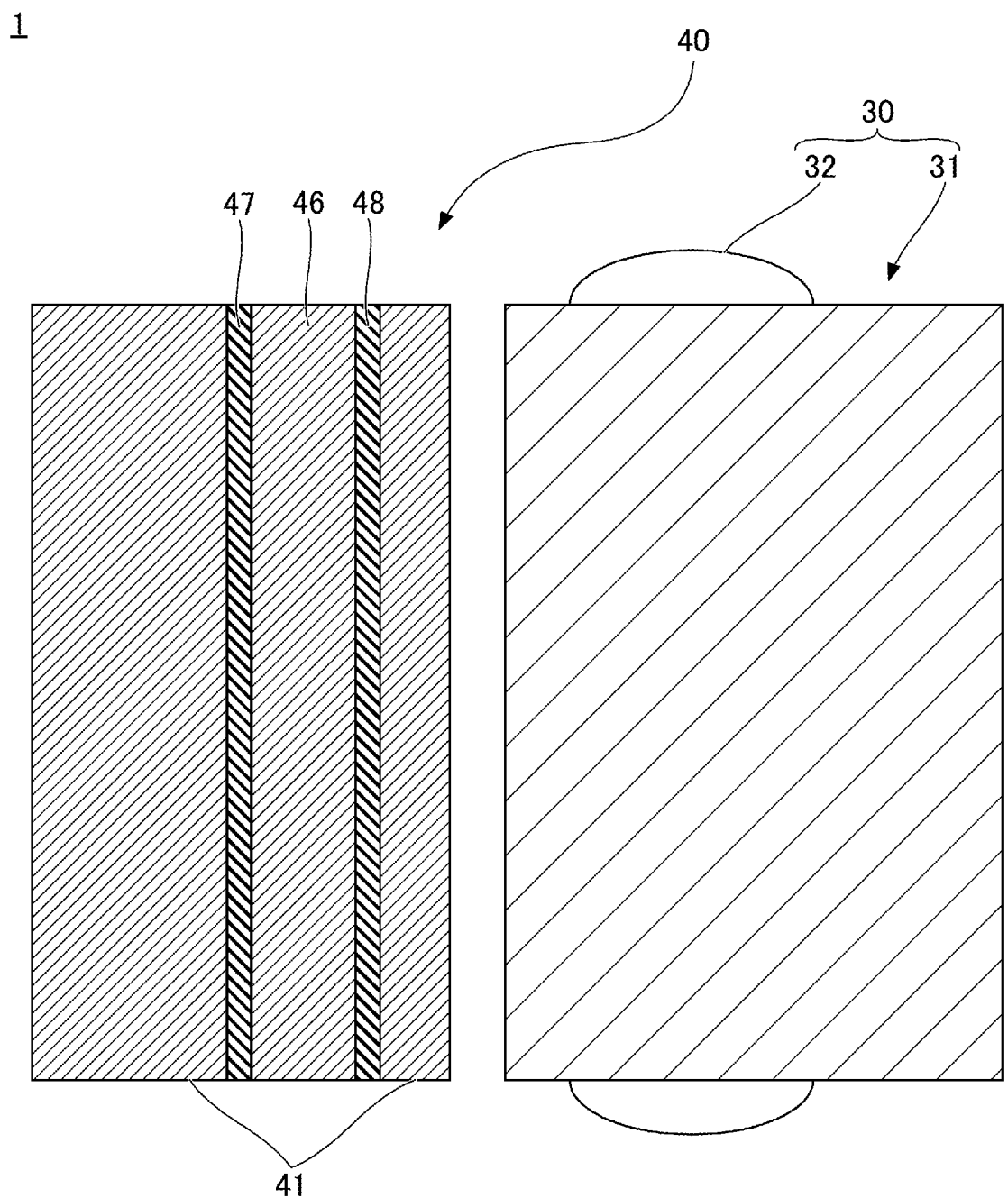
FIG. 23 is a longitudinal cross-sectional view illustrating an example of an electric motor according to the sixth embodiment.

As illustrated in FIGS. 22 and 23, the rotor 40 includes the rotor core 41, the plurality of main magnets 42, the plurality of auxiliary magnets 46, a short-circuit reduction member 47, and a short-circuit reduction member 48.

The rotor core 41 has an approximately cylindrical shape and is fixed to the rotary shaft member 50. The rotor core 41 is provided with a main magnet slot for embedding each of the multiple main magnets 42. A space (hereafter, "auxiliary magnet slot") for embedding the auxiliary magnet 46, the short-circuit reduction member 47, and the short-circuit reduction member 48 is provided at both ends of the main magnet slot in the direction orthogonal to the direction of the main magnetic flux of the main magnet 42. The main magnet slot and the auxiliary magnet slot are connected to each other.

Multiple (in this example, 8) auxiliary magnets 46 (one example of the second magnet) are embedded in the rotor core 41 so as to be adjacent to the ends in a direction (in this example, the longitudinal direction of the elongated rectangular main magnet 42) orthogonal to the direction of the main magnetic flux of the main magnets 42. As illustrated in FIG. 23, the auxiliary magnet 46 is arranged to face the teeth part 31B of the stator 30 in the radial direction. The auxiliary magnet 46 is, for example, a neodymium sintered magnet, a ferrite magnet, or the like. The auxiliary magnet 46, together with the main magnet 42, configures a Halbach array and relatively increases the magnetic flux of the magnetic pole on the surface of the main magnet 42 facing the stator 30. Thus, the output of the electric motor 1 can be increased. The auxiliary magnet 46 is, for example, a neodymium sintered magnet, a ferrite magnet, or the like.

The auxiliary magnet 46 is magnetized in a direction orthogonal to the direction of the main magnetic flux of the adjacent main magnet 42, and has magnetic poles (N-pole and S-pole) with different magnetic polarities (an example of the second magnetic pole and the third magnetic pole) on the surface adjacent to the main magnet 42 and on the surface on the opposite side. Specifically, the auxiliary magnet 46 is magnetized such that the magnetic pole on the surface adjacent to the main magnet 42 is the same as the magnetic pole on the surface of the main magnet 42 facing the stator 30. For example, if the magnetic pole of the surface of the main magnet 42 facing the stator 30 is an N-pole, the auxiliary magnets 46 at both ends of the direction orthogonal to the direction of the main magnetic flux of the main magnet 42 are magnetized in the direction orthogonal to the direction of the main magnetic flux of the main magnet 42 such that the magnetic pole of the surface adjacent to the main magnet 42 is an N-pole. Similarly, when the magnetic pole of the surface of the main magnet 42 facing the stator 30 is an S-pole, the auxiliary magnets 46 at both ends of the direction orthogonal to the direction of the main magnetic flux of the main magnet 42 are magnetized in the direction orthogonal to the direction of the main magnetic flux of the main magnet 42 such that the magnetic pole of the surface adjacent to the main magnet 42 is an S-pole. Thus, the two auxiliary magnets 46 at both ends can increase (strengthen) the magnetic flux of the magnetic pole at the surface facing the stator 30 of the adjacent main magnet 42.

The short-circuit reduction member 47 (an example of a short-circuit reduction part) is, for example, a non-magnetic body, and is formed of a material that has a relatively higher magnetic resistance than the members that form the magnetic path in the rotor 40, such as the main yoke part 411. The short-circuit reduction member 47 is embedded in the rotor core 41 so as to be adjacent to the surface of the auxiliary magnet 46 on the opposite side to the surface facing the stator 30, so as to cover the entire range along the magnetization direction of the auxiliary magnet 46.

The short-circuit reduction member 48 (an example of a short-circuit reduction part), similar to the short-circuit reduction member 47, is, for example, a non-magnetic body, and is formed of a material that has a relatively higher magnetic resistance than the members that form the magnetic path in the rotor 40, such as the main yoke part 411. The short-circuit reduction member 48 is embedded in the rotor core 41 in such a manner as to be adjacent to the surface of the auxiliary magnet 46 facing the stator 30 so as to cover the entire range along the magnetization direction of the auxiliary magnet 46.

<Method of Reducing Short-Circuit Magnetic Flux of Auxiliary Magnet>

Next, referring to FIG. 22 and FIG. 23, the method of reducing the short-circuit magnetic flux of the auxiliary magnet 46 of the electric motor 1 according to the sixth embodiment is explained.

As illustrated in FIG. 22 and FIG. 23, the short-circuit reduction member 48 and the short-circuit reduction member 47, which have relatively higher magnetic resistance than the members configuring the magnetic path of the rotor 40 such as the main yoke part 411, are arranged adjacent to the surface of the auxiliary magnet 46 facing the stator 30 and the surface on the opposite side, respectively.

Accordingly, a state in which the magnetic resistance is relatively higher than that of the members configuring the magnetic path of the rotor 20, such as the main yoke part 411, can be realized in the portion around the auxiliary magnet 46 that faces the auxiliary magnet 46 in parallel with the virtual line (a line extending in a direction orthogonal to the main magnetic flux of the main magnet 42) connecting the two magnetic poles inside the auxiliary magnet 46. Therefore, the short-circuit magnetic flux between the two magnetic poles of the auxiliary magnet 46 can be reduced, and the magnetic flux of the magnetic pole on the surface of the main magnet 42 facing the stator 10 can be further increased. Therefore, the output of the electric motor 1 can be further increased.

Seventh Embodiment

Next, a seventh embodiment will be described.

Hereafter, the description will be mainly on the different parts from the fifth and sixth embodiments, and the description of the same or corresponding content as the fifth and sixth embodiment may be simplified or omitted.

<Basic Configuration of Electric Motor>

First, the basic configuration of the electric motor 1 according to the seventh embodiment will be described with reference to FIGS. 24 to 33.

Figure 24:
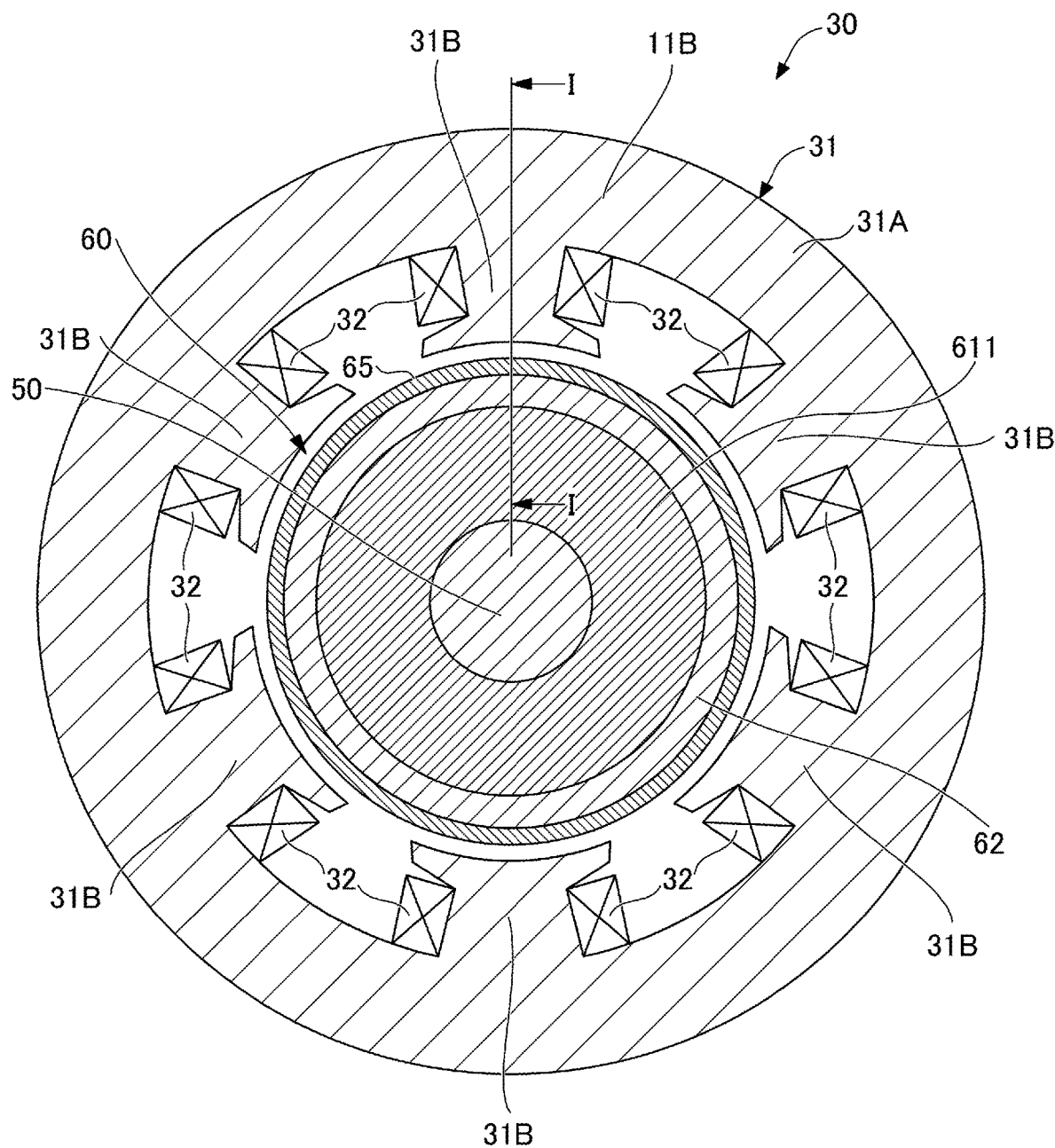
FIG. 24 is a cross-sectional view illustrating an example of an electric motor according to a seventh embodiment.
Figure 25:
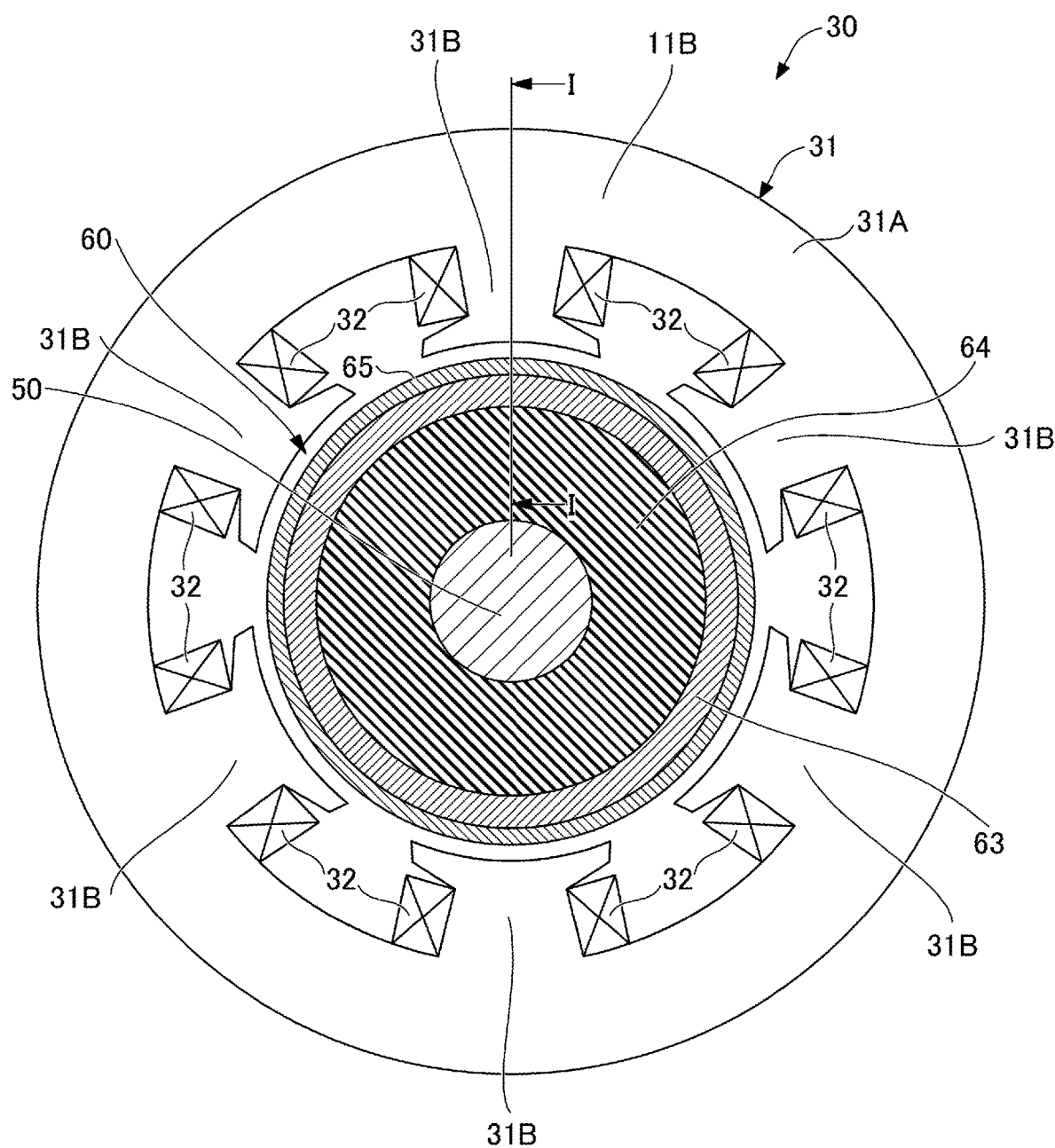
FIG. 25 is a cross-sectional view illustrating an example of an electric motor according to the seventh embodiment.
Figure 26:
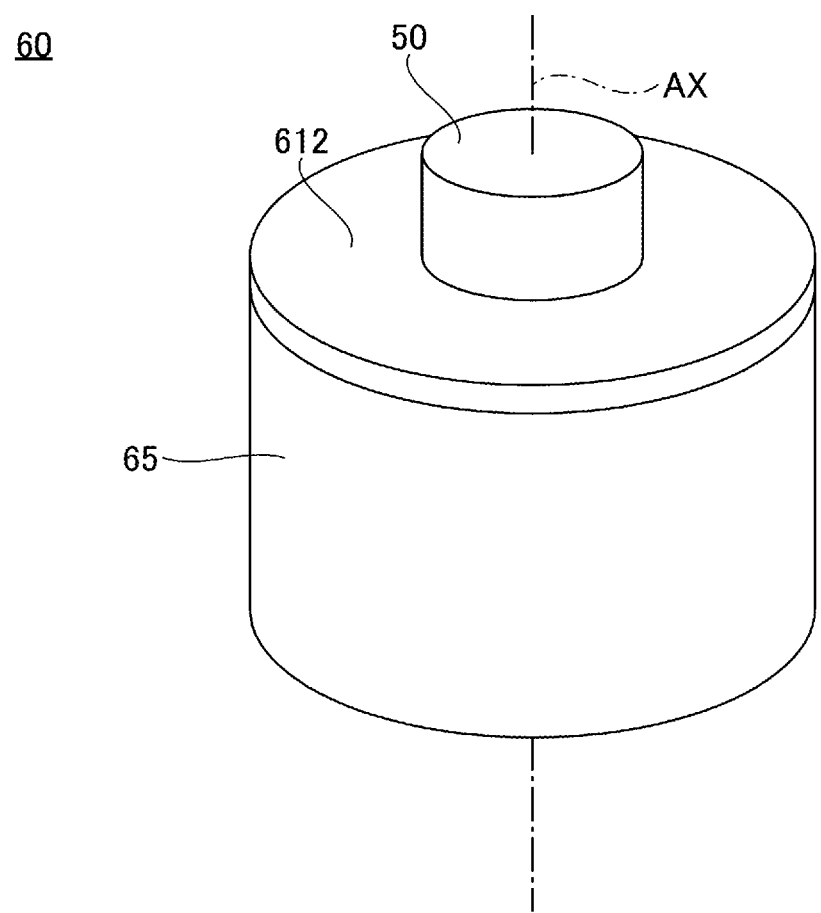
FIG. 26 is a perspective view illustrating an example of a rotor according to the seventh embodiment.
Figure 27:
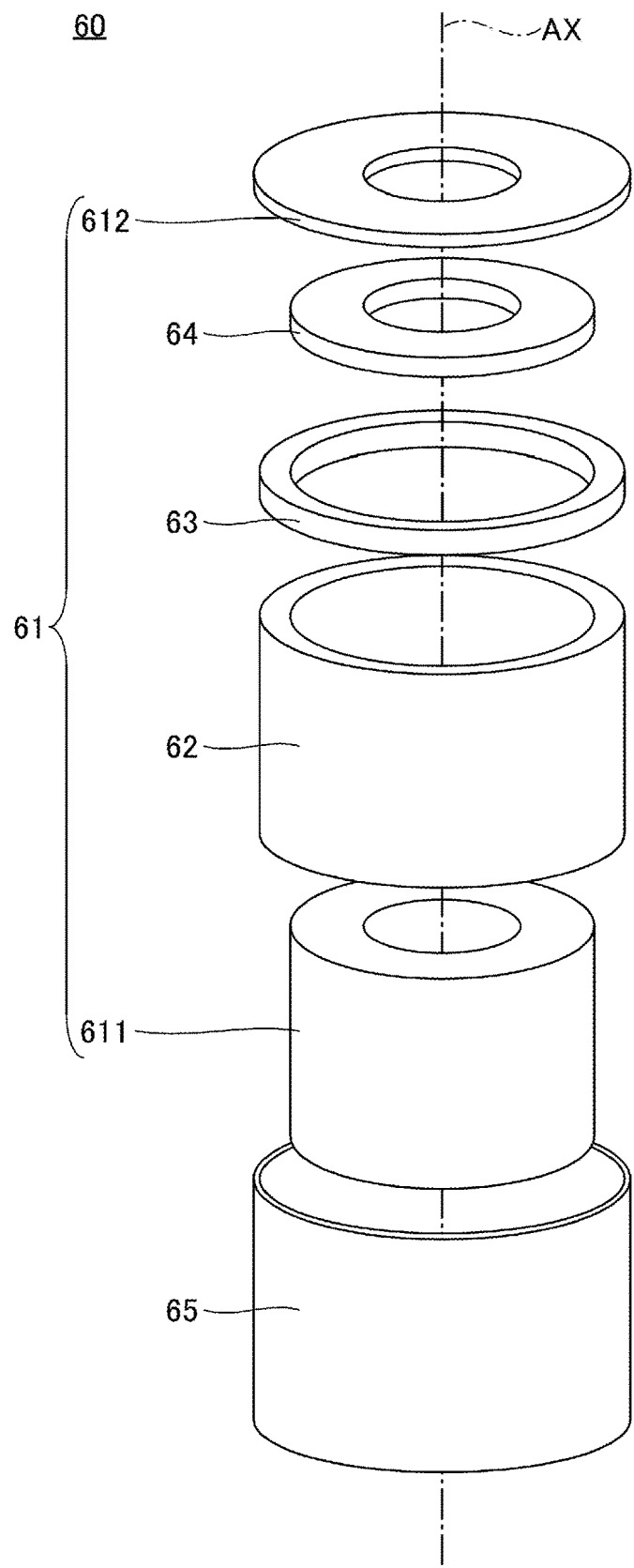
FIG. 27 is an exploded perspective view illustrating an example of a rotor according to the seventh embodiment.
Figure 28:
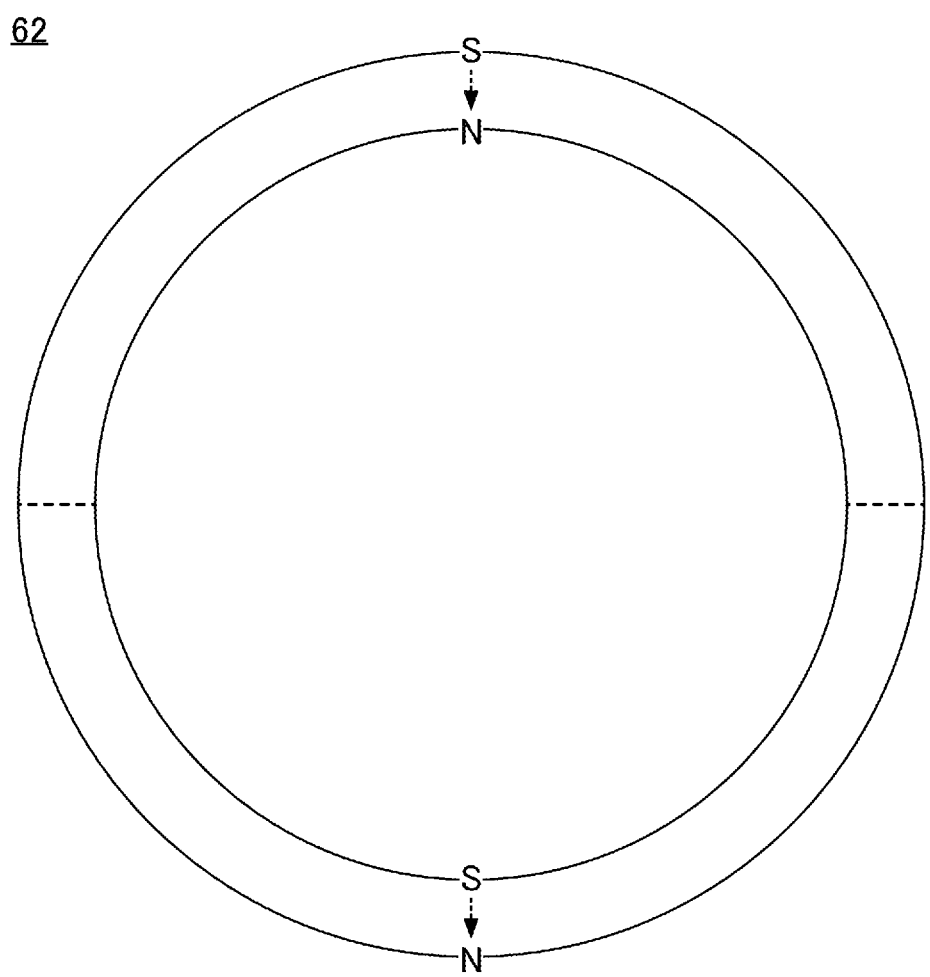
FIG. 28 illustrates an example of a main magnet according to the seventh embodiment.
Figure 29:
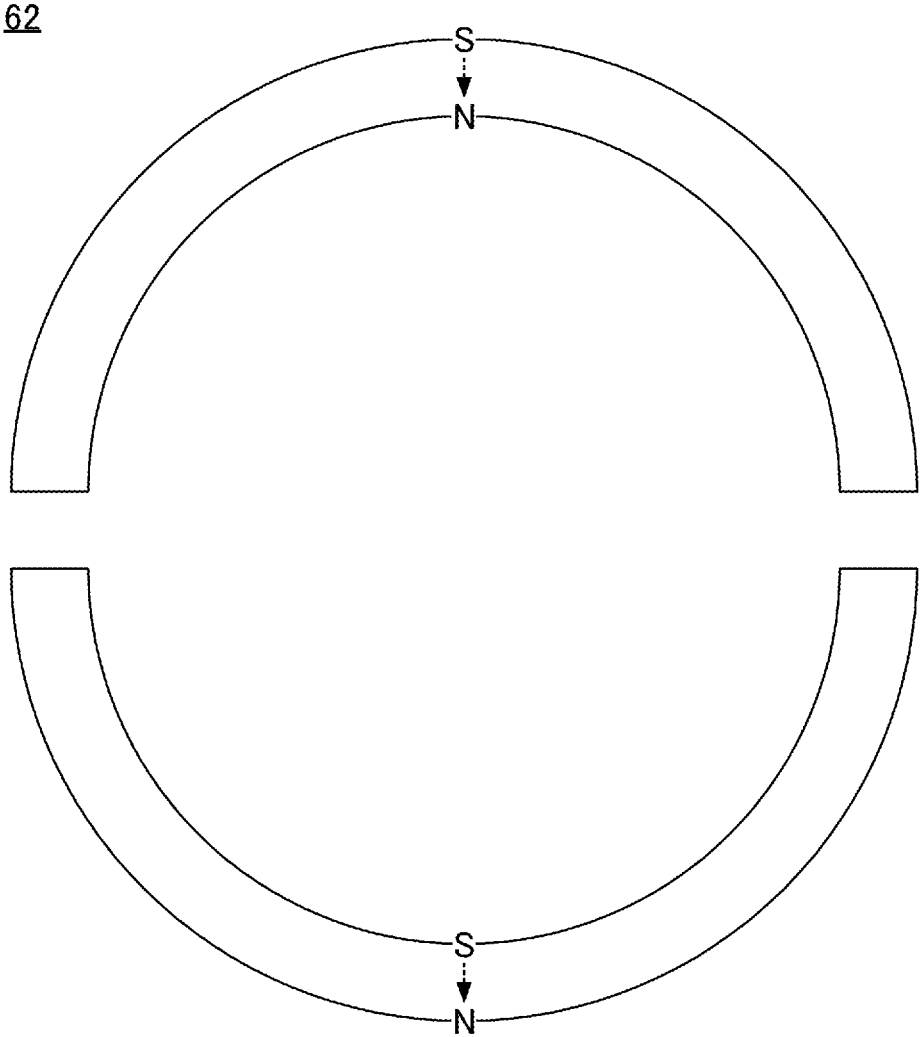
FIG. 29 illustrates another example of the main magnet according to the seventh embodiment.
Figure 30:
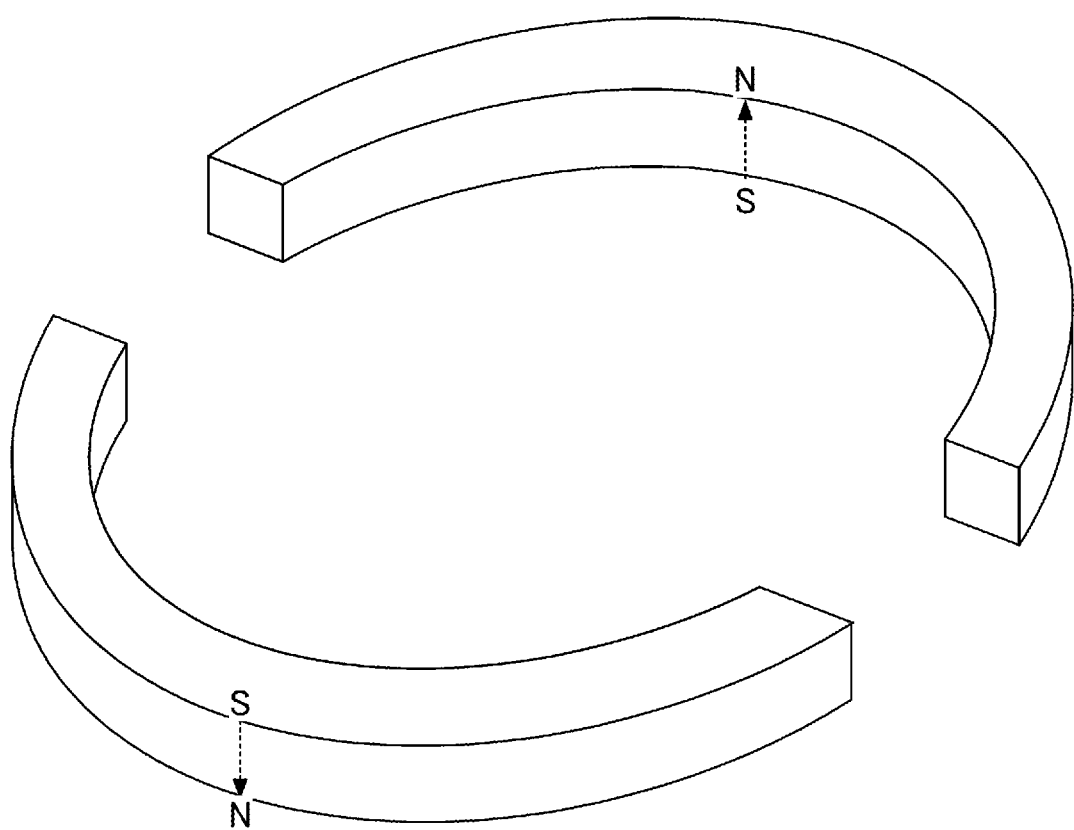
FIG. 30 illustrates an example of an auxiliary magnet according to the seventh embodiment.
Figure 31:
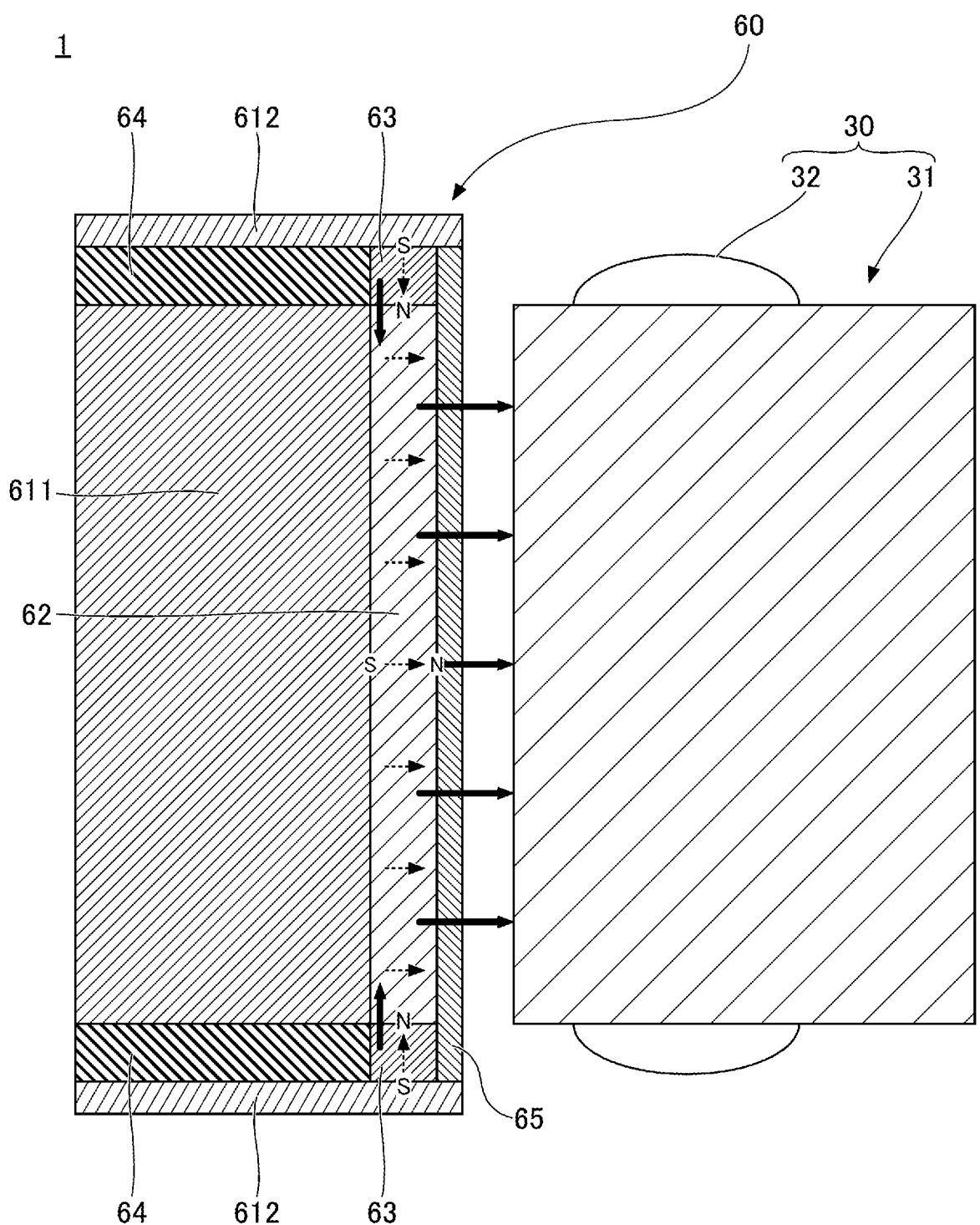
FIG. 31 is a longitudinal cross-sectional view illustrating an example of an electric motor according to the seventh embodiment.
Figure 32:
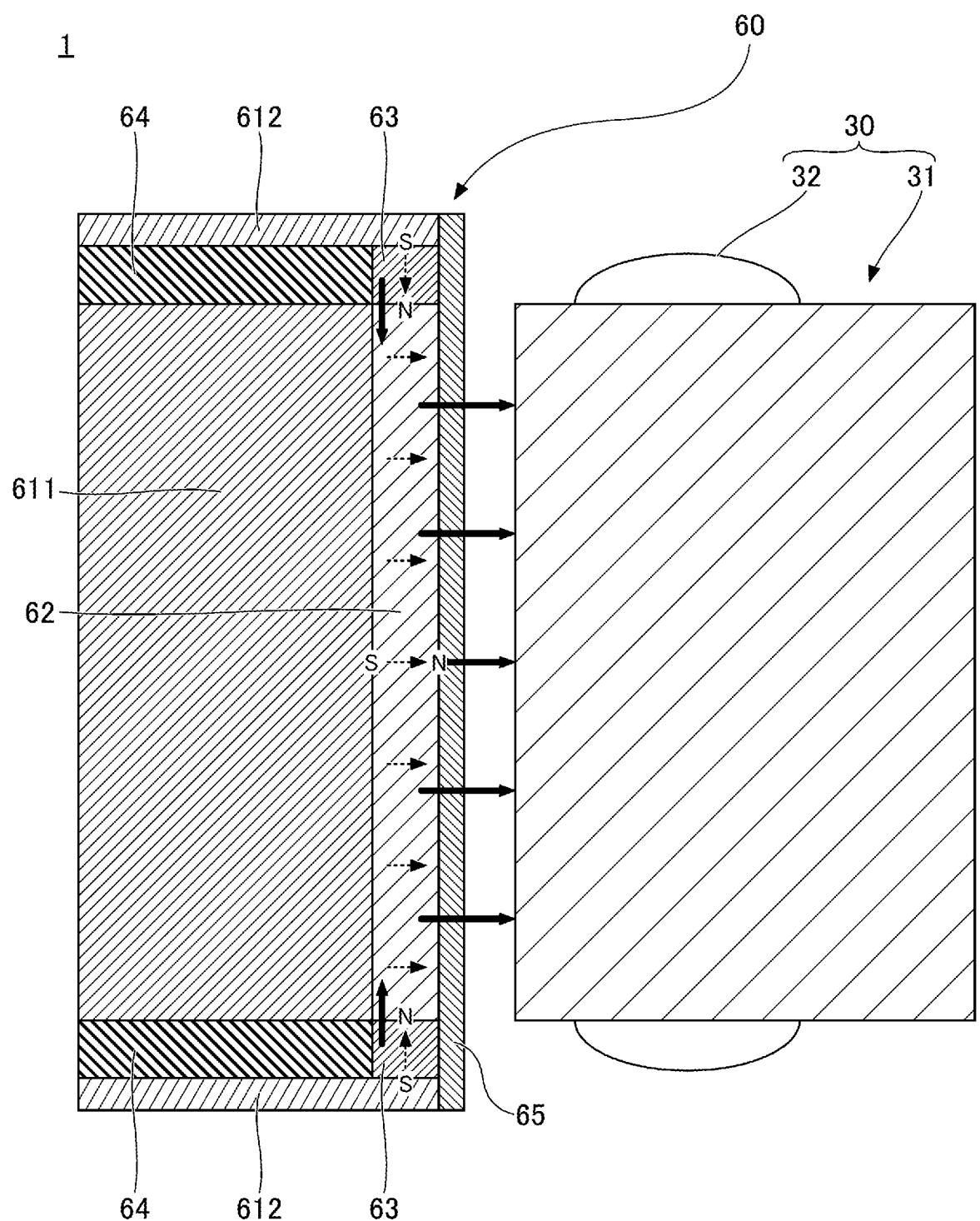
FIG. 32 is a longitudinal cross-sectional view illustrating another example of an electric motor according to the seventh embodiment.
Figure 33:
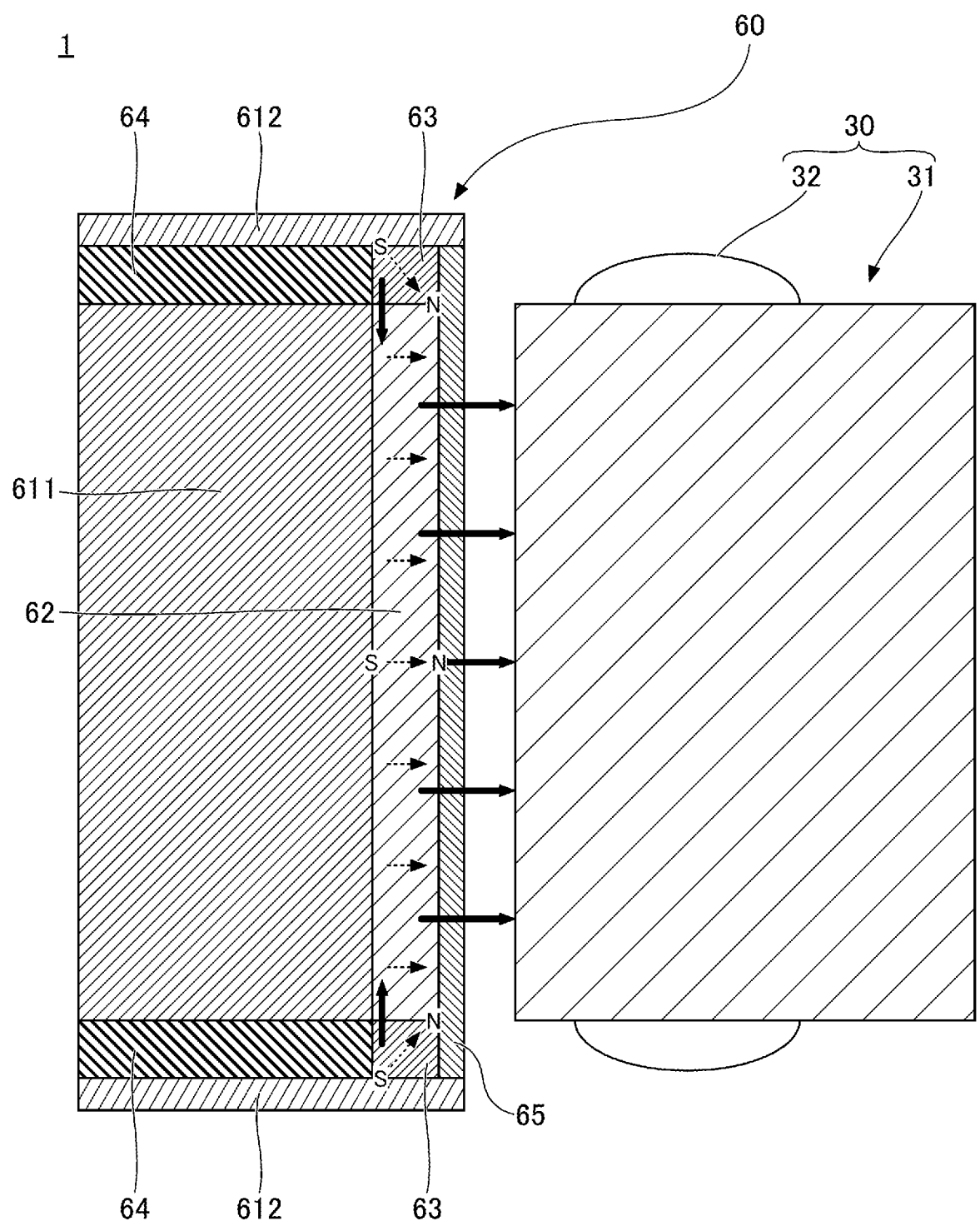
FIG. 33 is a longitudinal cross-sectional view illustrating yet another example of an electric motor according to the seventh embodiment.

FIG. 24 and FIG. 25 are cross-sectional views illustrating an example of the electric motor 1 according to the seventh embodiment. Specifically, FIG. 24 is a cross-sectional view at the center in the axial direction of the electric motor 1, and FIG. 25 is a cross-sectional view at the end portion in the axial direction of the electric motor 1. FIG. 26 is a perspective view illustrating an example of the rotor 20 according to the seventh embodiment. FIG. 27 is an exploded perspective view illustrating an example of the rotor 20 according to the seventh embodiment. In FIG. 26 and FIG. 27, the range from the center to one end in the axial direction of a rotor 60 is illustrated, and the range from the center to the other end is omitted. FIGS. 28 and 29 illustrate one example and another example of a main magnet 62 according to the seventh embodiment. The dashed arrows in FIGS. 28 and 29 illustrate the magnetization direction (magnetization orientation) of the main magnet 62. FIG. 30 illustrates an example of an auxiliary magnet 63 according to the seventh embodiment. The dashed arrow in FIG. 30 indicates the magnetization direction (magnetization orientation) of the auxiliary magnet 63. FIGS. 31 to 33 are longitudinal cross-sectional views illustrating one example, another example, and still another example of the electric motor 1 according to the seventh embodiment. Specifically, FIGS. 31 to 33 are cross-sectional views corresponding to line I-I of FIGS. 24 and 25. The thick solid arrows in FIGS. 31 to 33 represent the flow of the magnetic flux between the auxiliary magnet 63 and the main magnet 62, and the flow of the magnetic flux between the main magnet 62 and the stator 30. The dashed arrows in FIGS. 31 to 33 indicate the magnetization direction (magnetization orientation) of the main magnet 62 and the auxiliary magnet 63.

In FIG. 25, the cross-section of the electric motor 1 at the position in the axial direction where only the rotor 60 among the stator 30 and the rotor 60 exists is illustrated, and the state of the stator 30 as viewed from the axial direction and the cross-section of the rotor 60 are illustrated.

As illustrated in FIGS. 24 to 32, the electric motor 1 includes the stator 30, the rotor 60, and the rotary shaft member 50. The electric motor according to the seventh embodiment is what is referred to as radial gap type in which the stator 30 and the rotor 60 face each other in the radial direction (one example of the first direction) with a predetermined gap (air gap). The electric motor 1 according to the seventh embodiment is what is referred to as a surface permanent magnet type (SPM) in which the main magnet 62 is built into the surface of the main yoke part 611 of the rotor 60.

The stator 30 is arranged on the outer peripheral side of the electric motor 1 and fixed to a housing that is not illustrated. The stator 30 includes the stator core 31 and the winding 32.

The rotor 60 is arranged to face inward in the radial direction of the stator 30 and is provided rotatably in the circumferential direction (one example of the second direction) orthogonal to the direction (radial direction) facing the stator 30. The rotor 60 includes a rotor core 61, a plurality of main magnets 62, a plurality of auxiliary magnets 63, a short-circuit reduction member 64, and a protective tube 65.

The rotor core 61 is an element that configures a magnetic path in the magnetic field caused by the current flowing through the winding 32 of the stator 30, and a magnetic path in the magnetic field of the main magnet 62 and the auxiliary magnet 63, among the elements of the rotor 60. The rotor core 61 includes a main yoke part 611 and an auxiliary yoke part 612.

The main yoke part 611 is used as a magnetic path in a magnetic field caused by an electric current flowing through the winding 32 of the stator 30 and a magnetic path in the magnetic field of the main magnet 62. The main yoke part 611 has an approximately cylindrical shape with the rotary axial center AX at the center thereof. Specifically, the main yoke part 611 is arranged at the center in the axial direction of the rotor 60 and has an approximately cylindrical shape with a hole through which the rotary shaft member 50 is inserted at the center in the radial direction.

The auxiliary yoke part 612 is used as a magnetic path in the magnetic field of the auxiliary magnet 63. The auxiliary yoke part 612 is provided at both ends of the rotor 60 in the axial direction, and in the axial view, the auxiliary yoke part 612 is arranged adjacent to the auxiliary magnet 63 and the short-circuit reduction member 64 on the outside (end side) in the axial direction so as to cover the region of the auxiliary magnet 63 and the short-circuit reduction member 64. The auxiliary yoke part 612 has an approximately cylindrical shape with the rotary axial center AX at the center thereof. Specifically, the auxiliary yoke part 612 has a hole through which the rotary shaft member 50 is inserted at the center in the radial direction, and has an approximately cylindrical shape with a relatively small dimension in the axial direction.

The main magnet 62 is arranged adjacent to the surface of the main yoke part 611, specifically on the outside in the radial direction of the main yoke part 611. Further, as illustrated in FIGS. 31 to 33, the main magnet 62 is arranged to face the teeth part 31B of the stator 30 in the radial direction. The main magnet 62 has an approximately cylindrical shape centered on the rotary axial center AX. Specifically, the main magnet 62 has an approximately cylindrical shape with the same dimension in the axial direction as the main yoke part 611 and the same inner diameter as the outer diameter of the main yoke part 611 within a range that the main magnet 62 can be fastened to the main yoke part 611.

As illustrated in FIG. 28 and FIG. 29, the main magnet 62 is a permanent magnet that is magnetized in the radial direction, and has magnetic poles (N-pole and S-pole) (an example of the first and fourth magnetic poles) with different magnetic polarities on the inner and outer surfaces, respectively. Further, the main magnet 62 is configured such that the combination of the magnetic poles on the inner and outer surfaces thereof differs in the circumferential direction at each predetermined angle (for example, every half circumference). For example, as illustrated in FIG. 28, the main magnet 62 is a permanent magnet with an integral member magnetized. Further, for example, as illustrated in FIG. 29, the main magnet 62 may be manufactured by magnetizing each of a plurality of members (for example, two) for each predetermined angle in the circumferential direction, with different combinations of polarity of the inner and outer circumferential surfaces, and connecting the plurality of members in the circumferential direction as a magnetized permanent magnet.

The auxiliary magnets 63 are arranged on the surface of the short-circuit reduction member 64, specifically, adjacent to the radial outside of the short-circuit reduction member 64 and adjacent to the ends in the axial direction of the main magnet 62. Further, as illustrated in FIGS. 31 to 33, the auxiliary magnet 63 is arranged so as not to face the teeth part 31B of the stator 30 in the radial direction. The auxiliary magnet 63, together with the main magnet 62, constitute a Halbach array and relatively increase the magnetic flux of the magnetic pole on the surface of the main magnet 62 facing the stator 30 in the radial direction. Thus, the output of the electric motor 1 can be increased.

The auxiliary magnet 63 has an approximately cylindrical shape centered on the rotary axial center AX. Specifically, in the axial view, the auxiliary magnet 63 has an approximately cylindrical shape with approximately the same annular shape as the main magnet 62 and a relatively small dimension in the axial direction.

The auxiliary magnet 63 is a permanent magnet having magnetic poles (N-pole and S-pole) with different magnetic polarities (an example of the second and third magnetic poles) on both end faces in the axial direction. For example, as illustrated in FIG. 31 and FIG. 32, the auxiliary magnet 63 is magnetized in an axial direction orthogonal to the magnetization direction (radial direction) of the main magnet 62. For example, as illustrated in FIG. 33, the auxiliary magnet 63 may be magnetized, specifically in a direction that intersects the magnetization direction (radial direction) of the main magnet 62 within a range greater than 0 degrees and less than 90 degrees, within a range that the vector in the magnetization direction has a component in the axial direction. Specifically, the auxiliary magnet 63 is magnetized in the axial direction such that the magnetic pole on the surface adjacent to the main magnet 62 is the same as the magnetic pole on the surface of the main magnet 62 facing the stator 30 (that is, the outer surface in the radial direction). For example, as illustrated in FIG. 31 and FIG. 32, in the angle range in the circumferential direction in which the magnetic pole of the surface of the main magnet 62 facing the stator 30 is the N-pole, the auxiliary magnet 63 is magnetized in the axial direction such that the N-pole is inside (center side) and the S-pole is outside (end side) in the axial direction. As illustrated in FIG. 30, the auxiliary magnet 63 is manufactured by being magnetized for each of a plurality of members (for example, two) for each predetermined angle with different combinations of the polarity of the inner and outer magnetic poles in the axial direction, and by circumferentially connecting the multiple members as a magnetized permanent magnet.

The short-circuit reduction member 64 (an example of a short-circuit reduction part) is, for example, made of a non-magnetic material, and is formed of a material having a relatively higher magnetic resistance than the member configuring the magnetic path in the rotor 60, such as the main yoke part 611. The short-circuit reduction member 64 has an approximately cylindrical shape with the rotary axial center AX at the center thereof, and is arranged so as to be adjacent to the main yoke part 611 on the outside (end side) in the axial direction and adjacent to the auxiliary magnet 63 on the inside in the circumferential direction. Specifically, in the axial view, the short-circuit reduction member 64 has an approximately cylindrical shape with approximately the same annular shape as the main yoke part 611 and approximately the same dimension in the axial direction as the auxiliary magnet 63.

The protective tube 65 (an example of a short-circuit reduction part) is, for example, a non-magnetic body, and is arranged outside in the circumferential direction of the main magnet 62 and the auxiliary magnet 63. Thus, the electric motor 1 can reduce the detachment of the main magnet 62 and the auxiliary magnet 63 from the rotor 60 due to the centrifugal force acting in association with the rotation of the rotor 60.

The protective tube 65 has an approximately cylindrical shape covering the outside in the radial direction of the main magnet 62 and the auxiliary magnet 63. For example, as illustrated in FIG. 31 and FIG. 33, the protective tube 65 has an approximately cylindrical shape with the same dimension in the axial direction as the entire main magnet 62 and the auxiliary magnet 63 and the same inner diameter as the respective outer diameters of the main magnet 62 and the auxiliary magnet 63 within a range that the protective tube 65 can be fastened to the main magnet 62 and the auxiliary magnet 63. In this case, the auxiliary yoke part 612 has an approximately cylindrical shape with an approximately same outer diameter as that of the protective tube 65, and is arranged adjacent to the outside in the axial direction (end side) of the auxiliary magnet 63, the short-circuit reduction member 64, and the protective tube 65. Further, as illustrated in FIG. 32, the protective tube 65 may be approximately cylindrical in shape having the same dimension in the axial direction as all of the main magnet 62, the auxiliary magnet 63, and the auxiliary yoke part 612, and the same inner diameter as the respective outer diameters of the main magnet 62, the auxiliary magnet 63, and the auxiliary yoke part 612 within a range that the protective tube 65 can be fastened to the main magnet 62, the auxiliary magnet 63, and the auxiliary yoke part 612. In this case, the protective tube 65 covers not only the main magnet 62 and the auxiliary magnet 63 but also the outside in the radial direction of the auxiliary yoke part 612, and the auxiliary yoke part 612 has an outer diameter equivalent to the inner diameter of the protective tube 65 within a range that the auxiliary yoke part 612 can be fastened with the protective tube 65.

<Method of Reducing Short-Circuit Magnetic Flux of Auxiliary Magnet>

The method for reducing the short-circuit magnetic flux of the auxiliary magnet 63 of the electric motor 1 according to the seventh embodiment will be explained with reference to FIGS. 31 to 32.

As illustrated in FIG. 31 and FIG. 32, the short-circuit reduction member 64, which has relatively higher magnetic resistance than the members configuring the magnetic path of the rotor 60 such as the main yoke part 611, is arranged adjacent to the inner surface in the radial direction of the auxiliary magnet 63. On the outer surface in the radial direction of the auxiliary magnet 63, the protective tube 65 having relatively higher magnetic resistance than the members configuring the magnetic path of the rotor 60, such as the main yoke part 611, is arranged adjacent to the auxiliary magnet 63.

Accordingly, a state in which the magnetic resistance is relatively higher than that of the members configuring the magnetic path of the rotor 60, such as the main yoke part 611, can be realized in the portion around the auxiliary magnet 63 that faces the auxiliary magnet 63 in parallel with the virtual line (line extending in the axial direction) connecting the two magnetic poles inside the auxiliary magnet 63. Therefore, the short-circuit magnetic flux between the two magnetic poles of the auxiliary magnet 63 can be reduced, and the magnetic flux of the magnetic pole on the surface of the main magnet 62 facing the stator 30 can be further increased. Therefore, the output of the electric motor 1 can be further increased.

Eighth Embodiment

Next, the eighth embodiment will be described.

Hereafter, the explanation is focused on the different parts from the seventh embodiment, and the same or corresponding content as the seventh embodiment may be omitted.

<Basic Configuration of Electric Motor>

First, the basic configuration of the electric motor 1 according to the eighth embodiment will be described with reference to FIGS. 34 to 40.

Figure 34:
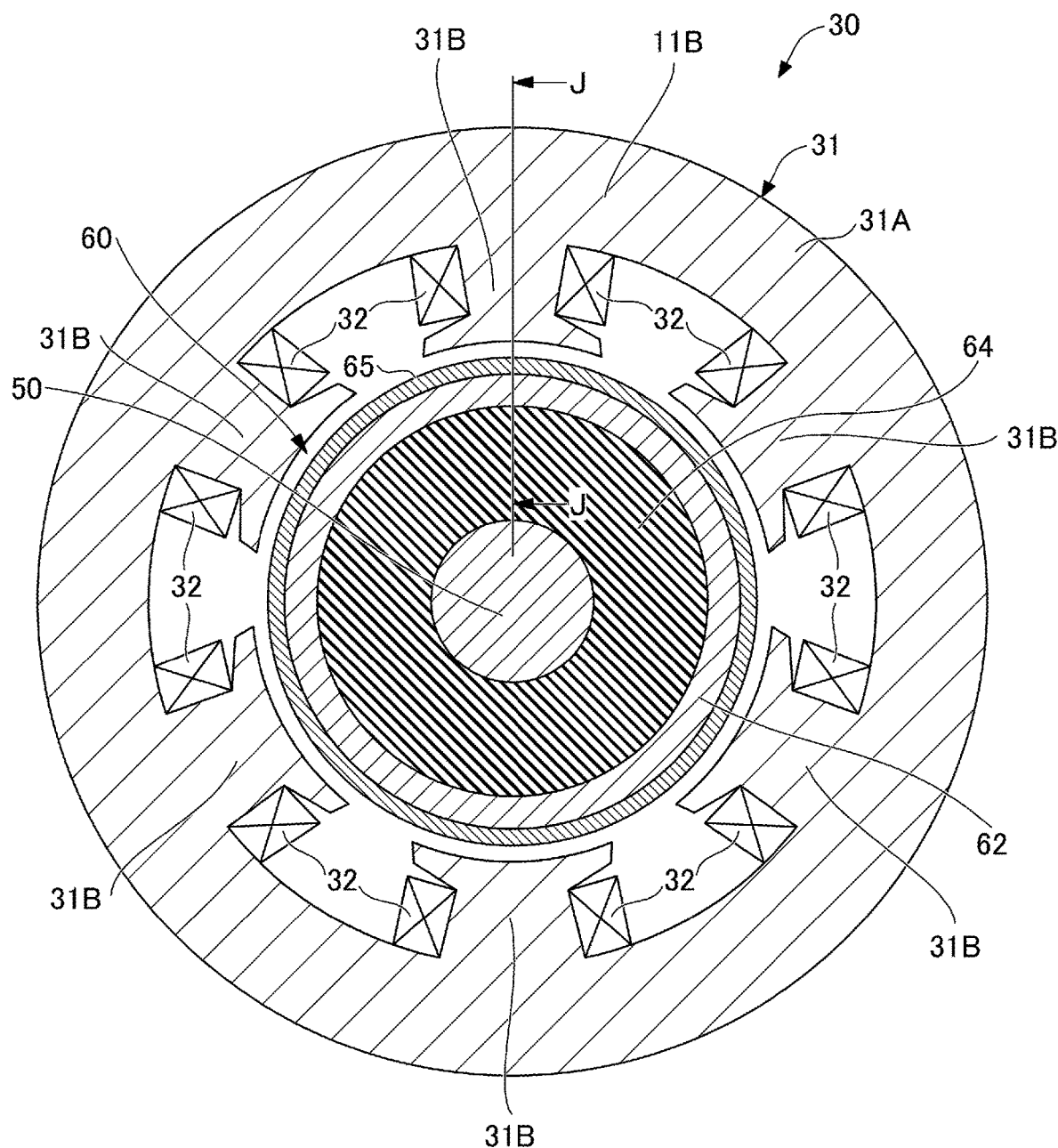
FIG. 34 is a cross-sectional view illustrating an example of an electric motor according to an eighth embodiment.
Figure 35:
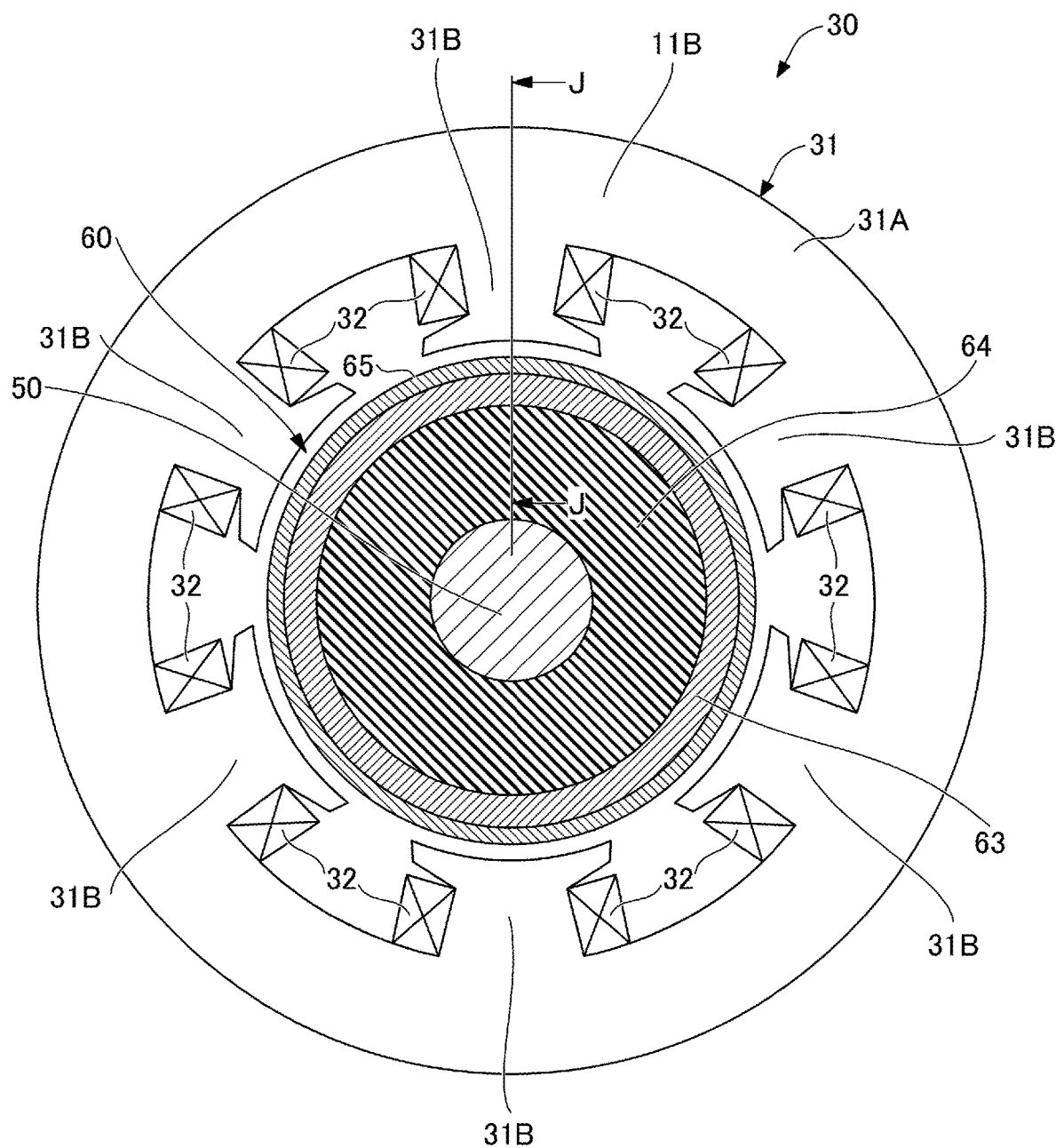
FIG. 35 is a cross-sectional view illustrating an example of an electric motor according to the eighth embodiment.
Figure 36:
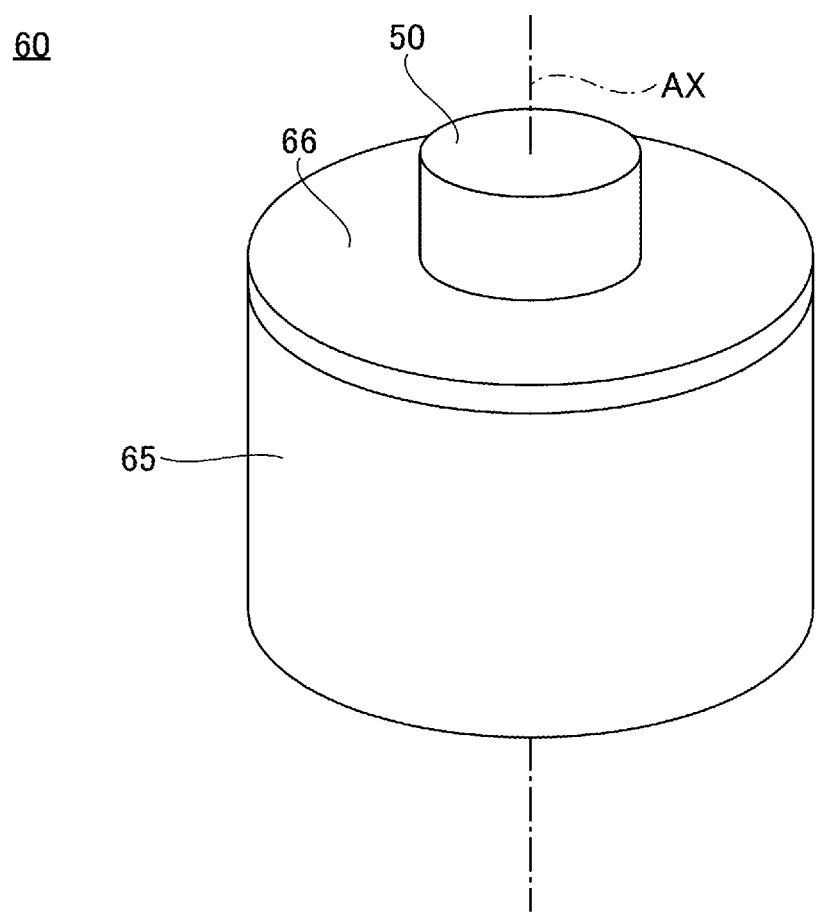
FIG. 36 is a perspective view illustrating an example of a rotor according to the eighth embodiment.
Figure 37:
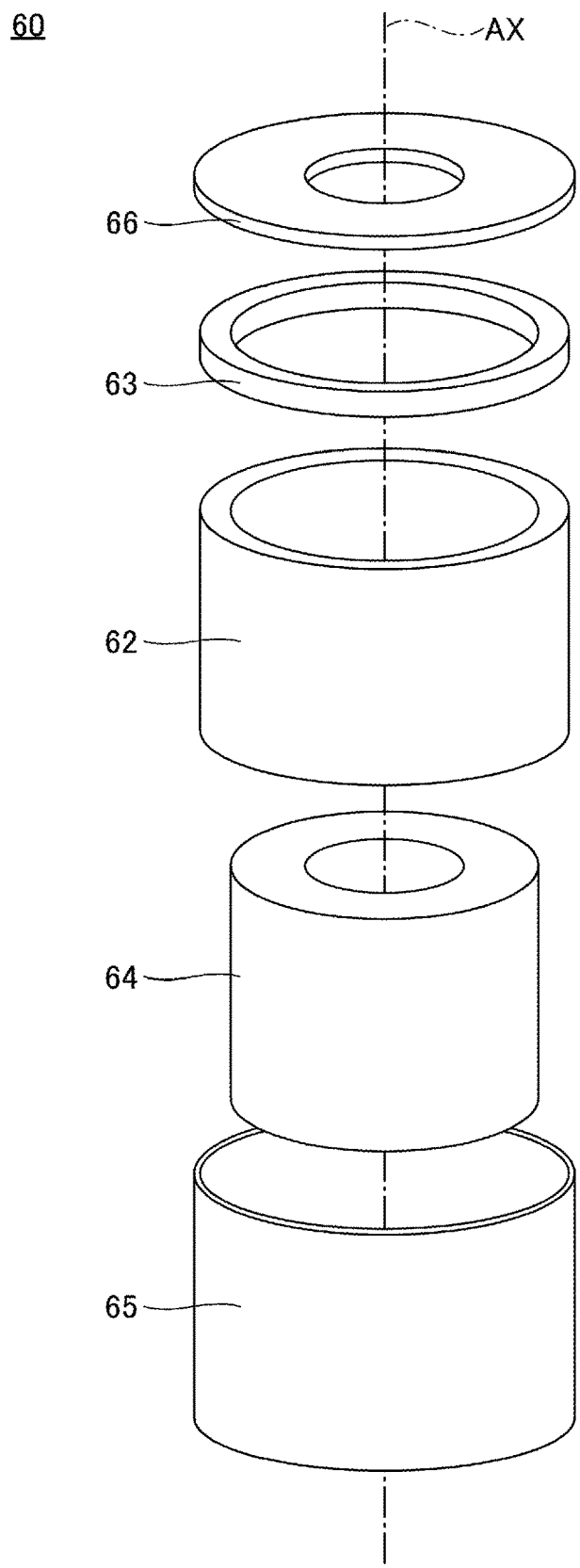
FIG. 37 is an exploded perspective view illustrating an example of a rotor according to the eighth embodiment.
Figure 38:
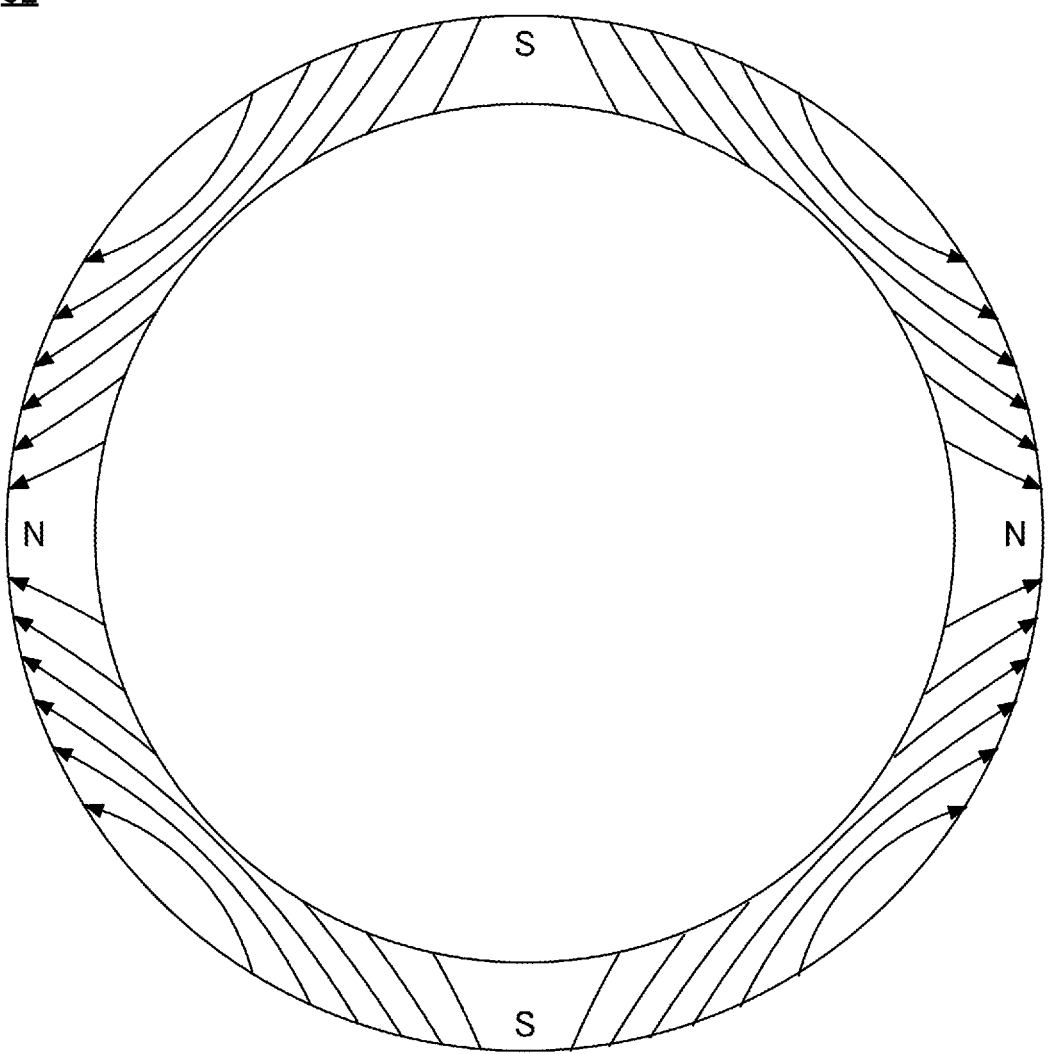
FIG. 38 illustrates an example of the main magnet according to the eighth embodiment.
Figure 39:
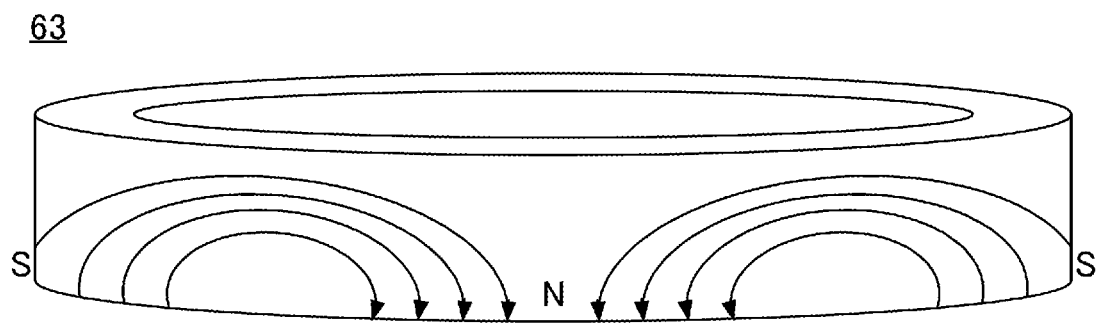
FIG. 39 illustrates an example of an auxiliary magnet according to the eighth embodiment.
Figure 40:
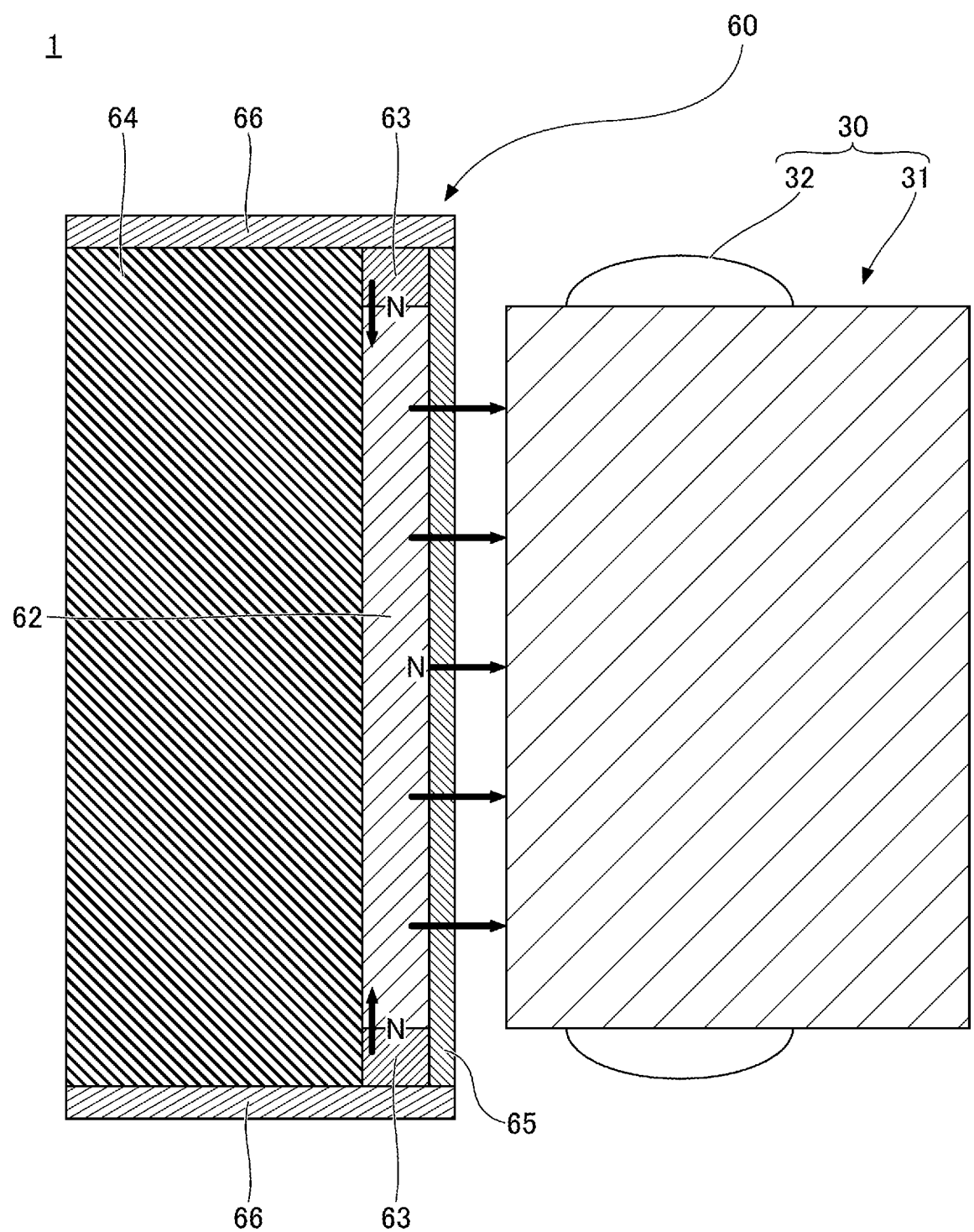
FIG. 40 is a longitudinal cross-sectional view illustrating an example of an electric motor according to the eighth embodiment.

FIGS. 34 and 35 are cross-sectional views illustrating an example of the electric motor 1 according to the eighth embodiment. Specifically, FIG. 34 is a cross-sectional view at the center in the axial direction of the electric motor 1, and FIG. 35 is a cross-sectional view at the axial end of the electric motor 1. FIG. 36 is a perspective view illustrating an example of the rotor 60 according to the eighth embodiment. FIG. 37 is an exploded perspective view illustrating an example of the rotor 60 according to the eighth embodiment. In FIG. 36 and FIG. 37, the range from the center to one end in the axial direction of the rotor 60 is illustrated, and the range from the center to the other end is omitted. FIG. 38 illustrates an example of the main magnet 62 according to the eighth embodiment. FIG. 39 illustrates an example of the auxiliary magnet 63 according to the eighth embodiment. The solid arrows in FIG. 38 and FIG. 39 represent the magnetization orientation (magnetization direction) of the main magnet 62 and the auxiliary magnet 63, respectively. FIG. 40 is a longitudinal cross-sectional view illustrating an example of the electric motor 1 according to the eighth embodiment. Specifically, FIG. 40 is a cross-sectional view corresponding to the J-J line of FIG. 34 and FIG. 35. The thick solid arrows in FIG. 40 represent the flow of the magnetic flux between the auxiliary magnet 63 and the main magnet 62, and the flow of the magnetic flux between the main magnet 62 and the stator 30.

In FIG. 35, the cross-section of the electric motor 1 at the position in the axial direction where only the rotor 60 exists among the stator 30 and the rotor 60 is illustrated, and the state of the stator 30 as viewed from the axial direction and the cross-section of the rotor 60 are illustrated.

As illustrated in FIGS. 34 to 40, unlike the seventh embodiment, the rotor 60 omits the rotor core 21 and includes an end plate 66 in addition to the main magnet 62, the auxiliary magnet 63, the short-circuit reduction member 64, and the protective tube 65.

The main magnet 62 is arranged at the center in the axial direction of the rotor 60 so as to be adjacent to the surface of the short-circuit reduction member 64, specifically, the outside in the radial direction of the short-circuit reduction member 64.

As illustrated in FIG. 38, the main magnet 62 is configured as a single member and is magnetized in a polar anisotropic magnetization orientation unlike the seventh embodiment. Specifically, the main magnet 62 has a pair of magnetic poles (N-pole and S-pole) (one example of the first magnetic pole) whose polarity differs from each other on the radial outer surface (outer peripheral surface), and has a magnetic circuit structure of a Halbach array without magnetic flux leakage to the radial inner side. Accordingly, a member (that is, the main yoke part 611 of the seventh embodiment) configuring the magnetic path inside the radial direction of the main magnet 62 can be omitted, and that part can be replaced by another member (in this example, the short-circuit reduction member 64).

The main magnet 62 has a plurality (in this example, two pairs) of pairs of magnetic poles (N-pole and S-pole) spaced apart in the circumferential direction on the outer peripheral surface in the radial direction. Specifically, the main magnet 62 has multiple (in this example, four) magnetic poles at approximately equal intervals in the circumferential direction such that the polarity of the magnetic poles next to each other is different. As illustrated in FIG. 40, the main magnet 62 is arranged to face the teeth part 31B of the stator 30 in the radial direction.

The number of magnetic poles (number of poles) arranged on the radial outer surface of the main magnet 62 may be more than four as long as the number is even.

The auxiliary magnet 63 is arranged on the surface of the short-circuit reduction member 64, specifically, adjacent on the outside in the radial direction of the short-circuit reduction member 64 and adjacent to the outside in the axial direction (end side) of the main magnet 62. As illustrated in FIG. 40, the auxiliary magnet 63 is arranged so as not to face the teeth part 31B of the stator 30 in the radial direction.

As illustrated in FIG. 39, the auxiliary magnet 63 is configured as a single member and is magnetized in a polar anisotropic magnetization orientation, unlike the seventh embodiment. Specifically, the auxiliary magnet 63 has a pair of magnetic poles (N-pole and S-pole) (one example of the second pole and the third pole) with different magnetic polarities on the inside in the axial direction (center side) adjacent to the main magnet 62, and has a magnetic circuit structure of a Halbach array without magnetic flux leakage on the outside in the axial direction (end side). Accordingly, the members (that is, the auxiliary yoke part 612 of the seventh embodiment) configuring the magnetic path on the outside in the axial direction (end side) of the auxiliary magnet 63 can be omitted.

The auxiliary magnet 63 has a plurality (in this example, two pairs) of pairs of magnetic poles (N-pole and S-pole) spaced apart in the circumferential direction on the inner surface in the axial direction. Specifically, the auxiliary magnet 63 has multiple (in this example, four) magnetic poles at approximately equal intervals in the circumferential direction such that the polarity of the adjacent magnetic poles is different from each other. Then, the auxiliary magnet 63 is arranged adjacent to the outer side of the main magnet 62 in the axial direction such that each of the N-pole and S-pole is at the same position as the N-pole and S-pole of the main magnet 62 in the circumferential direction. This allows the auxiliary magnet 63 to increase (strengthen) the magnetic flux of the magnetic pole at the surface of the main magnet 62 that faces the stator 30 in the radial direction.

It should be noted that the number of magnetic poles (number of poles) arranged on the axially inside (center side) surface of the auxiliary magnet 63 may be more than four as long as it is the same as that of the main magnet 62.

The short-circuit reduction member 64 has an approximately cylindrical shape with the rotary axial center AX at the center thereof, and is arranged so as to be adjacent to the radial inside of the main magnet 62 and the auxiliary magnet 63 at the center in the axial direction. Specifically, within a range that the short-circuit reduction member 64 can be fastened to the main magnet 62 and the auxiliary magnet 63, the short-circuit reduction member 64 has an approximately cylindrical shape with the same outer diameter as the inner diameter of the main magnet 62 and the auxiliary magnet 63 and the same dimension in the axial direction as the sum of the sizes of the main magnet 62 and the auxiliary magnet 63.

The end plates 66 are provided at both ends of the rotor 60 in the axial direction to cover the auxiliary magnet 63 and the short-circuit reduction member 64 from the outside in the axial direction. Specifically, the end plate 66 has an approximately cylindrical shape with a relatively small dimension in the axial direction, having an external diameter shape approximately the same as that of the auxiliary magnet 63 and an insertion hole of the rotary shaft member 50 in the center. The end plate 66 may be made of any material as long as the end plate 66 can perform its function, for example, the end plate 66 may be magnetic or non-magnetic. This can reduce the occurrence of detachment of the auxiliary magnet 63 or the like from the ends in the axial direction of the rotor 60.

Note that the end plate 66 may be omitted.

Thus, in the electric motor 1 according to the eighth embodiment, the main magnet 62 and the auxiliary magnet 63, which are magnetized in a polar anisotropic magnetization orientation, are used. Accordingly, members configuring the magnetic path inside the radial direction of the main magnet 62 and outside the axial direction of the auxiliary magnet 63 can be omitted. Therefore, the degree of freedom in the configuration of the electric motor 1 can be increased, and for example, the size of the electric motor 1 can be reduced and the cost can be reduced.

Ninth Embodiment

Next, a ninth embodiment will be described.

Hereafter, the explanation is focused on the different parts from the seventh embodiment, and the same or corresponding content as the seventh embodiment may be omitted.
<Basic Configuration of Electric Motor>

The basic configuration of the electric motor 1 according to the ninth embodiment will be described with reference to FIGS. 41 to 43.

Figure 41:
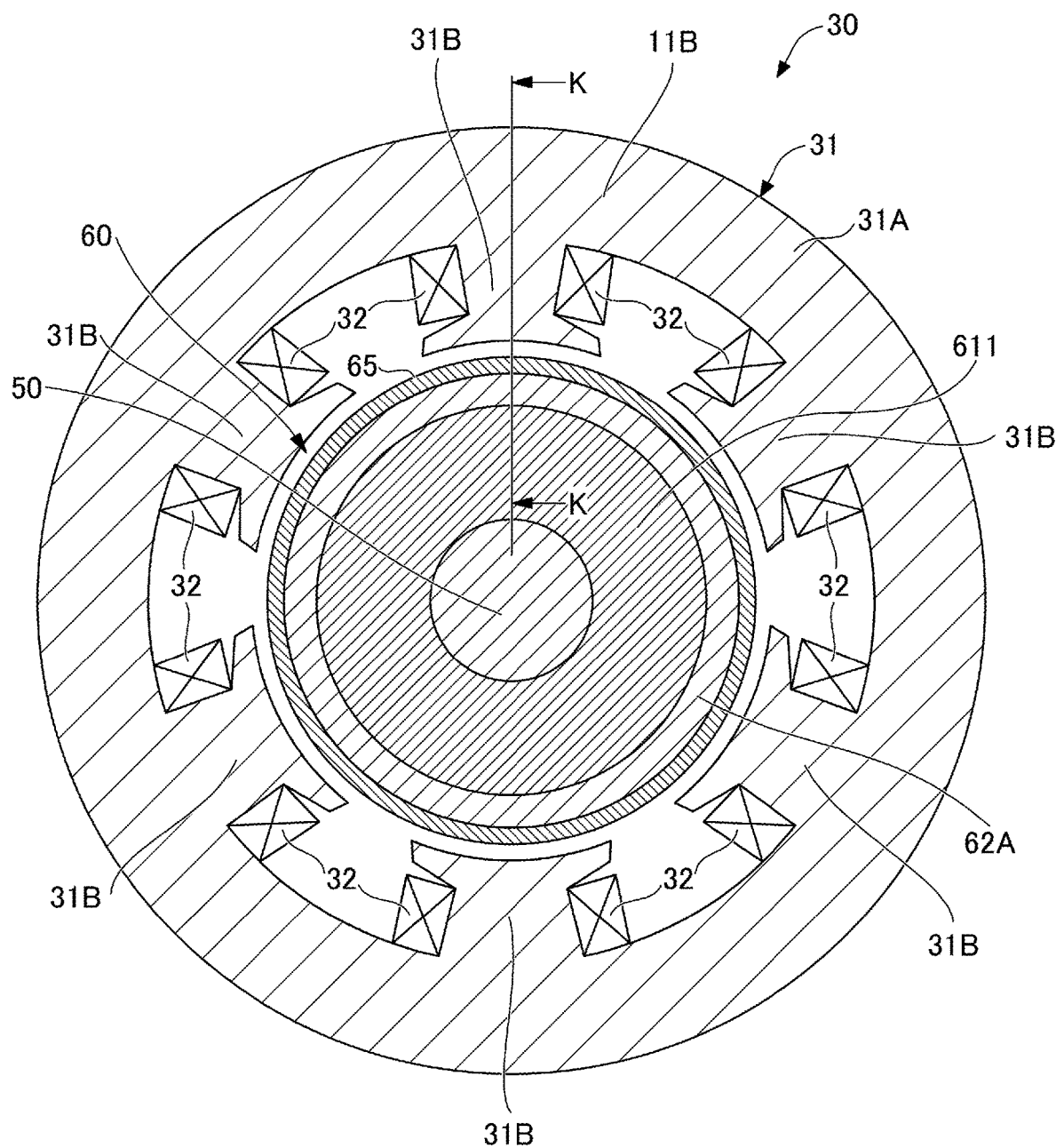
FIG. 41 is a cross-sectional view illustrating an example of an electric motor according to a ninth embodiment.
Figure 42:
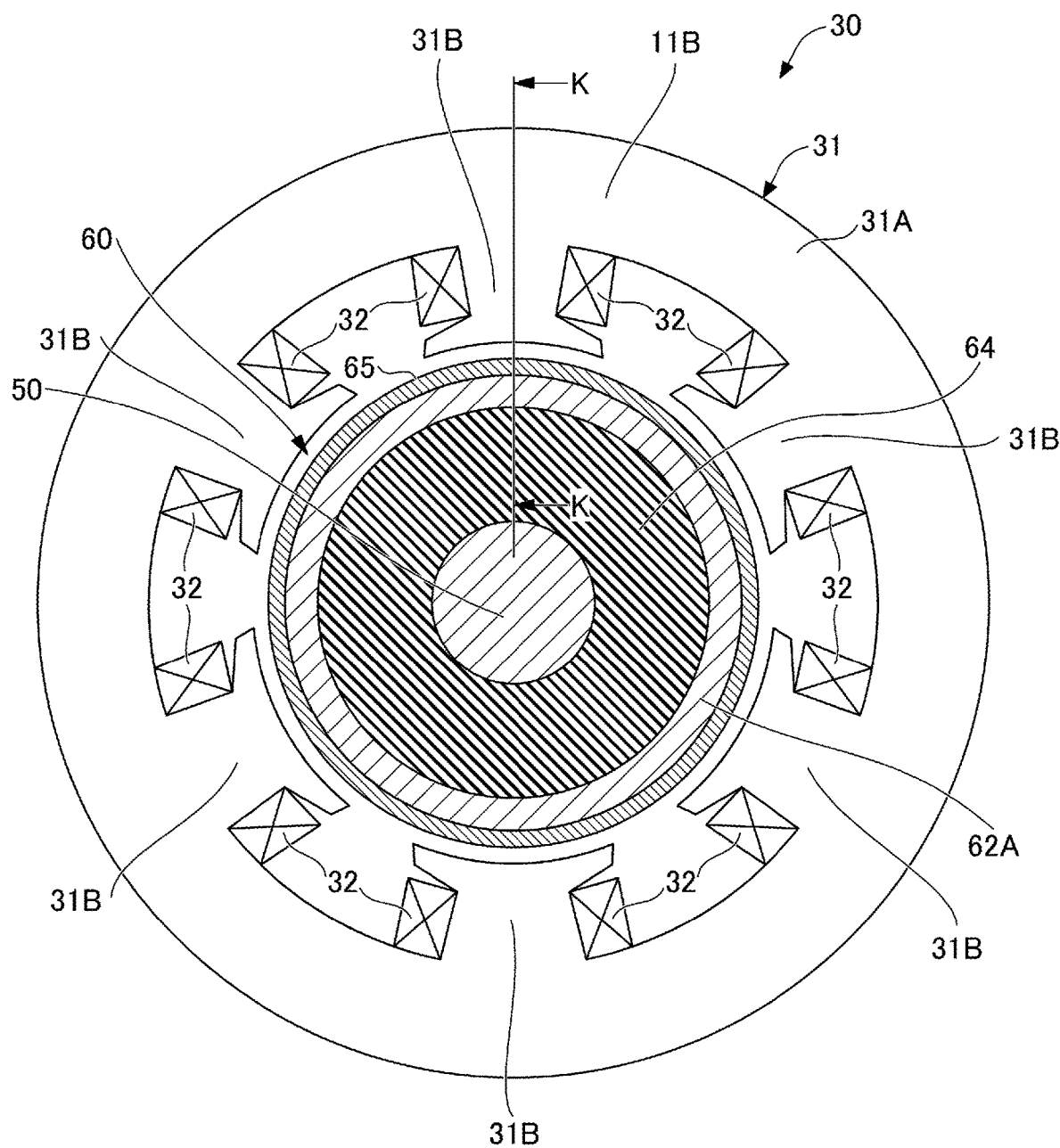
FIG. 42 is a cross-sectional view illustrating an example of an electric motor according to the ninth embodiment.

FIGS. 41 and 42 are cross-sectional views illustrating an example of the electric motor 1 according to the ninth embodiment. Specifically, FIG. 41 is a cross-sectional view at the center in the axial direction of the electric motor 1, and FIG. 42 is a cross-sectional view at the axial end of the electric motor 1. FIG. 43 is a longitudinal section view of an example of the electric motor 1 according to the ninth embodiment. Specifically, FIG. 43 is a cross-sectional view corresponding to the K-K line in FIGS. 41 and 42. The thick solid arrows in FIG. 43 represent the flow of magnetic flux between a magnet 62A and the stator 30. The dashed arrow in FIG. 43 illustrates the magnetization orientation (magnetization direction) of the magnet 62A.

In FIG. 42, the cross-section of the electric motor 1 at the position in the axial direction where only the rotor 60 exists among the stator 30 and the rotor 60 is illustrated, and the state of the stator 30 as viewed from the axial direction and the cross-section of the rotor 60 are illustrated.

Figure 43:
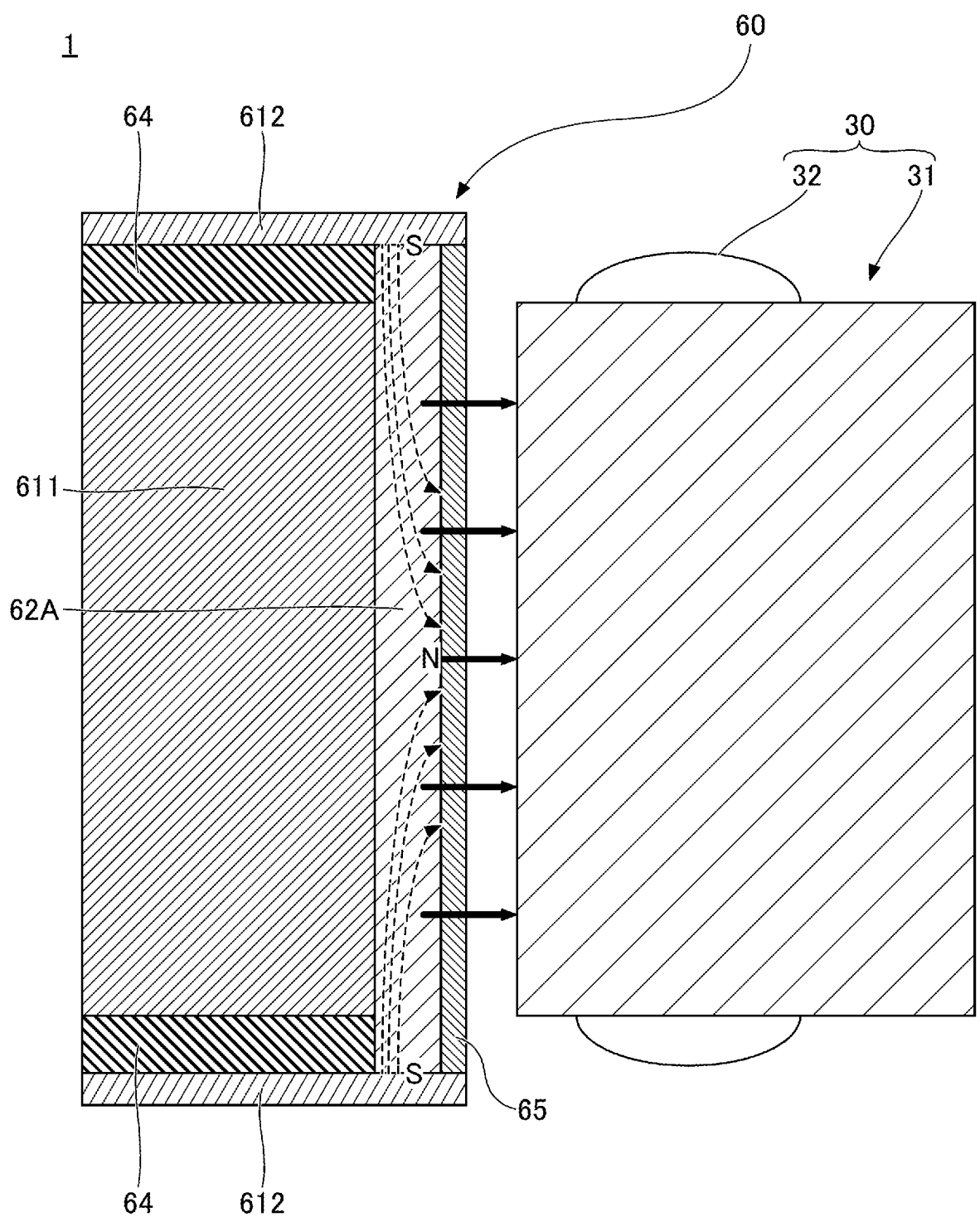
FIG. 43 is a longitudinal cross-sectional view illustrating an example of an electric motor according to the ninth embodiment.

As illustrated in FIG. 41 to FIG. 43, the rotor 60 includes the magnet 62A instead of the main magnet 62 and the auxiliary magnet 63, unlike the seventh embodiment.

The magnet 62A is configured by one member and is arranged adjacent to the surfaces of the main yoke part 611 and the short-circuit reduction member 64, specifically, radially outside the main yoke part 611 and the short-circuit reduction member 64. The magnet 62A has an approximately cylindrical shape centered on the rotary axial center AX. Specifically, the magnet 62A has an approximately cylindrical shape with the same dimension in the axial direction as the sum of the sizes of the main yoke part 611 and the short-circuit reduction member 64 and an inner diameter equivalent to the outer dimensions of the main yoke part 611 and the short-circuit reduction member 64 within a range that the magnet 62A can be fastened to the main yoke part 611 and the short-circuit reduction member 64.

Among the magnet 62A, the part that faces the teeth part 31B in the radial direction is the part corresponding to the main magnet 62 in the seventh and eighth embodiment, and the part that does not face the teeth part 31B in the radial direction is the part corresponding to the auxiliary magnet 63 in the seventh and eighth embodiment.

As illustrated in FIG. 43, the magnet 62A has a pair of magnetic poles (N-pole and S-pole) (examples of second and first magnetic poles, or third and first magnetic poles) with different magnetic polarities on the axial end face and the radially outer end face at any angular position in the circumferential direction of the rotor 60. Then, the magnet 62A is magnetized at any same angular position in the circumferential direction of the rotor 60 with a magnetization orientation that connects the magnetic pole on its axial end face and the magnetic pole on its radial end face in a protruding curve on the inside in the radial direction. Specifically, the magnetization orientation of the part corresponding to the auxiliary magnet 63 in the magnet 62A is different in direction from the magnetization orientation of the part corresponding to the main magnet 62. The magnet 62A has a pair of magnetic poles with different magnetic polarities at the interface between the part corresponding to the main magnet 62 and the part corresponding to the auxiliary magnet 63. Specifically, the magnet 62A has a magnetic pole (an example of a third magnetic pole or a second magnetic pole) of a different polarity from the magnetic pole of the axial end face of the magnet 62A at a position corresponding to the auxiliary magnet 63 at the interface. Further, the magnet 62A has a magnetic pole (an example of a fourth magnetic pole) of a different polarity from the magnetic pole of the radial end face of the magnet 62A at a position corresponding to the main magnet 62 at the interface. Then, the magnet 62A is integrally configured in such a manner that the magnetic pole of the axially inner end of the part corresponding to the auxiliary magnet 63 and the magnetic pole of the axially outer end of the part corresponding to the main magnet 62 face each other in the axial direction. Thus, the magnet 62A has a Halbach array magnetic circuit structure with no magnetic flux leakage on the inside in the radial direction. Therefore, the magnetic flux of the magnetic pole on the surface of the magnet 62A facing the stator 30 in the radial direction can be increased (strengthened).

The magnet 62A is magnetized such that the polarity combination of the pair of magnetic poles of its axial end face and the radial outer end face is switched at every predetermined angle in the circumferential direction of the rotor 60. Specifically, N-poles and S-poles are alternately arranged on the axial end face of the magnet 62A at each predetermined angle in the circumferential direction, and N-poles and S-poles are alternately arranged on the radially outer end face of the magnet 62A at each predetermined angle in the circumferential direction with polarities different from that of the axial end face of the same angle range.

Thus, in this example, the magnet 62A is magnetized such that the magnetization direction (magnetization orientation) from the axial end face to the radial outer end face changes from a state in which the axial component is relatively large to a state in which the radial component is relatively large. Thus, the magnet 62A can realize the functions of the main magnet 62 and the auxiliary magnet 63 of the seventh embodiment with one member.

Other Embodiments

Other embodiments will be described next.

The above first to ninth embodiment may be combined as appropriate.

For example, in the third embodiment, the short-circuit reduction members 25 and 26 may be omitted and replaced with spaces where no members are provided (an example of a space without a short-circuit reduction part and members), as in the case of the spaces 25B and 26B in the second embodiment.

Further, for example, in the fourth embodiment, the short-circuit reduction member 28 may be omitted and replaced with a void (an example of a space without a short-circuit reduction part and members) realized by a recess in the back yoke part 211, as in the case of the voids 25A and 26A in the second embodiment.

Further, for example, in the fifth embodiment, the short-circuit reduction member 44 may be omitted and replaced with a space (an example of a space without a short-circuit reduction part and members) where the member is not provided, as in the cases of spaces 25B and 26B in the second embodiment.

Further, for example, in the fifth embodiment, the short-circuit reduction member 44 may be omitted, and the main yoke part 411 may be extended in the axial direction to the parts of the auxiliary magnet 43 and the auxiliary yoke part 412. As in the case of the voids 25A and 26A in the second embodiment, by providing a recess on the surface of the main yoke part 411 adjacent to the auxiliary magnet 43, a void (an example of a space without a short-circuit reduction part and members) may be provided on the portion around the auxiliary magnet 43 that faces the auxiliary magnet 43 in parallel with the virtual line connecting the pair of magnetic poles inside the auxiliary magnet 43.

Further, for example, in the sixth embodiment, the short-circuit reduction members 47, 48 may be omitted and replaced with voids (an example of a space without a short-circuit reduction part and members) realized by the cavity portion of the auxiliary magnet slot of the rotor core 41, as in the case of voids 25A, 26A in the second embodiment.

Further, for example, in the first or second embodiment, the auxiliary magnets 23 and 24 may be magnetized in a direction that intersects the magnetization direction of the main magnet 22 at an angle greater than 0 degrees and less than 90 degrees, as in the case of the auxiliary magnet 63 (FIG. 33) in the seventh embodiment.

Further, for example, in the fourth embodiment, the auxiliary magnet 27 may be magnetized in a direction that intersects the magnetization direction of the main magnet 22 at an angle greater than 0 degrees and less than 90 degrees, as in the case of the auxiliary magnet 63 (FIG. 33) in the seventh embodiment.

Further, for example, in the fifth embodiment, the auxiliary magnet 43 may be magnetized in a direction intersecting the magnetization direction of the main magnet 42 at an angle greater than 0 degrees and less than 90 degrees, as in the case of the auxiliary magnet 63 (FIG. 33) in the seventh embodiment.

Further, for example, in the first to third embodiments, the main magnet 22 may be magnetized on a surface facing the stator 10 in the axial direction in a polar anisotropic magnetization orientation in which a pair of magnetic poles having different magnetic polarities from each other are arranged in multiple pairs in the circumferential direction.

Further, for example, in the first or second embodiment, the main magnet 22 and the auxiliary magnets 23 and 24 may be replaced with a single magnet member having a pair of magnetic poles on the radial end face and the axial end face facing the stator 10, as in the case of the magnet 62A in the ninth embodiment.

Further, for example, in the fifth embodiment, the main magnet 42 and the auxiliary magnet 43 may be replaced with a single magnet member having a pair of magnetic poles at the axial end face and the radially outer end face facing the stator 30, as in the case of the magnet 62A in the ninth embodiment.

Further, for example, in the sixth embodiment, the main magnet 42 and the auxiliary magnet 46 may be replaced with a single magnet member having a pair of magnetic poles on the long side end face in the axial view and the short side end face facing the stator 30, as in the case of the magnet 62A in the ninth embodiment.

Further, the first to ninth embodiment described above may be modified or changed as appropriate.

For example, in the first to third embodiment, where there are multiple auxiliary magnets 24 arranged radially outside of the multiple auxiliary magnets 23, the multiple auxiliary magnets 24 may be omitted. In this case, the outer ring part 213 is also omitted. In this case, in the first embodiment, the short-circuit reduction member 26 is also omitted, and in the second embodiment, the radial dimension of the back yoke part 211 is shortened in addition to the omission of the multiple auxiliary magnets 24 and the outer ring part 213. Thus, the increase in the radial dimension of the electric motor 1 can be reduced. Therefore, the output of the electric motor 1 can be increased while preventing the size of the electric motor 1 from being increased.

Further, for example, in the first to third embodiment, where the multiple auxiliary magnets 23 are arranged inside the radial direction of the multiple auxiliary magnets 24, the multiple auxiliary magnets 23 may be omitted. In this case, the inner ring part 212 is also omitted. In this case, in the first embodiment, the short-circuit reduction member 25 is also omitted, and in the second embodiment, the radial dimension of the back yoke part 211 is shortened in addition to the omission of the multiple auxiliary magnets 23 and the inner ring part 212. This allows sufficient space to place bearings and rotary shaft members (shafts) on the inner side in the radial direction of the main magnet 22. Therefore, it is possible to increase the output of the electric motor 1 while securing space for the arrangement of the components on the inner side in the radial direction of the main magnet 22.

Further, for example, in the fifth embodiment, the auxiliary magnet 43 at either end among the auxiliary magnets 43 arranged at both ends in the axial direction may be omitted. In this case, at one end where the auxiliary magnet 43 is omitted, the auxiliary yoke part 412 and the short-circuit reduction member 44 are also omitted. Thus, the increase in the dimension in the axial direction of the electric motor 1 can be reduced. Therefore, the output of the electric motor 1 can be increased while preventing the size of the electric motor 1 from being increased in the axial direction.

For example, in the sixth embodiment, the auxiliary magnet 46 at either end among the two auxiliary magnets 46 arranged adjacent to both ends of the main magnet 42 in a direction orthogonal to the main magnetic flux may be omitted. In this case, at one end where the auxiliary magnet 46 is omitted, the short-circuit reduction members 47 and 48 are also omitted.

Further, for example, in the eighth embodiment, only the main magnet 42 among the main magnet 42 and the auxiliary magnet 43 may be magnetized in a polar anisotropic magnetization orientation, and the auxiliary magnet 43 may have the same configuration as in the seventh embodiment. In this case, instead of the end plate 66, an auxiliary yoke part 612 is provided as in the case of the seventh embodiment.

[Application Example of Electric Motor]

Next, a specific application example of the electric motor 1 according to the present embodiment will be described with reference to FIG. 44.

Figure 44:
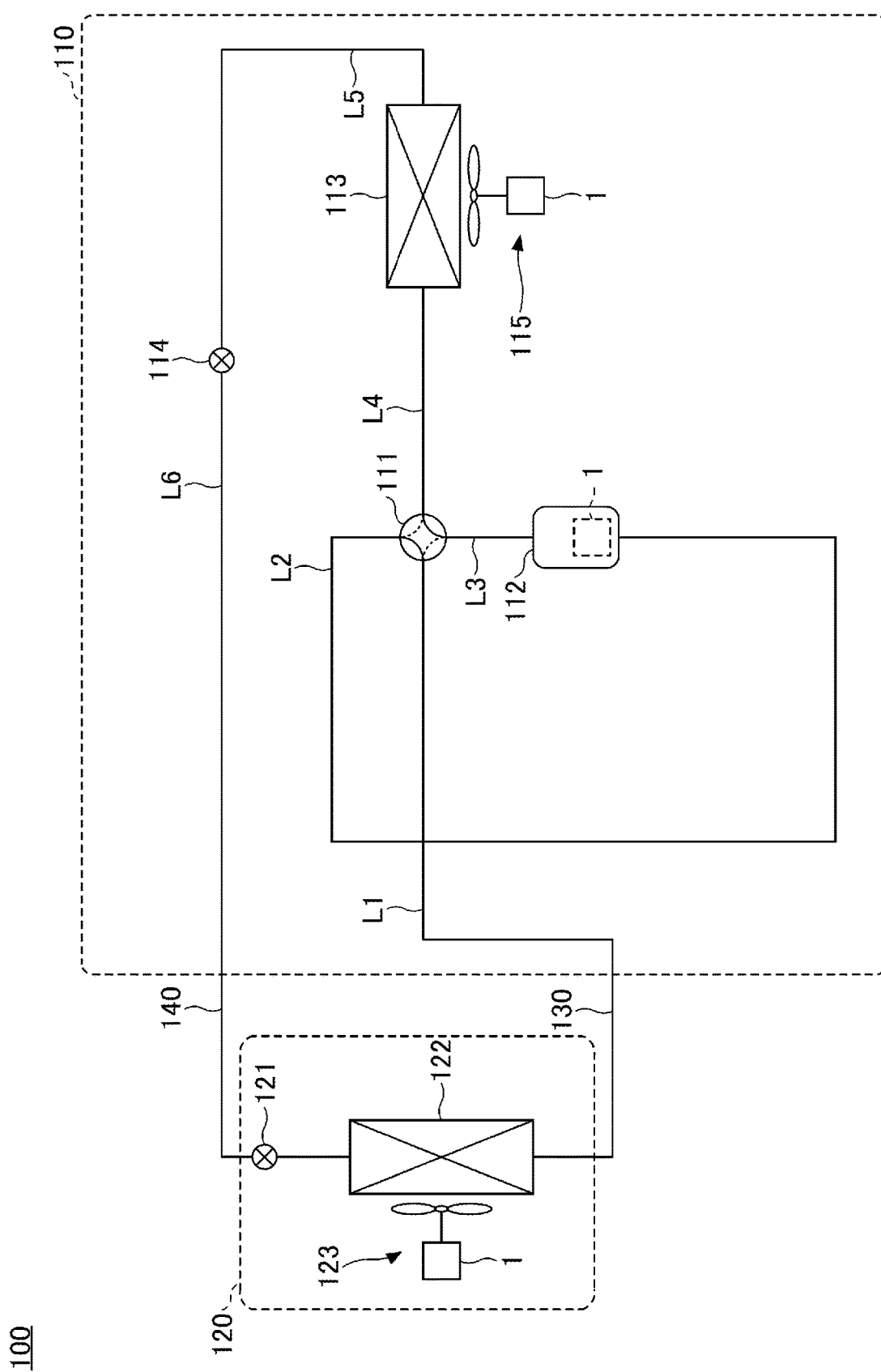
FIG. 44 illustrates an example of an air conditioner equipped with an electric motor.

FIG. 44 is a diagram illustrating an example of an air conditioner 100 in which the electric motor 1 according to the present embodiment is installed.

An air conditioner 100 (an example of a refrigerator) includes an outdoor unit 110, an indoor unit 120, and refrigerant paths 130, 140. The air conditioner 100 operates a refrigerant circuit formed of the outdoor unit 110, the indoor unit 120, the refrigerant paths 130, 140, etc., to adjust the temperature, the humidity, etc., in a room where the indoor unit 120 is installed.

The outdoor unit 110 is arranged outside a building for which the temperature or the like is to be adjusted. The outdoor unit 110 is connected to one end of each of the refrigerant paths 130, 140 and suctions the refrigerant from one of the refrigerant paths 130, 140 and discharges the refrigerant from the other.

The indoor unit 120 is arranged in the interior of the building for which the temperature or the like is to be adjusted. The indoor unit 120 is connected to the other end of each of the refrigerant paths 130, 140 and suctions the refrigerant from one of the refrigerant paths 130, 140 and discharges the refrigerant to the other.

The refrigerant paths 130, 140, for example, is configured by a pipeline and connects the outdoor unit 110 and the indoor unit 120 such that the refrigerant can be circulated between the outdoor unit 110 and the indoor unit 120.

The outdoor unit 110 includes refrigerant paths L1 to L6, a four-way selector valve 111, a compressor 112, an outdoor heat exchanger 113, an outdoor expansion valve 114, and a fan 115.

The refrigerant paths L1 to L6 are configured, for example, by pipelines.

The refrigerant path L1 connects one end of the refrigerant path 130 outside the outdoor unit 110 to the four-way selector valve 111.

The refrigerant path L2 connects the four-way selector valve 111 to the inlet of the compressor 112.

The refrigerant path L3 connects the four-way selector valve 111 to the outlet of the compressor 112.

The refrigerant path L4 connects the four-way selector valve 111 to the outdoor heat exchanger 113.

The refrigerant path L5 connects the outdoor heat exchanger 113 to the outdoor expansion valve 114.

The refrigerant path L6 connects one end of the refrigerant path 140 outside the outdoor unit 110 to the outdoor expansion valve 114.

The four-way selector valve 111 reverses the flow in which the refrigerant circulates, between the cooling operation and the heating operation of the air conditioner 100.

During the cooling operation of the air conditioner 100, the four-way selector valve 111 connects the path expressed by the solid line in FIG. 44. Specifically, during the cooling operation of the air conditioner 100, the four-way selector valve 111 makes connections between the refrigerant path L1 and the refrigerant path L2, and between the refrigerant path L3 and the refrigerant path L4.

On the other hand, in the case of the heating operation of the air conditioner 100, the four-way selector valve 111 connects the path expressed by the dotted line in FIG. 44.

Specifically, during the heating operation of the air conditioner 100, the four-way selector valve 111 makes connections between the refrigerant path L4 and the refrigerant path L2, and between the refrigerant path L1 and the refrigerant path L3.

The compressor 112 suctions the refrigerant from the refrigerant path L2, compresses the refrigerant to a high pressure and discharges the refrigerant to the refrigerant path L3. The compressor 112 is equipped (built-in) with the electric motor 1 and is electrically driven by the electric motor 1.

During the cooling operation of the air conditioner 100, the high-temperature and high-pressure refrigerant compressed by the compressor 112 flows into the outdoor heat exchanger 113 through the refrigerant path L3 and the refrigerant path L4.

On the other hand, in the heating operation of the air conditioner 100, the high-temperature and high-pressure refrigerant compressed by the compressor 112 flows out to the refrigerant path 130 outside the outdoor unit 110 through the refrigerant path L3 and the refrigerant path L1. The high-temperature, high-pressure refrigerant then flows into the indoor unit 120 through the refrigerant path 130.

The outdoor heat exchanger 113 exchanges heat between the outside air and the refrigerant passing through the inside. Specifically, the fan 115 is attached to the outdoor heat exchanger 113, and the outdoor heat exchanger 113 exchanges heat between the outside air blown by the fan 115 and the refrigerant passing through the inside.

During the cooling operation of the air conditioner 100, the outdoor heat exchanger 113 causes the high-temperature, high-pressure refrigerant coming from the refrigerant path L4 and compressed by the compressor 112 to radiate heat to the outside air, and causes the condensed and liquefied refrigerant (liquid refrigerant) to flow out to the refrigerant path L5.

Further, during the heating operation of the air conditioner 100, the outdoor heat exchanger 113 causes the low-temperature and low-pressure liquid refrigerant flowing in from the refrigerant path L5 to absorb heat from the outside air and causes the evaporated refrigerant to flow out to the refrigerant path L4.

The outdoor expansion valve 114 is closed to a predetermined opening during heating operation of the air conditioner 100 to reduce the pressure of the refrigerant (liquid refrigerant) flowing from the refrigerant path L6 to a predetermined pressure. On the other hand, the outdoor expansion valve 114 is fully opened during the cooling operation of the air conditioner 100 to allow a refrigerant (liquid refrigerant) to pass from the refrigerant path L5 to the refrigerant path L6.

The fan 115 (an example of a blower) sends air to the outdoor heat exchanger 113 as described above to facilitate heat exchange in the outdoor heat exchanger 113. The fan 115 is equipped with the electric motor 1 and is electrically driven by the electric motor 1.

The indoor unit 120 includes an indoor expansion valve 121, an indoor heat exchanger 122, and a fan 123.

The indoor expansion valve 121 is closed to a predetermined opening amount and reduces the pressure of the supercooled liquid refrigerant flowing from the refrigerant path 140 to a predetermined pressure during the cooling operation of the air conditioner 100. On the other hand, the indoor expansion valve 121 is fully opened during the heating operation of the air conditioner 100 to allow the refrigerant (liquid refrigerant) flowing out of the indoor heat exchanger 122 to pass toward the refrigerant path 140.

The indoor heat exchanger 122 exchanges heat between the indoor air and the refrigerant passing through the interior. More specifically, by the function of the fan 123 installed in the indoor unit 120, indoor air is allowed to pass through the indoor heat exchanger 122, and the indoor air that has undergone heat exchange with the refrigerant inside the indoor heat exchanger 122 is blown out of the indoor unit 120, thereby achieving indoor cooling or heating.

Specifically, during the cooling operation of the air conditioner 100, the indoor heat exchanger 122 absorbs heat from the indoor air into the low-temperature, low-pressure liquid refrigerant, for which the pressure is reduced by the indoor expansion valve 121, thereby lowering the temperature of the indoor air.

On the other hand, during the heating operation of the air conditioner 100, the indoor heat exchanger 122 causes the high-temperature, high-pressure refrigerant flowing from the outdoor unit 110 through the refrigerant path 130 to radiate heat into the indoor air, thereby raising the temperature of the indoor air.

The fan 123 (an example of a blower) sends air to the indoor heat exchanger 122 as described above, and blows the indoor air that has been heat-exchanged with the refrigerant inside the indoor heat exchanger 122, to the outside of the indoor unit 120. The fan 123 is equipped with the electric motor 1 and is electrically driven by the electric motor 1.

The electric motor 1 may be installed in at least one of the compressor 112, the fan 115 and the fan 123, that is, in one or two of these.

Thus, in this example, the electric motor 1 according to the present embodiment described above is installed in the compressor 112, the fan 115 and the fan 123 installed in the air conditioner 100. Therefore, by adopting the electric motor 1 with a relatively large output, the power required to obtain the same output becomes relatively small, and the energy efficiency of the compressor 112, the fan 115 and the fan 123 can be improved. AS a result, the energy efficiency of the air conditioner 100 can be improved.

[Functions]

Next, the functions of the electric motor 1 according to the present embodiment will be described.

In the present embodiment, the electric motor 1 is equipped with a stator, a rotor that faces the stator in a first direction and is freely rotatable in a second direction orthogonal to the first direction, and a short-circuit reduction part. A stator is, for example, the stator 10 or the stator 30. The rotor is, for example, the rotor 20, the rotor 40, or the rotor 60. The short-circuit reduction part is, for example, the short-circuit reduction members 25 and 26, the voids 25A, 26A, the spaces 25B and 26B, the short-circuit reduction member 44, the short-circuit reduction members 47, 48, the short-circuit reduction member 64, etc. Specifically, the rotor includes a first magnet having a first magnetic pole on a surface facing the stator, and a second magnet arranged adjacent to the first magnet and having a second magnetic pole and a third magnetic pole with a different polarity from the second magnetic pole, and increases the magnetic flux of the first magnetic pole. Further the second magnet is arranged adjacent to the first magnet in a third direction orthogonal to the first direction. The first magnet is, for example, the main magnet 22, the main magnet 42, the main magnet 62, etc. The second magnet is, for example, the auxiliary magnets 23 and 24, the auxiliary magnet 27, the auxiliary magnet 43, the auxiliary magnet 46, the auxiliary magnet 63, etc. Further, the short-circuit reduction part is provided at a portion around the second magnet that faces the second magnet in parallel with a virtual line connecting the second and third magnetic poles to reduce the short-circuit of magnetic flux between the second and third magnetic poles.

This prevents magnetic flux from short-circuiting between the poles of the second magnet through a surrounding area that faces the second magnet in parallel with an virtual line connecting the poles inside the second magnet. Therefore, the magnetic flux of the magnetic pole facing the stator of the first magnet can be increased more.

In the present embodiment (first to third embodiment), the third direction may be orthogonal to the second direction. Specifically, the rotor 20 and the stator 10 may be arranged axially facing each other. The main magnet 22 may be arranged such that a plurality of first magnetic poles are arranged side by side in the circumferential direction around the rotary axial center AX. The auxiliary magnets 23 and 24 may be arranged such that the second or third magnetic pole is adjacent to each of the multiple first magnetic poles in the radial direction (third direction).

Further, in the present embodiment (fourth embodiment), the third direction may be the same as the second direction. Specifically, the rotor 20 and the stator 10 may be arranged axially facing each other. The main magnet 22 may be arranged such that a plurality of first magnetic poles are arranged side by side in the circumferential direction around the rotary axial center AX. The auxiliary magnet 27 may be arranged such that the second or third magnetic pole is adjacent to each of the multiple first magnetic poles in the circumferential direction (third direction).

Thus, in the axial-gap type electric motor 1, the magnetic flux of the magnetic pole facing the stator 30 of the main magnet 22 can be increased more, specifically by using the auxiliary magnets 23 and 24 and 27. Therefore, the output of the axial-gap type electric motor 1 can be further increased.

In the present embodiment (fifth and seventh embodiments), the third direction may be orthogonal to the second direction. Specifically, the rotor 40 and the stator 30 may be arranged radially facing each other. The main magnet 42 may be arranged such that a plurality of first magnetic poles are arranged side by side in the circumferential direction around the rotary axial center AX. The auxiliary magnet 43 may be arranged such that the second or third magnetic pole is adjacent to each of the multiple first magnetic poles in the axial direction (third direction). Similarly, the rotor 60 and the stator 30 may be arranged radially facing each other. The main magnet 62 may be arranged such that a plurality of first magnetic poles are arranged side by side in the circumferential direction around the rotary axial center AX. The auxiliary magnet 63 may be arranged such that the second or third magnetic pole is adjacent to each of the multiple first magnetic poles in the axial direction (third direction).

Further, in the present embodiment (sixth embodiment), the third direction may be the same as the second direction. Specifically, the rotor 40 and the stator 30 may be arranged radially facing each other. The main magnet 42 may be arranged such that a plurality of first magnetic poles are arranged side by side in the circumferential direction around the rotary axial center AX. The auxiliary magnet 46 may be arranged such that the second magnetic pole or the third magnetic pole is adjacent to the end in a direction orthogonal to the main magnetic flux (third direction) of each of the multiple first magnetic poles when viewed in the axial direction.

Thus, in the radial gap type electric motor 1, the magnetic flux of the magnetic pole facing the stator 30 of the main magnet 42 can be increased more, specifically by using the auxiliary magnet 43 or the auxiliary magnet 46. Therefore, the output of the radial-gap motor 1 can be further increased.

Further, in the present embodiment (first to seventh and ninth embodiments), the first magnet may have a fourth magnetic pole on a surface different from the surface with the first magnetic pole. Further, the rotor may include a plurality of first magnets and a first member that configures a magnetic path between the plurality of the first magnets and the fourth magnetic poles. The first member is, for example, the back yoke part 211, the main yoke part 411, the main yoke part 611, etc. Further, the short-circuit reduction part may have higher magnetic resistance than the first member.

Thus, the short-circuit reduction part can specifically reduce the short-circuit magnetic flux of the second magnet.

Furthermore, in the present embodiment (the first, third to ninth embodiments), a non-magnetic body may be provided in the short-circuit reduction part.

Thus, the magnetic flux that short-circuits between the magnetic poles of the auxiliary magnet can be specifically reduced by the non-magnetic member with relatively high magnetic resistance.

Further, in the present embodiment (second embodiment), a space without a member may be provided in the short-circuit reduction part.

This allows the space without any member with relatively high magnetic resistance to specifically reduce the magnetic flux that short-circuits between the magnetic poles of the auxiliary magnet.

Further, in the present embodiment (first to ninth embodiment), the second magnet may be magnetized in a direction orthogonal to the magnetization direction of the first magnet.

This achieves a Halbach array between the first magnet and the second magnet, specifically increasing the magnetic flux of the magnetic pole facing the stator of the first magnet.

In the present embodiment, the second magnet may be magnetized in a direction that intersects the magnetization direction of the first magnet at an angle greater than 0 degrees and less than 90 degrees.

This achieves a Halbach array between the first magnet and the second magnet, specifically increasing the magnetic flux of the magnetic pole facing the stator of the first magnet.

Further, in the present embodiment, at least one of the first magnet and the second magnet may be magnetized in a polar anisotropic magnetization orientation.

This eliminates the need to provide a member of a magnetic body that forms a magnetic path between the first magnets and a magnetic path between the second magnets. Therefore, the degree of freedom in the configuration of the electric motor 1 can be increased, and for example, the size of the electric motor 1 can be reduced and the cost can be reduced.

Further, in the present embodiment (the ninth embodiment), the first magnet and the second magnet may be formed of an integral magnet 62A.

Thus, the functions of the first magnet and the second magnet can be realized with one member.

In the present embodiment, the compressor 112 may be equipped with the electric motor 1.

Thus, the compressor 112 can increase energy efficiency.

In the present embodiment, the fan 115 or the fan 123 may be equipped with the electric motor 1.

Thus, the fan 115 and the fan 123 can increase energy efficiency.

Further, in the present embodiment, the air conditioner 100 may be equipped with the compressor 112 and the fan 115, 123. The electric motor 1 may be installed in at least one of the compressor 112 and the fan 115, 123.

Thus, the air conditioner 100 can increase energy efficiency.

MODIFICATION/CHANGES

As described above, it will be understood that various changes in form and details are possible without departing from the purport and scope of the claims.

For example, in the above fifth to ninth embodiments, for an inner rotor type electric motor 1, a method of reducing short-circuit magnetic flux between a pair of magnetic poles of a second magnet (the auxiliary magnets 43, 46, 63) that increase the magnetic flux of the magnetic pole on the surface of the first magnet (the main magnets 42, 62) facing the stator 30 is disclosed, but a similar method may be adopted for the rotor of an outer rotor type motor.

CROSS-REFERENCE TO RELATED APPLICATIONS

Finally, the application claims priority based on Japanese Patent Application No. 2020-100025 filed on Jun. 9, 2020, and the entire contents of the Japanese patent application are hereby incorporated by reference.

REFERENCE SIGNS LIST

1 electric motor
10 stator
11 stator core
11A back yoke part
11B teeth part
12 winding
20 rotor
21 rotor core
22 main magnet (first magnet)
23, 24 auxiliary magnet (second magnet)
25, 26 short-circuit reduction member (short-circuit reduction part)
25A, 26A void (space without any member)
25B, 26B space (space without any member)
27 auxiliary magnet (second magnet)
28 short-circuit reduction member (short-circuit reduction part)
30 stator
31 stator core
31A back yoke part
31B teeth part
32 winding
40 rotor
41 rotor core
42 main magnet (first magnet)
43 auxiliary magnet (second magnet)
44 short-circuit reduction member (short-circuit reduction part)
46 auxiliary magnet (second magnet)

47, 48 short-circuit reduction member (short-circuit reduction part)
50 rotary shaft member
60 rotor
61 rotor core
62 main magnet (first magnet)
63 auxiliary magnet (second magnet)
64 short-circuit reduction member (short-circuit reduction part)
65 protective tube
66 end plate
211 back yoke part (first member)
212 inner ring
213 outer ring
411 main yoke part (first member)
412 auxiliary yoke part
611 main yoke part (first member)
612 auxiliary yoke part
AX rotary axial center

The invention claimed is:

1. An electric motor comprising:
a stator;
a rotor facing the stator in a first direction and configured to be rotatable in a second direction that is orthogonal to the first direction; and
a short-circuit reduction part, wherein
the rotor includes:
  a plurality of first magnets including a primary magnet and a secondary magnet, wherein the primary magnet has a first magnetic pole on a first surface of the primary magnet facing the stator and a fourth magnetic pole on a second surface of the primary magnet different from the first surface;
  a first member, wherein the first member forms a magnetic path between the fourth magnetic pole of the primary magnet and a magnetic pole of the secondary magnet on a side of the secondary magnet facing away from the stator,
  a second magnet arranged adjacent to the primary magnet and having a second magnetic pole and a third magnetic pole that is different in polarity from the second magnetic pole, and configured to increase a magnetic flux of the first magnetic pole of the primary magnet, and wherein
the primary magnet is provided on a surface of the rotor that faces the stator,
the second magnet is in direct contact with the primary magnet in a third direction that is orthogonal to the first direction,
the short-circuit reduction part is provided at a portion around the second magnet facing the second magnet in parallel with a virtual line connecting the second magnetic pole and the third magnetic pole, to reduce a short-circuit of a magnetic flux between the second magnetic pole and the third magnetic pole,
the short-circuit reduction part has a magnetic resistance that is higher than that of the first member, and
wherein a portion of the first member is at least partially surrounded by the short-circuit reduction part.

2. The electric motor according to claim 1, wherein the third direction is orthogonal to the second direction.

3. The electric motor according to claim 1, wherein
the rotor and the stator are arranged facing each other in an axial direction,
the plurality of the first magnets are arranged such that a plurality of the first magnetic poles are arranged side by side in a circumferential direction centering around a rotary shaft, and
the second magnet is arranged such that a plurality of second magnetic poles or a plurality of third magnetic poles are adjacent to each of the plurality of the first magnetic poles in a radial direction.

4. The electric motor according to claim 1, wherein the third direction is the same as the second direction.

5. The electric motor according to claim 1, wherein
the rotor and the stator are arranged facing each other in an axial direction,
the plurality of the first magnets are arranged such that a plurality of the first magnetic poles are arranged side by side in a circumferential direction centering around a rotary shaft, and
the second magnet is arranged such that a plurality of second magnetic poles or a plurality of third magnetic poles are adjacent to each of the plurality of the first magnetic poles in the circumferential direction.

6. The electric motor according to claim 1, wherein the short-circuit reduction part is provided with a non-magnetic body.

7. The electric motor according to claim 1, wherein the short-circuit reduction part is provided with a space without any member.

8. The electric motor according to claim 1, wherein the second magnet is magnetized in a direction orthogonal to a magnetization direction of the primary magnet.

9. The electric motor according to claim 1, wherein at least one of the primary magnet or the second magnet is magnetized in a polar anisotropic magnetization orientation.

10. A compressor in which the electric motor according to claim 1 is installed.

11. A blower in which the electric motor according to claim 1 is installed.

12. A refrigerator comprising:
a compressor; and
a blower, wherein
in at least one of the compressor or the blower, the electric motor according to claim 1 is installed.

13. The electric motor according to claim 1, wherein at least a portion of the second magnet is between the stator and the short-circuit reduction part.

* * * * *